United States Patent
Fujita et al.

(10) Patent No.: US 9,587,319 B2
(45) Date of Patent: Mar. 7, 2017

(54) HOT-ROLLED STEEL SHEET, COLD-ROLLED STEEL SHEET, GALVANIZED STEEL SHEET, AND METHODS OF MANUFACTURING THE SAME

(71) Applicant: NIPPON STEEL & SUMITOMO METAL CORPORATION, Tokyo (JP)

(72) Inventors: Nobuhiro Fujita, Tokyo (JP); Kunio Hayashi, Tokyo (JP); Riki Okamoto, Tokyo (JP); Manabu Takahashi, Tokyo (JP); Tetsuo Kishimoto, Tokyo (JP); Hiroshi Yoshida, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/000,722

(22) Filed: Jan. 19, 2016

(65) Prior Publication Data

US 2016/0130711 A1 May 12, 2016

Related U.S. Application Data

(62) Division of application No. 13/811,902, filed as application No. PCT/JP2011/067070 on Jul. 27, 2011, now Pat. No. 9,273,370.

(30) Foreign Application Priority Data

Jul. 28, 2010 (JP) .................................. 2010-169230
Jul. 28, 2010 (JP) .................................. 2010-169627
(Continued)

(51) Int. Cl.
*C25D 3/22* (2006.01)
*C21D 8/02* (2006.01)
(Continued)

(52) U.S. Cl.
CPC ................ *C25D 3/22* (2013.01); *B21B 35/00* (2013.01); *C21D 6/004* (2013.01); *C21D 6/005* (2013.01);
(Continued)

(58) Field of Classification Search
CPC ....... C21D 9/46; C21D 8/0247; C21D 8/0205
See application file for complete search history.

(56) References Cited

U.S. PATENT DOCUMENTS

| 2004/0244877 A1 | 12/2004 | Yokoi et al. |
| 2009/0223609 A1 | 9/2009 | Hakomori et al. |
| 2011/0036465 A1 | 2/2011 | Kawasaki et al. |

FOREIGN PATENT DOCUMENTS

| EP | 1327695 A1 | 7/2003 |
| EP | 1362930 A1 | 11/2003 |

(Continued)

OTHER PUBLICATIONS

International Search Report issued in PCT/JP2011/067070, dated Oct. 18, 2011.

(Continued)

*Primary Examiner* — Rebecca Lee
(74) *Attorney, Agent, or Firm* — Birch, Stewart, Kolasch & Birch, LLP

(57) ABSTRACT

A hot-rolled steel sheet has an average value of the X-ray random intensity ratio of a {100} <011> to {223} <110> orientation group at least in a sheet thickness central portion that is in a sheet thickness range of ⅝ to ⅜ from a steel sheet surface of 1.0 to 6.0, an X-ray random intensity ratio of a {332} <113> crystal orientation of 1.0 to 5.0, rC which is an r value in a direction perpendicular to a rolling direction of 0.70 to 1.10, and r30 which is an r value in a direction that forms an angle of 30° with respect to the rolling direction of 0.70 to 1.10.

15 Claims, 42 Drawing Sheets

(30) Foreign Application Priority Data

| | | |
|---|---|---|
| Jul. 28, 2010 | (JP) | 2010-169670 |
| Sep. 13, 2010 | (JP) | 2010-204671 |
| Mar. 4, 2011 | (JP) | 2011-048236 |
| Mar. 4, 2011 | (JP) | 2011-048246 |
| Mar. 4, 2011 | (JP) | 2011-048253 |
| Mar. 4, 2011 | (JP) | 2011-048272 |

(51) Int. Cl.
C23C 2/06 (2006.01)
C23C 2/28 (2006.01)
C22C 38/00 (2006.01)
C22C 38/04 (2006.01)
B21B 35/00 (2006.01)
C22C 38/02 (2006.01)
C22C 38/06 (2006.01)
C22C 38/08 (2006.01)
C22C 38/10 (2006.01)
C22C 38/12 (2006.01)
C22C 38/14 (2006.01)
C22C 38/16 (2006.01)
C22C 38/18 (2006.01)
C22C 38/20 (2006.01)
C22C 38/22 (2006.01)
C22C 38/24 (2006.01)
C22C 38/26 (2006.01)
C22C 38/28 (2006.01)
C22C 38/30 (2006.01)
C22C 38/32 (2006.01)
C22C 38/34 (2006.01)
C22C 38/38 (2006.01)
C22C 38/40 (2006.01)
C22C 38/42 (2006.01)
C22C 38/44 (2006.01)
C22C 38/46 (2006.01)
C22C 38/48 (2006.01)
C22C 38/50 (2006.01)
C22C 38/52 (2006.01)
C22C 38/54 (2006.01)
C22C 38/58 (2006.01)
C23C 2/02 (2006.01)
C25D 5/36 (2006.01)
C23C 2/40 (2006.01)
C21D 6/00 (2006.01)
C21D 9/46 (2006.01)

(52) U.S. Cl.
CPC ............ *C21D 6/007* (2013.01); *C21D 6/008* (2013.01); *C21D 8/0205* (2013.01); *C21D 8/0226* (2013.01); *C21D 8/0236* (2013.01); *C21D 8/0247* (2013.01); *C21D 8/0263* (2013.01); *C21D 8/0273* (2013.01); *C21D 9/46* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/105* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C23C 2/02* (2013.01); *C23C 2/06* (2013.01); *C23C 2/28* (2013.01); *C23C 2/40* (2013.01); *C25D 5/36* (2013.01); *C21D 2201/05* (2013.01); *C21D 2211/00* (2013.01); *C21D 2211/001* (2013.01); *C21D 2211/002* (2013.01); *C21D 2211/005* (2013.01); *C21D 2211/009* (2013.01)

(56) References Cited

FOREIGN PATENT DOCUMENTS

| | | |
|---|---|---|
| EP | 1599802 | 3/2005 |
| EP | 2264206 A1 | 12/2010 |
| JP | 61-217529 | 9/1986 |
| JP | 05-059429 | 3/1993 |
| JP | 2000-119804 A | 4/2000 |
| JP | 2000-144314 A | 5/2000 |
| JP | 2003-113440 | 4/2003 |
| JP | 2003-160836 A | 6/2003 |
| JP | 2004-250744 | 9/2004 |
| JP | 2005-314798 | 11/2005 |
| JP | 2007-162078 | 6/2007 |
| JP | 2007-291514 A | 11/2007 |
| JP | 2009-030159 | 2/2009 |
| JP | 2009-114523 | 5/2009 |
| JP | 2009-132981 | 6/2009 |
| JP | 2009-263718 A | 11/2009 |
| JP | 2010-059452 | 3/2010 |
| JP | 2010-90476 A | 4/2010 |

OTHER PUBLICATIONS

JIS Z 2241, "Metallic Materials—Tensile Testing—Method of Test at Room Temperature", 2011, pp. 477-548.
JIS Z 2248, "Metallic Materials—Bend Test", 2006, pp. 733-748.
Katoh, et al., "Development of New High-Strength Hot-Rolled Steel Sheets", Steel-Manufacturing Studies (seitetu kenkyu), 1984, pp. 41-50, vol. 312.
Kishida, "High Strength Steel Sheets for Light Weight Vehicle", Nippon Steel Corporation Technical Report, 1999, pp. 13-17, No. 371.
Matsumura, et al., "Enhancement of Elongation by Retained Austenite in Intercritical Annealed 0.4C-1.5Si-0.8Mn Steel", Transactions ISIJ, 1987, pp. 570-579, vol. 27.
NFG Catalog, Nakayama Steel Works, Ltd., 10 pages, 2012.
Sugimoto, et al., "Stretch-flangeability of a High-strength TRIP Type Bainitic Sheet Steel", ISIJ International, 2000, pp. 920-926, vol. 40, No. 9.
Notice of Allowance dated Oct. 21, 2015, issued in U.S. Appl. No. 13/811,902.
Restriction Requirement dated Aug. 31, 2015, issued in U.S. Appl. No. 13/811,902.
European Search Report dated Nov. 5, 2014, issued in European Application No. 12763971.4.
International Search Report dated Jun. 26, 2012, issued in International Application No. PCT/JP2012/058199.
Office Action dated Sep. 12, 2016, issued in U.S. Appl. No. 14/004,562.

HOT-ROLLED STEEL SHEET, COLD-ROLLED STEEL SHEET, GALVANIZED STEEL SHEET, AND METHODS OF MANUFACTURING THE SAME

This is a Divisional of U.S. application Ser. No. 13/811,902 filed Mar. 7, 2013, which is the National Stage Entry of PCT International Application No. PCT/JP2011/067070 filed on Jul. 27, 2011, which claims priority under 35 U.S.C. §119(a) to Japanese Patent Application Nos. 2010-169230, 2010-169627, 2010-169670 filed in Japan on Jul. 28, 2010, Japanese Patent Application No. 2010-204671 filed in Japan on Sep. 13, 2010, Japanese Patent Application Nos. 2011-048236, 2011-048246, 2011-048253 and 2011-048272 filed in Japan on Mar. 4, 2011. Each of the above applications are hereby expressly incorporated by reference, in its entirety, into the present application.

TECHNICAL FIELD

The present invention relates to a hot-rolled steel sheet, a cold-rolled steel sheet, and a galvanized steel sheet which are excellent in terms of local deformability, such as bending, stretch flange, or a burring working, have a small orientation dependency of formability, and are used mainly for automobile components and the like, and methods of manufacturing the same. The hot-rolled steel sheet includes a hot-rolled strip that serves as a starting sheet for the cold-rolled steel sheet, the galvanized steel sheet, or the like.

BACKGROUND ART

An attempt is being made to reduce the weight of an automobile frame through use of a high-strength steel sheet in order to suppress the amount of carbon dioxide exhausted from an automobile. In addition, a high-strength steel sheet as well as a soft steel sheet has been frequently used for automobile frames from the viewpoint of securing the safety of passengers. However, in order to further reduce the weight of an automobile frame in the future, it is necessary to increase the level of operational strength of a high-strength steel sheet compared to the related art.

However, in general, an increase in the strength of a steel sheet results in a decrease in the formability. For example, Non Patent Document 1 discloses that an increase in strength degrades uniform elongation which is important for drawing or stretch forming.

Therefore, in order to use a high-strength steel sheet for underbody components of an automobile frame, components that contribute to absorption of impact energy, and the like, it becomes important to improve local deformability, such as local ductility that contributes to formability, such as burring workability or bending workability.

In contrast to the above, Non Patent Document 2 discloses a method in which uniform elongation is improved by complexing the metallic structure of a steel sheet even when the strength is maintained at the same level.

In addition, Non Patent Document 3 discloses a metallic structure control method in which local deformability represented by bending properties, hole expanding workability, or burring workability is improved through inclusion control, single structure formation, and, furthermore, a decrease in the hardness difference between structures. The above method is to improve hole expanding properties by forming a single structure through structure control, and, in order to form a single structure, a thermal treatment from an austenite single phase serves as the basis of the manufacturing method as described in Non Patent Document 4.

In addition, Non Patent Document 4 discloses a technique in which metallic structure is controlled through the control of cooling after hot rolling, and precipitates and deformed structures are controlled so as to obtain ferrite and bainite at an appropriate proportion, thereby satisfying both an increase in the strength and securement of ductility.

However, all of the above techniques are a method of improving local deformability through structure control, which is significantly influenced by base structure formation.

Meanwhile, even for improvement of material quality through an increase in the rolling reduction in a continuous hot rolling process, related art exists, which is a so-called grain refinement technique. For example, Non Patent Document 5 describes a technique in which large reduction is carried out at an extremely low temperature range in an austenite range, and non-recrystallized austenite is transformed into ferrite so that the crystal grains of ferrite which is the main phase of the product are refined, and the strength or toughness increases due to the grain refinement. However, Non Patent Document 5 pays no attention to improvement of local deformability which is the object of the present invention.

CITATION LIST

Non Patent Documents

[Non Patent Document 1] "Nippon Steel Corporation Technical Report," by Kishida (1999) No. 371, p. 13
[Non Patent Document 2] "Trans. ISIJ," by O. Matsumura et al. (1987) Vol. 27, P. 570
[Non Patent Document 3] "Steel-manufacturing studies," by Kato et al. (1984) Vol. 312, p. 41
[Non Patent Document 4] "ISIJ International," by K. Sugimoto et al. (2000) Vol. 40, p. 920
[Non Patent Document 5] NFG Catalog, Nakayama Steel Works, Ltd.

SUMMARY OF INVENTION

Technical Problem

As described above, structure control including inclusion control was a main solution for improving the local deformability of a high-strength steel sheet. However, since the solution relied on structure control, it was necessary to control the proportion or form of structures, such as ferrite and bainite, and the base metallic structure was limited.

Therefore, in the present invention, control of a texture is employed instead of control of the base structure, and a hot-rolled steel sheet, a cold-rolled steel sheet, and a galvanized steel sheet which are excellent in terms of the local deformability of a high-strength steel sheet, and have a small orientation dependency of formability, and a method of manufacturing the same are provided by controlling the size or form of crystal grains and texture as well as the kinds of phases.

Solution to Problem

According to the knowledge in the related art, hole expanding properties, bending properties, and the like were improved through inclusion control, precipitation refinement, structure homogenization, formation of a single structure, a decrease in the hardness difference between structures, and the like. However, with the above techniques alone, the main structure composition will be limited. Furthermore, in a case in which Nb, Ti, and the like which are typical elements that significantly contribute to an increase in strength are added in order to increase the strength, since there is a concern that anisotropy may increase extremely, it is necessary to sacrifice other forming factors or limit the direction in which blanks are taken before forming, thereby limiting uses.

Therefore, the present inventors newly paid attention to the influence of the texture in a steel sheet in order to improve hole expanding properties or bending workability, and investigated and studied the effects in detail. As a result, the inventors clarified that local deformability is drastically improved by controlling the X-ray random intensity ratio of the respective orientations of a specific crystal orientation group from a hot rolling process, and, furthermore, controlling the r value in a rolling direction, the r value in the direction perpendicular to the rolling direction, and the r value in a direction that forms an angle of 30° or 60° with respect to the rolling direction.

The present invention was constituted based on the above finding, and the present invention employed the following measures in order to solve the above problems and achieve the relevant object.

(1) That is, a hot-rolled steel sheet according to an aspect of the present invention contains, by mass %, C: 0.0001% to 0.40%, Si: 0.001% to 2.5%, Mn: 0.001% to 4.0%, P: 0.001% to 0.15%, S: 0.0005% to 0.03%, Al: 0.001% to 2.0%, N: 0.0005% to 0.01%, and O: 0.0005% to 0.01%, and further contains one or two or more of Ti: 0.001% to 0.20%, Nb: 0.001% to 0.20%, V: 0.001% to 1.0%, W: 0.001% to 1.0%, B: 0.0001% to 0.0050%, Mo: 0.001% to 1.0%, Cr: 0.001% to 2.0%, Cu: 0.001% to 2.0%, Ni: 0.001% to 2.0%, Co: 0.0001% to 1.0%, Sn: 0.0001% to 0.2%, Zr: 0.0001% to 0.2%, As: 0.0001% to 0.50%, Mg: 0.0001% to 0.010%, Ca: 0.0001% to 0.010%, and REM: 0.0001% to 0.1% and balance composed of iron and inevitable impurities, in which an average value of an X-ray random intensity ratio of a {100} <011> to {223} <110> orientation group at least in a thickness central portion that is in a sheet thickness range of 5/8 to 3/8 from a steel sheet surface is 1.0 to 6.0, an X-ray random intensity ratio of a {332} <113> crystal orientation is 1.0 to 5.0, rC which is an r value in a direction perpendicular to a rolling direction is 0.70 to 1.10, and r30 which is an r value in a direction that forms an angle of 30° with respect to the rolling direction is 0.70 to 1.10.

(2) In addition, in the aspect according to the above (1), furthermore, rL which is an r value in the rolling direction may be 0.70 to 1.10, and r60 which is an r value in a direction that forms an angle of 60° with respect to the rolling direction may be 0.70 to 1.10.

(3) In addition, in the aspect according to the above (1) or (2), furthermore, one or two or more of bainite, martensite, pearlite, and austenite are present in the hot-rolled steel sheet, and a proportion of grains having a dL/dt which is a ratio of a length in the rolling direction dL to a length of a sheet thickness direction dt of 3.0 or less in crystal grains in the structures may be 50% to 100%.

(4) In the aspect according to the above (1) or (2), an area proportion of crystal grains having a grain diameter of more than 20 μm in a total area of a metallic structure in the hot-rolled steel sheet may be 0% to 10%.

(5) A cold-rolled steel sheet according to an aspect of the present invention is a cold-rolled steel sheet obtained through cold rolling of the hot-rolled steel sheet according to the above (1), in which the average value of the X-ray random intensity ratio of a {100} <011> to {22} <110> orientation group at least in the thickness central portion is 1.0 to less than 4.0, the X-ray random intensity ratio of a {332} <113> crystal orientation is 1.0 to 5.0, rC which is the r value in a direction perpendicular to the rolling direction is 0.70 to 1.10, and r30 which is the r value in a direction that forms an angle of 30° with respect to the rolling direction is 0.70 to 1.10.

(6) In the aspect according to the above (5), rL which is an r value in the rolling direction may be 0.70 to 1.10, and r60 which is an r value in a direction that forms an angle of 60° with respect to the rolling direction may be 0.70 to 1.10.

(7) In the aspect according to the above (5) or (6), furthermore, one or two or more of bainite, martensite, pearlite, and austenite are present in the cold-rolled steel sheet, and a proportion of grains having a dL/dt which is a ratio of a length in the rolling direction dL to a length of a sheet thickness direction dt of 3.0 or less in crystal grains in the structures may be 50% to 100%.

(8) In the aspect according to the above (5) or (6), an area proportion of crystal grains having a grain diameter of more than 20 μm in a total area of a metallic structure in the cold-rolled steel sheet may be 0% to 10%.

(9) A galvanized steel sheet according to an aspect of the present invention is a galvanized steel sheet further having a galvanized coating layer or a galvanealed coating layer on a surface of the cold-rolled steel sheet according to the above (5), in which the average value of the X-ray random intensity ratio of a {100} <011> to {223} <110> orientation group at least in the thickness central portion is 1.0 to less than 4.0, the X-ray random intensity ratio of a {332} <113> crystal orientation is 1.0 to 5.0, rC which is the r value in a direction perpendicular to the rolling direction is 0.70 to 1.10, and r30 which is the r value in a direction that forms an angle of 30° with respect to the rolling direction is 0.70 to 1.10.

(10) In the aspect according to the above (9), rL which is an r value in the rolling direction may be 0.70 to 1.10, and r60 which is an r value in a direction that forms an angle of 60° with respect to the rolling direction may be 0.70 to 1.10.

(11) In a method of manufacturing the hot-rolled steel sheet according to an aspect of the present invention, first hot rolling in which an ingot or slab which contains, by mass %, C: 0.0001% to 0.40%, Si: 0.001% to 2.5%, Mn: 0.001% to 4.0%, P: 0.001% to 0.15%, S: 0.0005% to 0.03%, Al: 0.001% to 2.0%, N: 0.0005% to 0.01%, and O: 0.0005% to 0.01%, and further contains one or two or more of Ti: 0.001% to 0.20%, Nb: 0.001% to 0.20%, V: 0.001% to 1.0%, W: 0.001% to 1.0%, B: 0.0001% to 0.0050%, Mo: 0.001% to 1.0%, Cr: 0.001% to 2.0%, Cu: 0.001% to 2.0%, Ni: 0.001% to 2.0%, Co: 0.0001% to 1.0%, Sn: 0.0001% to 0.2%, Zr: 0.0001% to 0.2%, As: 0.0001% to 0.50%, Mg: 0.0001% to 0.010%, Ca: 0.0001% to 0.010%, and REM: 0.0001% to 0.1% and balance composed of iron and inevitable impurities is rolled at least once at a rolling reduction ratio of 20% or more is carried out in a temperature range of 1000° C. to 1200° C., an austenite grain diameter is set to 200 μm or less, second hot rolling in which a total of rolling reduction ratios is 50% or more is carried out in a temperature range of T1+30° C. to T1+200° C., third hot rolling in which a total of rolling reduction ratios is less than 30% is carried out in a temperature range of T1° C. to T1+30° C., and hot rolling ends at an Ar3 transformation temperature or higher.

Here, T1 is a temperature determined by steel sheet components, and expressed by the following formula 1.

$$T1(° C.)=850+10\times(C+N)\times Mn+350\times Nb+250\times Ti+40\times B+10\times Cr+100\times Mo+100\times V \quad \text{(Formula 1)}$$

(12) In the aspect according to the above (11), in the second hot rolling in the temperature range of T1+30° C. to T1+200° C., the ingot or slab may be rolled at least once at a rolling reduction ratio of 30% or more in a pass.

(13) In the aspect according to the above (11) or (12), in the first hot rolling in a temperature range of 1000° C. to 1200° C., the ingot or slab may be rolled at least twice at a rolling reduction ratio of 20% or more, and the austenite grain diameter may be set to 100 μm or less.

(14) In the aspect according to the above (11) or (12), in a case in which the pass in which the rolling reduction ratio is 30% or more in the temperature range of T1+30° C. to T1+200° C. is defined as a large reduction pass, a waiting time t from completion of a final pass of the large reduction pass to initiation of cooling may employ a configuration that satisfies the following formula 2.

$$t1 \le t \le t1\times 2.5 \quad \text{(Formula 2)}$$

Here, t1 is expressed by the following formula 3.

$$t1=0.001\times((Tf-T1)\times P1)^2-0.109\times((Tf-T1)\times P1)+3.1 \quad \text{(Formula 3)}$$

Here, Tf represents a temperature after the final pass, and P1 represents a rolling reduction ratio in the final pass.

(15) In the aspect according to the above (14), a temperature of the steel sheet may increase by 18° C. or less between the respective passes of the second hot rolling in the temperature range of T1+30° C. to T1+200° C.

(16) In a method of manufacturing the cold-rolled steel sheet according to an aspect of the present invention, after the end of the hot rolling at the Ar3 transformation temperature or higher, the hot-rolled steel sheet obtained through the method of manufacturing the hot-rolled steel sheet according to the above (11) is pickled, cold-rolled at 20% to 90%, annealed at a temperature range of 720° C. to 900° C. for a holding time of 1 second to 300 seconds, acceleration-cooled at a cooling rate of 10° C./s to 200° C./s from 650° C. to 500° C., and held at a temperature of 200° C. to 500° C.

(17) In the aspect according to the above (16), in the second hot rolling in the temperature range of T1+30° C. to T1+200° C., rolling at a rolling reduction ratio of 30% or more in a pass may be carried out at least once.

(18) In the aspect according to the above (16) or (17), in the first hot rolling in the temperature range of 1000° C. to 1200° C., rolling at a rolling reduction ratio of 20% or more may be carried out at least twice, and the austenite grain diameter may be set to 100 μm or less.

(19) In the aspect according to the above (16) or (17), in a case in which the pass in which the rolling reduction ratio is 30% or more in the temperature range of T1+30° C. to T1+200° C. is defined as a large reduction pass, a waiting time t from completion of a final pass of the large reduction pass to initiation of cooling may employ a configuration that satisfies the following formula 4.

$$t1 \le t \le t1\times 2.5 \quad \text{(Formula 4)}$$

Here, t1 is expressed by the following formula 5.

$$t1=0.001\times((Tf-T1)\times P1)^2-0.109\times((Tf-T1)\times P1)+3.1 \quad \text{(Formula 5)}$$

Here, Tf represents a temperature after the final pass, and P1 represents a rolling reduction ratio in the final pass.

(20) In the aspect according to the above (16) or (17), a temperature of the steel sheet may increase by 18° C. or less between the respective passes of the second hot rolling in the temperature range of T1+30° C. to T1+200° C.

(21) In a method of manufacturing the galvanized steel sheet according to an aspect of the present invention, after the end of the hot rolling at the Ar3 transformation temperature or higher, the hot-rolled steel sheet obtained through the method of manufacturing the hot-rolled steel sheet according to the above (11) is wound in a temperature range of 680° C. to room temperature, pickled, cold-rolled at 20% to 90%, heated to a temperature range of 650° C. to 900° C., annealed for a holding time of 1 second to 300 seconds, cooled at a cooling rate of 0.1° C./s to 100° C./s from 720° C. to 580° C., and a galvanizing treatment is carried out.

(22) In the aspect according to the above (21), in the second hot rolling in the temperature range of T1+30° C. to T1+200° C., rolling at a rolling reduction ratio of 30% or more in a pass may be carried out at least once.

(23) In the aspect according to the above (21) or (22), in the first hot rolling in the temperature range of 1000° C. to 1200° C., rolling at a rolling reduction ratio of 20% or more may be carried out at least twice, and the austenite grain diameter may be set to 100 μm or less.

(24) In the aspect according to the above (21) or (22), in a case in which the pass in which the rolling reduction ratio is 30% or more in the temperature range of T1+30° C. to T1+200° C. is defined as a large reduction pass, a waiting time t from completion of a final pass of the large reduction pass to initiation of cooling may employ a configuration that satisfies the following formula 6.

$$t1 \le t \le t1\times 2.5 \quad \text{(Formula 6)}$$

Here, t1 is expressed by the following formula 7.

$$t1=0.001\times((Tf-T1)\times P1)^2-0.109\times((Tf-T1)\times P1)+3.1 \quad \text{(Formula 7)}$$

Here, Tf represents a temperature after the final pass, and P1 represents a rolling reduction ratio in the final pass.

(25) In the aspect according to the above (24), a temperature of the steel sheet may increase by 18° C. or less between the respective passes of the second hot rolling in the temperature range of T1+30° C. to T1+200° C.

Advantageous Effects of Invention

According to the present invention, without limiting the main structure components, it is possible to obtain a hot-rolled steel sheet, a cold-rolled steel sheet, and a galvanized steel sheet which have a small influence on anisotropy even when elements, such as Nb or Ti, are added, are excellent in terms of local deformability, and have a small orientation dependency of formability.

DESCRIPTION OF EMBODIMENTS

Hereinafter, an embodiment of the present invention will be described in detail.

1. Regarding a Hot-Rolled Steel Sheet (1) An average value of the X-ray random intensity ratio of a {100} <011> to {223} <110> orientation group in a sheet thickness central portion that is in a sheet thickness range of ⅝ to ⅜ from the surface of a steel sheet, an X-ray random intensity ratio of a {332} <113> crystal orientation:

The average value of the X-ray random intensity ratio of a {100} <011> to {223} <110> orientation group in a sheet thickness central portion that is in a sheet thickness range of ⅝ to ⅜ from the surface of the steel sheet is a particularly important characteristic value of the embodiment.

Figure 1:
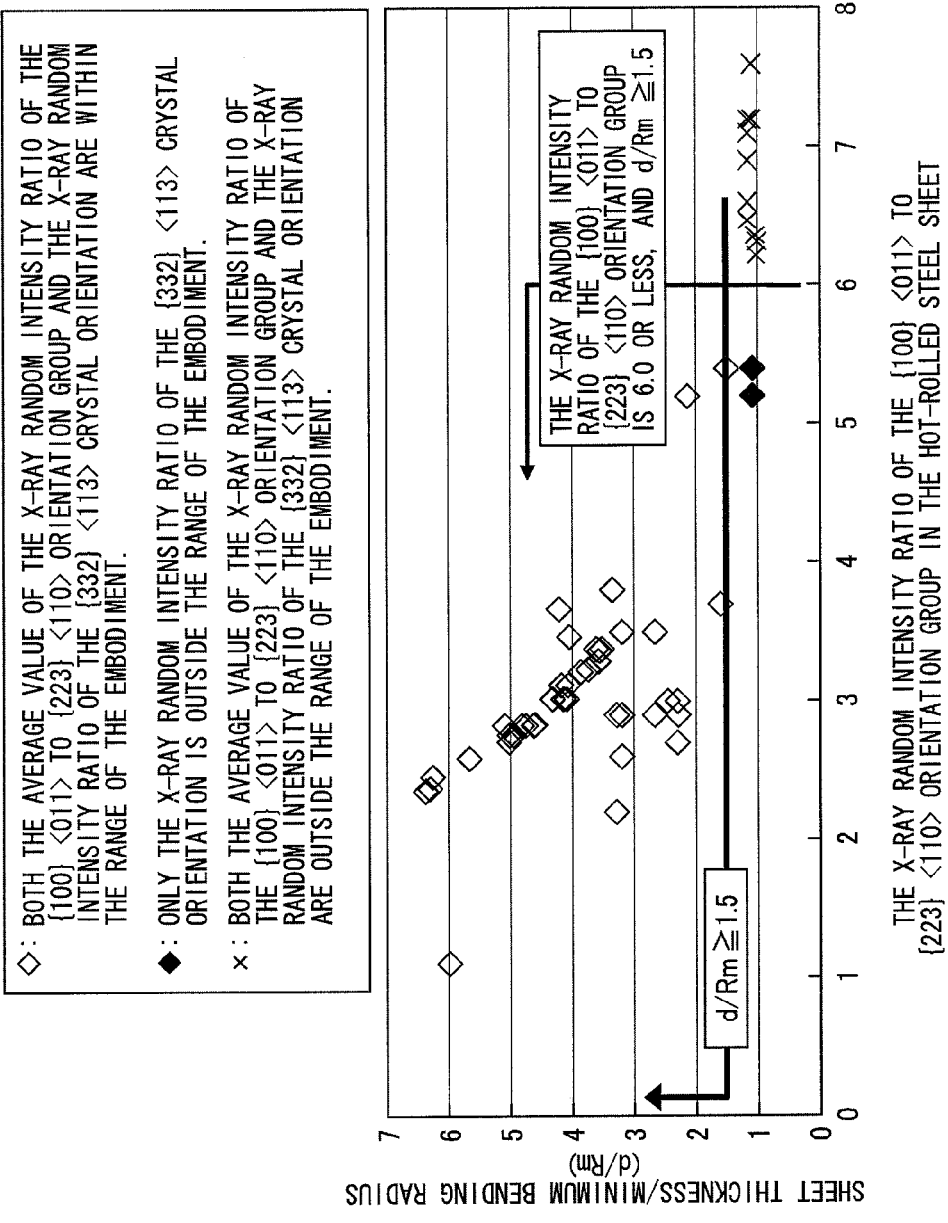
FIG. 1 is a view showing the relationship between the average value of an X-ray random intensity ratio of a {100} <011> to {223} <110> orientation group and the sheet thickness/minimum bending radius of a hot-rolled steel sheet.

As shown in FIG. 1, if the average value of the {100} <011> to {223} <110> orientation group is 6.0 or less when X-ray diffraction is carried out on a sheet surface in the sheet thickness central portion that is in a sheet thickness range of ⅝ to ⅜ from the surface of the steel sheet so that the intensity ratios of the respective orientations with respect to a random specimen are obtained, d/Rm which is a sheet thickness/minimum bending radius necessary for working of underbody components or skeleton components is 1.5 or more. Furthermore, in a case in which hole expanding properties or small limit bending characteristic is required, d/Rm is desirably 4.0 or less, and more desirably less than 3.0. When d/Rm is more than 6.0, the anisotropy of the mechanical characteristics of the steel sheet becomes extremely strong, and, consequently, even when local deformability in a certain direction improves, material qualities in directions different from the above direction significantly degrade, and therefore it becomes impossible for the sheet thickness/minimum bending radius to be greater than or equal to 1.5. In a case in which a cold-rolled steel sheet or hot-rolled strip which is a starting sheet for a galvanized steel sheet is used, the X-ray random intensity ratio is preferably less than 4.0.

Meanwhile, while it is difficult to realize in a current ordinary continuous hot rolling process, when the X-ray random intensity ratio becomes less than 1.0, there is a concern that local deformability may degrade.

Figure 2:
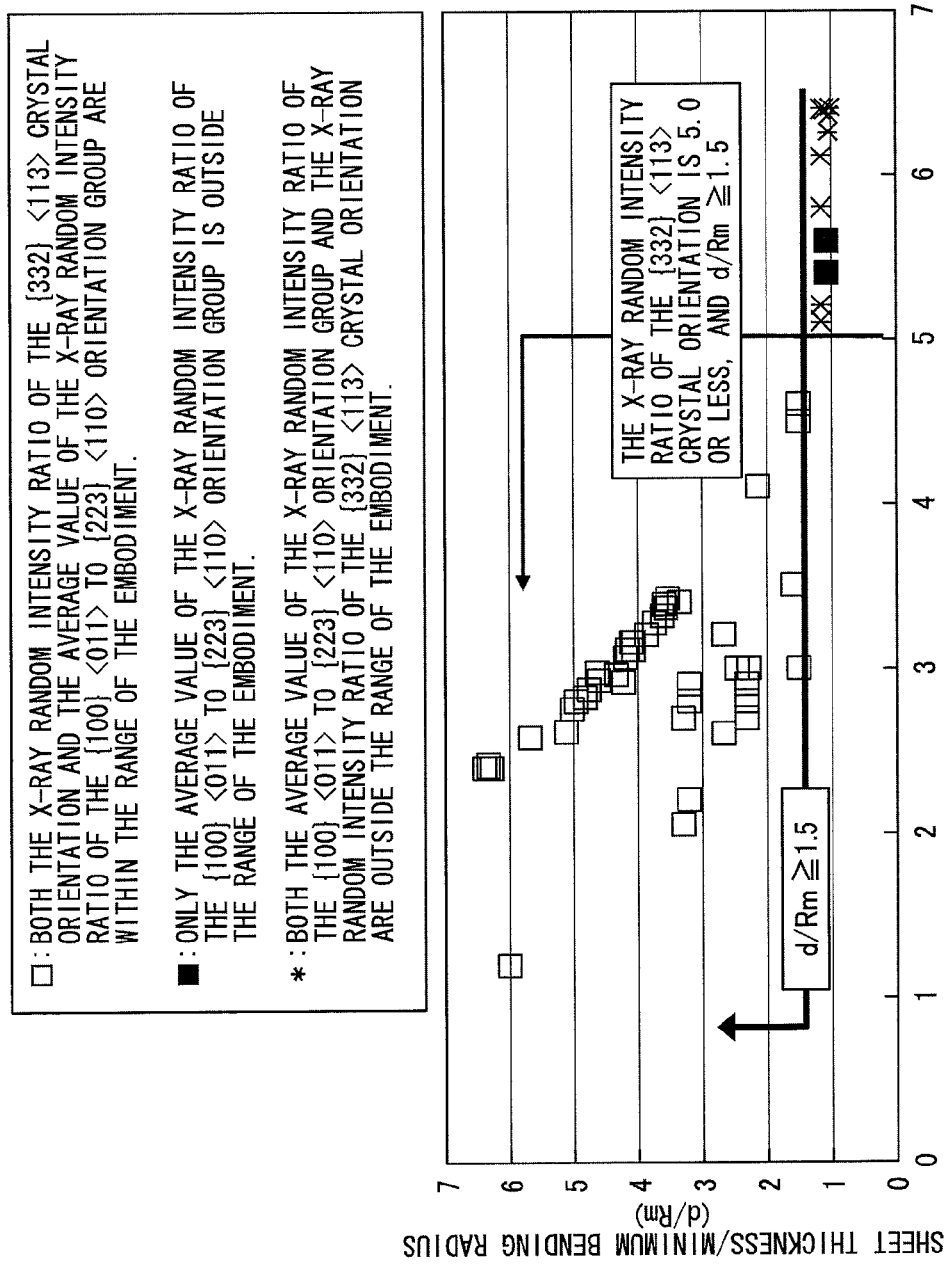
FIG. 2 is a view showing the relationship between the average value of an X-ray random intensity ratio of a {332} <113> crystal orientation and the sheet thickness/minimum bending radius of the hot-rolled steel sheet.

Furthermore, due to the same reason, if the X-ray random intensity ratio of the {332} <113> crystal orientation in the sheet thickness central portion that is in a sheet thickness range of ⅝ to ⅜ from the surface of the steel sheet is 5.0 or less as shown in FIG. 2, the sheet thickness/minimum bending radius necessary for working of underbody components is 1.5 or more. The sheet thickness/minimum bending radius is more desirably 3.0 or less. When the sheet thickness/minimum bending radius is more than 5.0, the anisotropy of the mechanical characteristics of the steel sheet becomes extremely strong, and, consequently, even when local deformability improves only in a certain direction, material qualities in directions different from the above direction significantly degrade, and therefore it becomes impossible for the sheet thickness/minimum bending radius to be greater than or equal to 1.5. Meanwhile, while it is difficult to realize in a current ordinary continuous hot rolling process, when the X-ray random intensity ratio becomes less than 1.0, there is a concern that the local deformability may degrade.

The reason is not absolutely evident why the X-ray random intensity ratio of the above crystal orientation is important for shape freezing properties during bending working, but it is assumed that the X-ray random intensity ratio of the crystal orientation has a relationship with the slip behavior of crystals during bending working.

Figure 3:
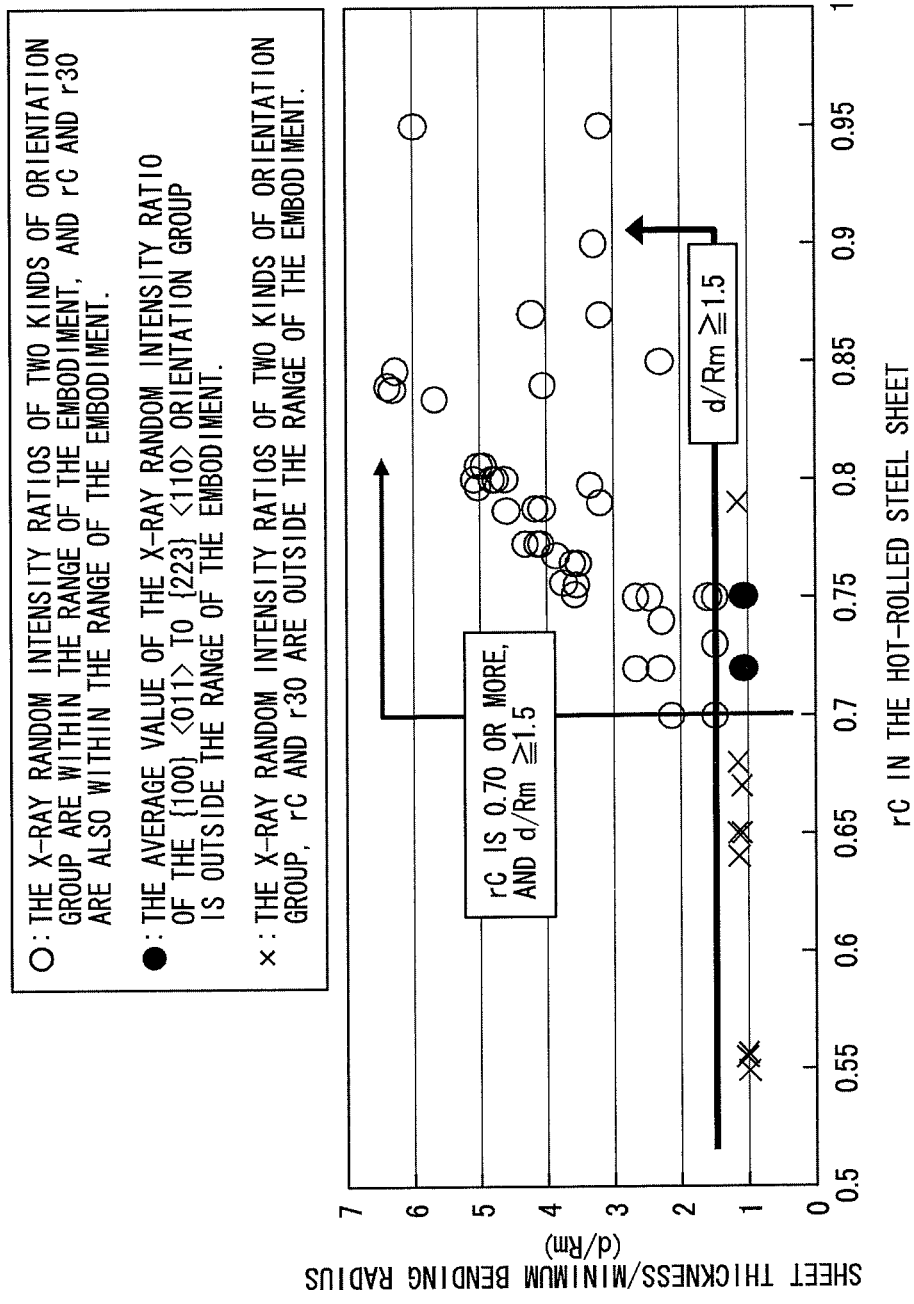
FIG. 3 is a view showing the relationship between rC which is an r value in a direction perpendicular to a rolling direction and the sheet thickness/minimum bending radius of the hot-rolled steel sheet.

(2) rC which is the r value in the direction perpendicular to the rolling direction:

rC is important in the embodiment. That is, as a result of thorough studies, the inventors found that favorable hole expanding properties or bending properties cannot always be obtained even when only the X-ray random intensity ratios of the above variety of crystal orientations are appropriate. As shown in FIG. 3, in addition to the X-ray random intensity ratio, rC should be 0.70 or more.

When the upper limit of rC is set to 1.10, more favorable local deformability can be obtained.

Figure 4:
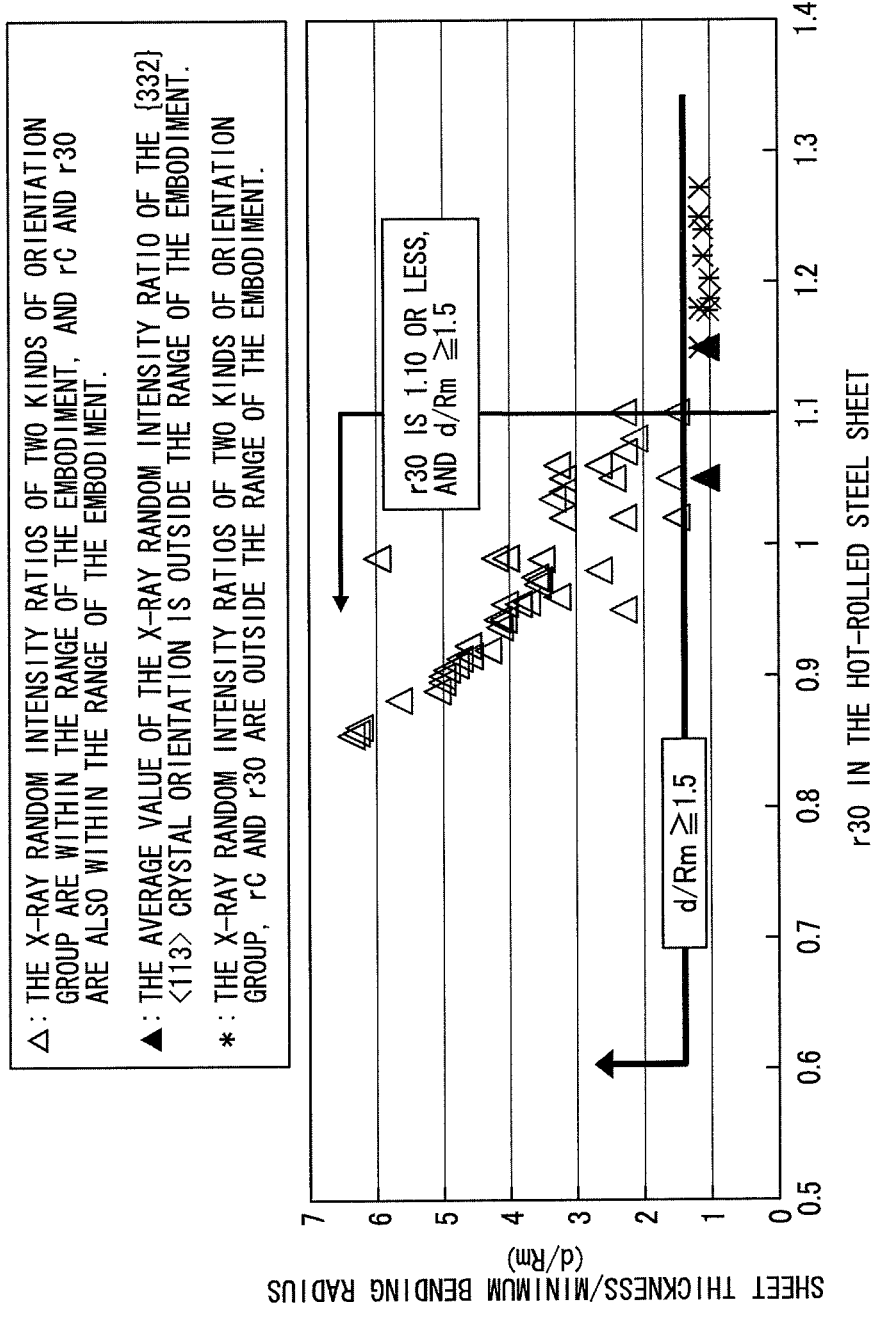
FIG. 4 is a view showing the relationship between r30 which is an r value in a direction that forms an angle of 30° with respect to the rolling direction and the sheet thickness/minimum bending radius of the hot-rolled steel sheet.

(3) r30 which is the r value in the direction that forms an angle of 30° with respect to the rolling direction:

r30 is important in the embodiment. That is, as a result of thorough studies, the inventors found that favorable local deformability cannot be always obtained even when only the X-ray random intensity ratios of the above variety of crystal orientations are appropriate. As shown in FIG. 4, in addition to the X-ray random intensity ratio, r30 should be 1.10 or less.

When the lower limit of r30 is set to 0.70, more favorable local deformability can be obtained.

Figure 5:
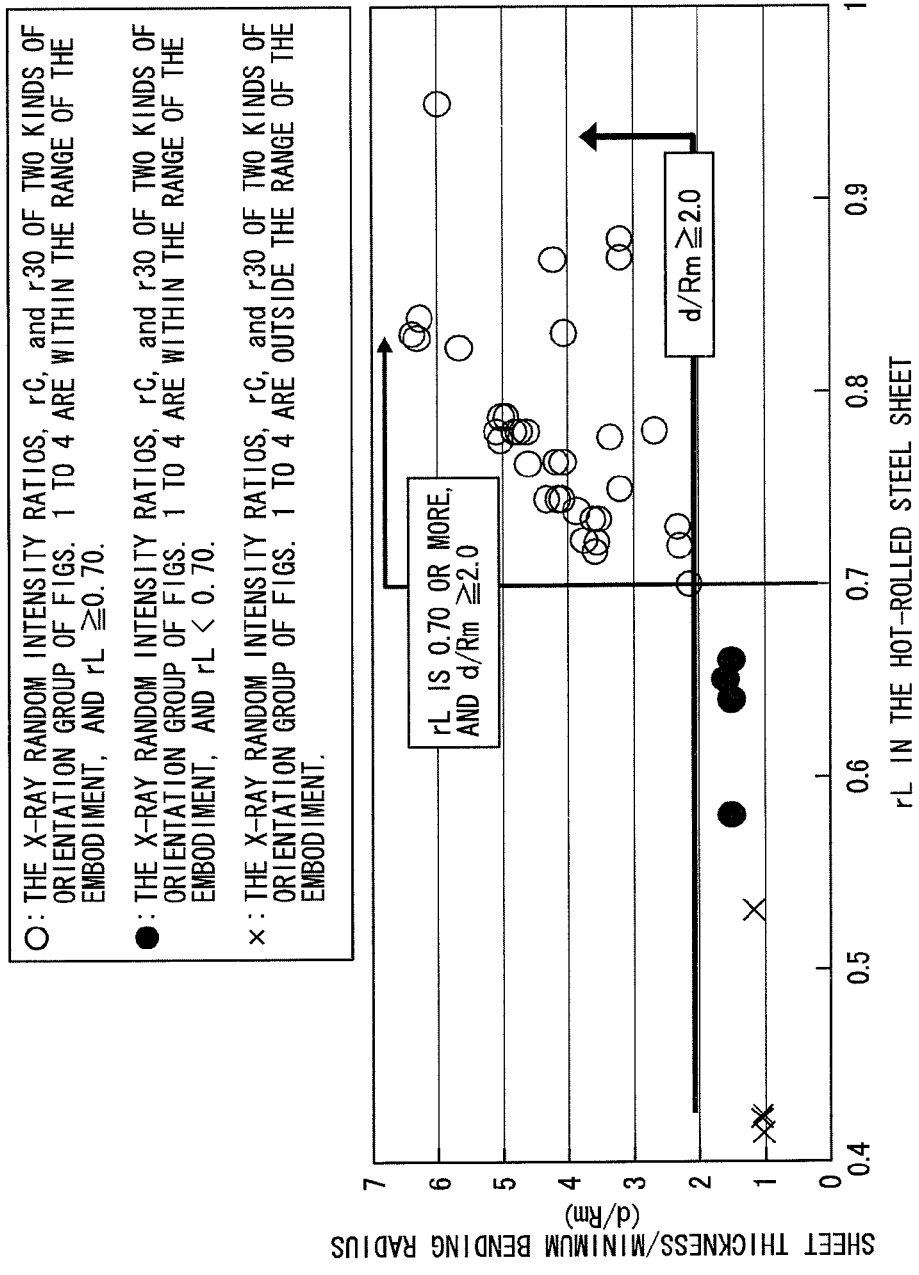
FIG. 5 is a view showing the relationship between rL which is an r value in the rolling direction and the sheet thickness/minimum bending radius of the hot-rolled steel sheet.
Figure 6:
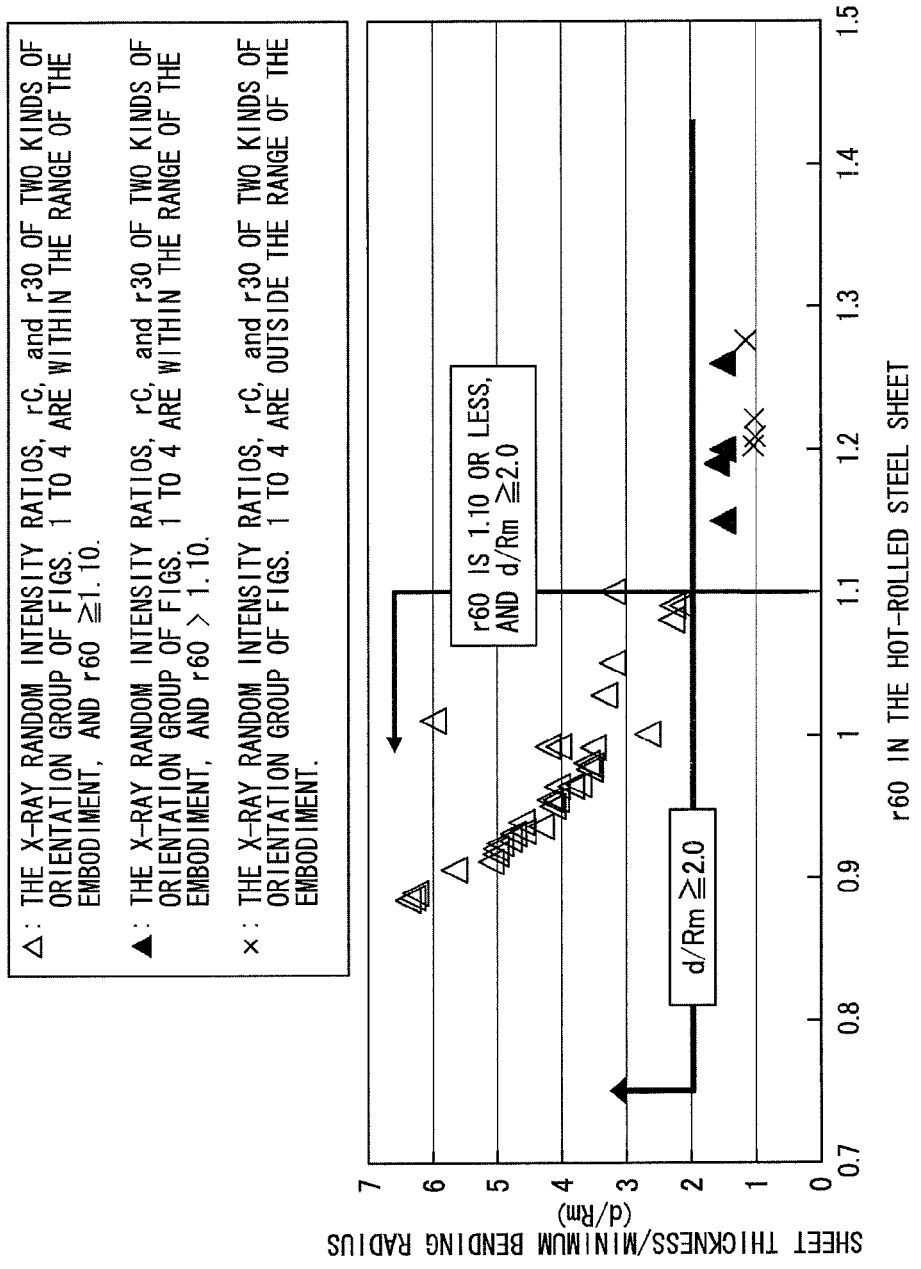
FIG. 6 is a view showing the relationship between r60 which is an r value in a direction that forms an angle of 60° with respect to the rolling direction and the sheet thickness/minimum bending radius of the hot-rolled steel sheet.

(4) rL which is the r value in the rolling direction and r60 which is the r value in the direction that forms an angle of 60° with respect to the rolling direction:

Furthermore, as a result of thorough studies, the inventors found that, in addition to the X-ray random intensity ratios of the above variety of crystal orientations, rC, and r30, when, furthermore, rL in the rolling direction is 0.70 or more, and r60 which is the r value in the direction that forms an angle of 60° with respect to the rolling direction is 1.10 or less as shown in FIGS. 5 and 6, the sheet thickness/minimum bending radius 2.0 is satisfied.

When the rL value and the r60 value are set to 1.10 or less and 0.70 or more, respectively, more favorable local deformability can be obtained.

Meanwhile, generally, it is known that there is a correlation between a texture and the r value, but in the hot-rolled steel sheet according to the embodiment, the limitation on the X-ray intensity ratio of the crystal orientation and the limitation on the r value are not identical to each other, and favorable local deformability cannot be obtained as long as both limitations are satisfied at the same time.

(5) dL/dt ratios of bainite, martensite, pearlite, and austenite grains:

As a result of further investigating local deformability, the inventors found that, when the texture and the r value are satisfied, and further the equiaxed properties of crystal grains are excellent, the direction dependency of bending working almost disappears. As an index that indicates the equiaxed properties, the fraction of grains that have a dL/dt which is a ratio of dL which is the length of crystal grains in the structure in the hot-rolling direction to dt which is the length in the sheet thickness direction of 3.0 or less, and are excellent in terms of equiaxed properties is 50% to 100% in the crystal grains. When the fraction is less than 50%, bending properties R in an L direction which is the rolling direction or a C direction which is the direction perpendicular to the rolling direction degrade.

The respective structures can be determined as follows.

Pearlite is specified through structure observation using an optical microscope. Next, a crystal structure is determined using an electron back scattering diffraction (EBSD), and a crystal having an fcc structure is determined to be austenite. Ferrite, bainite, and martensite having a bcc structure can be recognized through Kernel Average Misorientation with which EBSP-OIM™ is equipped, that is, through a KAM method. In the KAM method, among measurement data, the orientation differences of 6 closest pixels of a regular hexagonal pixel, of 12 second closest pixels outside the closest pixels, or of 18 third closest pixels outside the second closest pixels are averaged, and a value is computed by carrying out calculation in which the averaged value is used as the value of the central pixel on the respective pixels. A map that represents an orientation change in a grain can be prepared by carrying out the calculation within grain boundaries. The map represents a distribution of strain based on the local orientation change in the grain.

In the examples of the present invention, as a condition under which the orientation difference between adjacent pixels in EBSP-OIM™ is calculated, the orientation difference was set to 5° or less with respect to the third closest pixel, and a pixel having an orientation difference with respect to the third closet pixel of more than 1° was defined as bainite or martensite which is a product of low-temperature transformation, and a pixel having an orientation difference with respect to the third closet pixel of 1° or less was defined as ferrite. This is because polygonal pro-eutectic ferrite transformed at a high temperature is generated through diffusion transformation, and therefore the dislocation density is small, and strain in the grain is small so that the difference of crystal orientations in the grain is small, and the ferrite volume fraction obtained from a variety of investigations that the inventors have carried out using optical microscope observation and the area fraction obtained at an orientation difference with respect to a third closest pixel of 1° measured through the KAM method, approximately match.

(6) Fraction of crystal grains having a grain diameter of more than 20 µm:

Furthermore, it was found that the bending properties are strongly influenced by the equiaxed properties of crystal grains, and the effect is large. The reasons are not evident, but it is considered that a mode of bending deformation is a mode in which strain locally concentrates, and a state in which all crystal grains are uniformly and equivalently strained is advantageous for bending properties. It is considered that, in a case in which there are many crystal grains having a large grain diameter, even when crystal grains are sufficiently made to be isotropic and equiaxed, crystal grains locally strain, and a large variation appears in the bending properties due to the orientation of the locally strained crystal grains such that degradation of the bending properties is caused. Therefore, in order to suppress localization of strain and improve the bending properties by the effect of being made isotropic and equiaxed, the area fraction of crystal grains having a grain diameter of more than 20 µm is preferably smaller, and needs to be 0% to 10%. When the area fraction is larger than 10%, the bending properties deteriorate. The crystal grains mentioned herein refer to crystal grains of ferrite, pearlite, bainite, martensite, and austenite.

The present invention is generally applicable to hot-rolled steel sheets, and, as long as the above limitations are satisfied, local deformability, such as the bending workability or hole expanding properties of a hot-rolled steel sheet, drastically improves without the limitation on combination of structures.

2. Regarding a Cold-Rolled Steel Sheet (1) An average value of the X-ray random intensity ratio of a {100} <011> to {223} <110> orientation group in a sheet thickness central portion that is in a sheet thickness range of ⅝ to ⅜ from the surface of a steel sheet, and an X-ray random intensity ratio of a {332} <113> crystal orientation:

The average value of the X-ray random intensity ratio of a {100} <011> to {223} <110> orientation group in a sheet thickness central portion that is in a sheet thickness range of ⅝ to ⅜ from the surface of the steel sheet is particularly important the embodiment.

Figure 7:
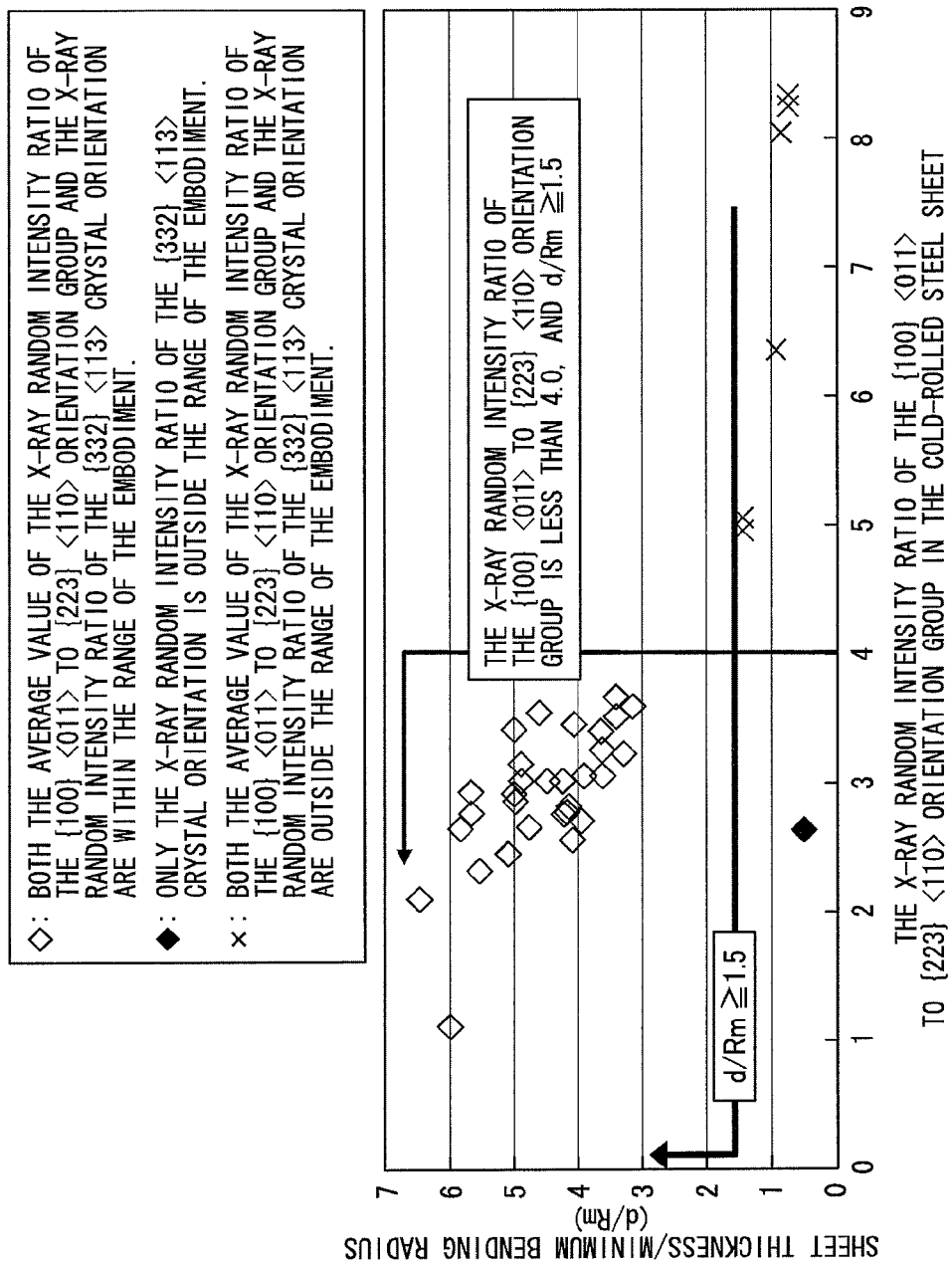
FIG. 7 is a view showing the relationship between the average value of the X-ray random intensity ratio of a {100} <011> to {22} <110> orientation group and the sheet thickness/minimum bending radius of a cold-rolled steel sheet.

As shown in FIG. 7, if the average value of the {100} <011> to {223} <110> orientation group is less than 4.0 when an X-ray diffraction is carried out on a sheet surface in the sheet thickness central portion that is in a sheet thickness range of ⅝ to ⅜ from the surface of the steel sheet so that the intensity ratios of the respective orientations with respect to a random specimen are obtained, a sheet thickness/minimum bending radius necessary for working of skeleton components is 1.5 or more. Furthermore, in a case in which hole expanding properties or a small limit bending characteristic is required, the sheet thickness/minimum bending radius is desirably less than 3.0. When the sheet thickness/minimum bending radius is 4.0 or more, the anisotropy of the mechanical characteristics of the steel sheet becomes extremely strong, and, consequently, even when local deformability in a certain direction improves, material qualities in directions different from the above direction significantly degrade, and therefore it becomes impossible for the sheet thickness/minimum bending radius to be greater than or equal to 1.5.

Meanwhile, while it is difficult to realize in a current ordinary continuous hot rolling process, when the X-ray random intensity ratio becomes less than 1.0, there is a concern that local deformability may degrade.

Figure 8:
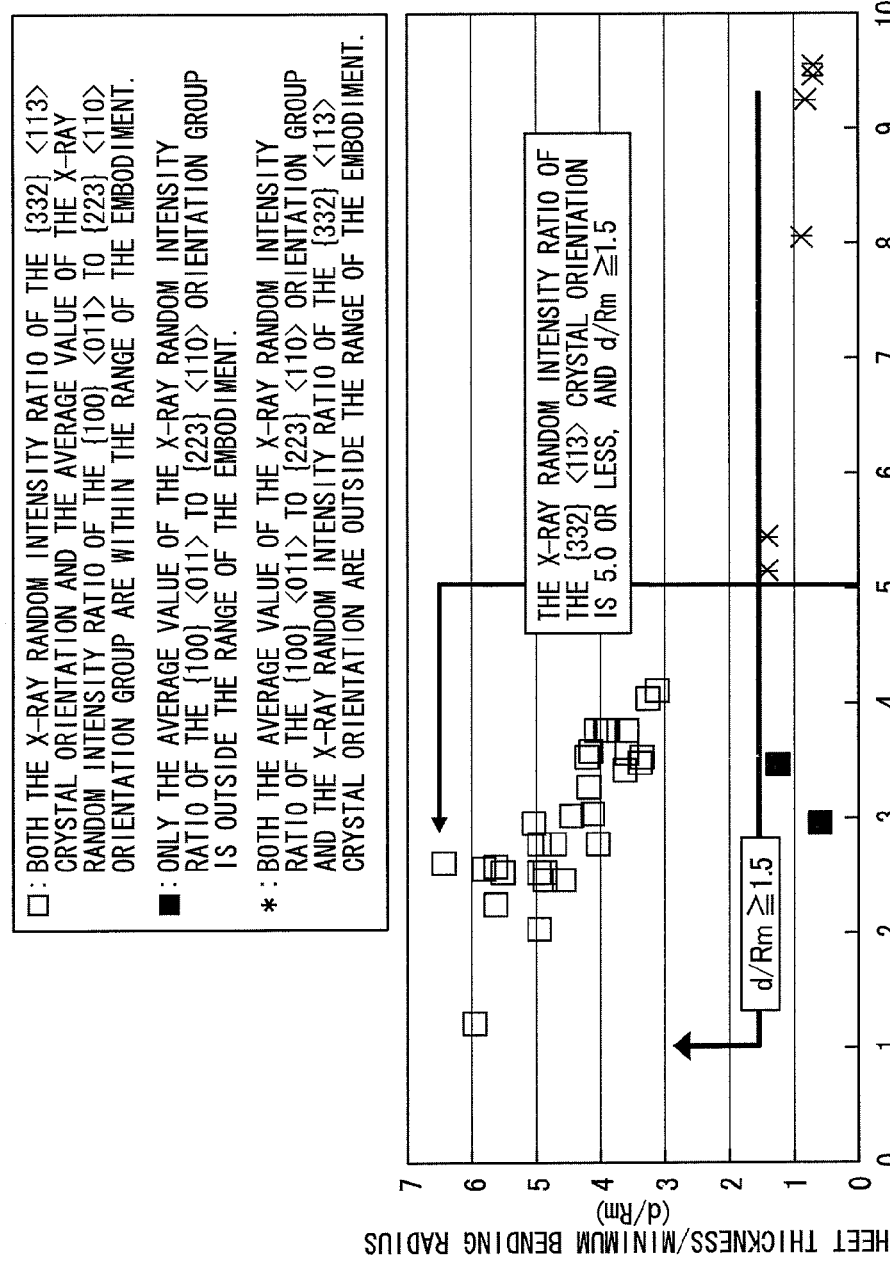
FIG. 8 is a view showing the relationship between the average value of the X-ray random intensity ratio of the {332} <113> crystal orientation and the sheet thickness/minimum bending radius of the cold-rolled steel sheet.

Furthermore, due to the same reason, if the X-ray random intensity ratio of the {332} <113> crystal orientation in the sheet thickness central portion that is in a sheet thickness range of ⅝ to ⅜ from the surface of the steel sheet is 5.0 or less as shown in FIG. 8, the sheet thickness/minimum bending radius necessary for working of skeleton components is 1.5 or more. The sheet thickness/minimum bending radius is more desirably 3.0 or less. When the sheet thickness/minimum bending radius is more than 5.0, the anisotropy of the mechanical characteristics of the steel sheet becomes extremely strong, and, consequently, even when local deformability improves only in a certain direction, material qualities in directions different from the above direction significantly degrade, and therefore it becomes impossible for the sheet thickness/minimum bending radius to be greater than or equal to 1.5. Meanwhile, while it is difficult to realize in a current ordinary continuous hot rolling process, when the X-ray random intensity ratio becomes less than 1.0, there is a concern that local deformability may degrade.

The reason is not absolutely evident why the X-ray random intensity ratio of the above crystal orientation is important for shape freezing properties during bending working, but it is assumed that the X-ray random intensity ratio of the crystal orientation has a relationship with the slip behavior of crystals during bending working.

Figure 9:
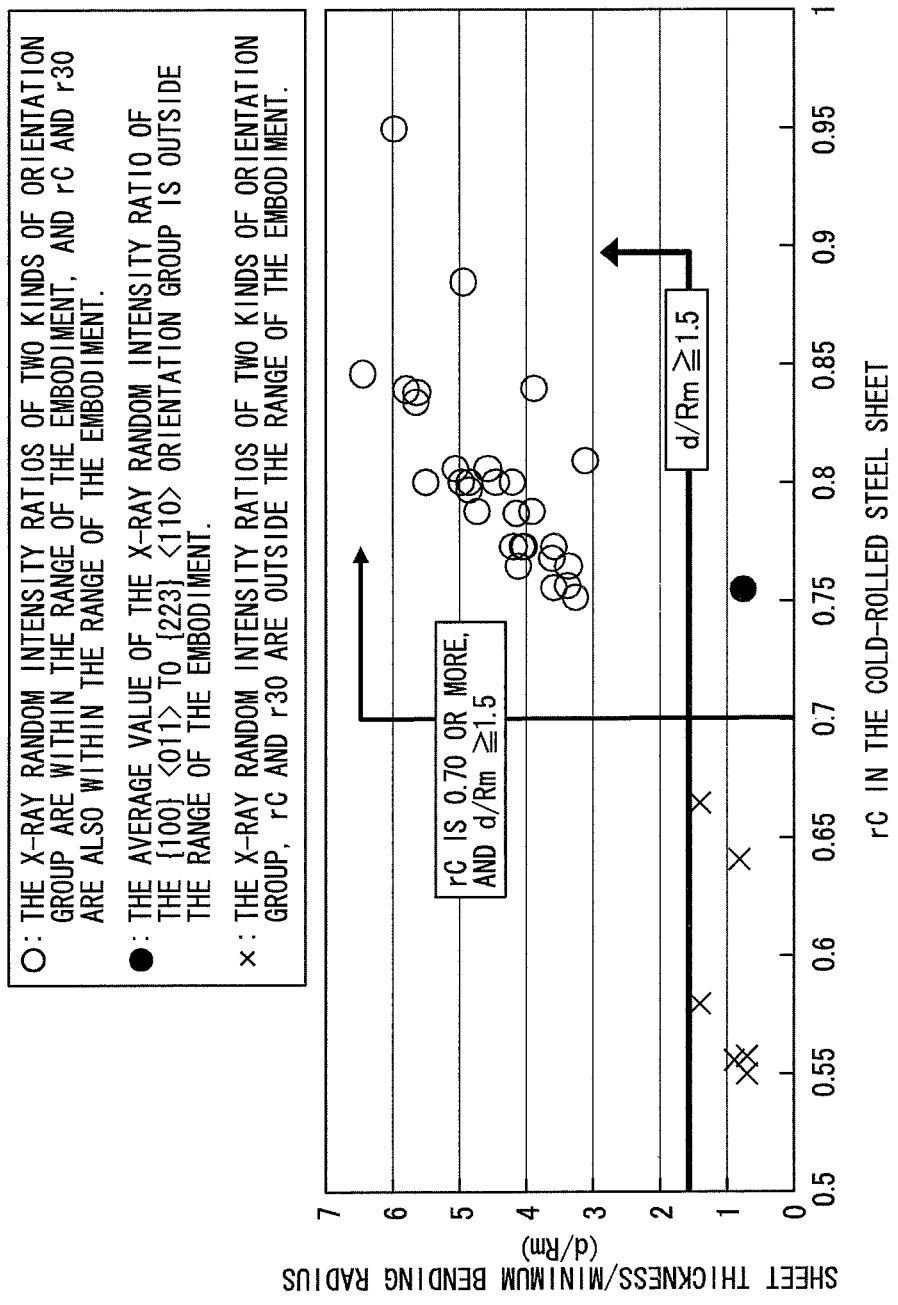
FIG. 9 is a view showing the relationship between rC which is the r value in the direction perpendicular to the rolling direction and the sheet thickness/minimum bending radius of the cold-rolled steel sheet.

(2) rC which is the r value in the direction perpendicular to the rolling direction:

rC is important in the embodiment. That is, as a result of thorough studies, the inventors found that favorable hole expanding properties or bending properties cannot be always obtained even when only the X-ray random intensity ratios of the above variety of crystal orientations are appropriate. As shown in FIG. 9, in addition to the X-ray random intensity ratio, rC should be 0.70 or more.

When the upper limit of rC is set to 1.10, more favorable local deformability can be obtained.

Figure 10:
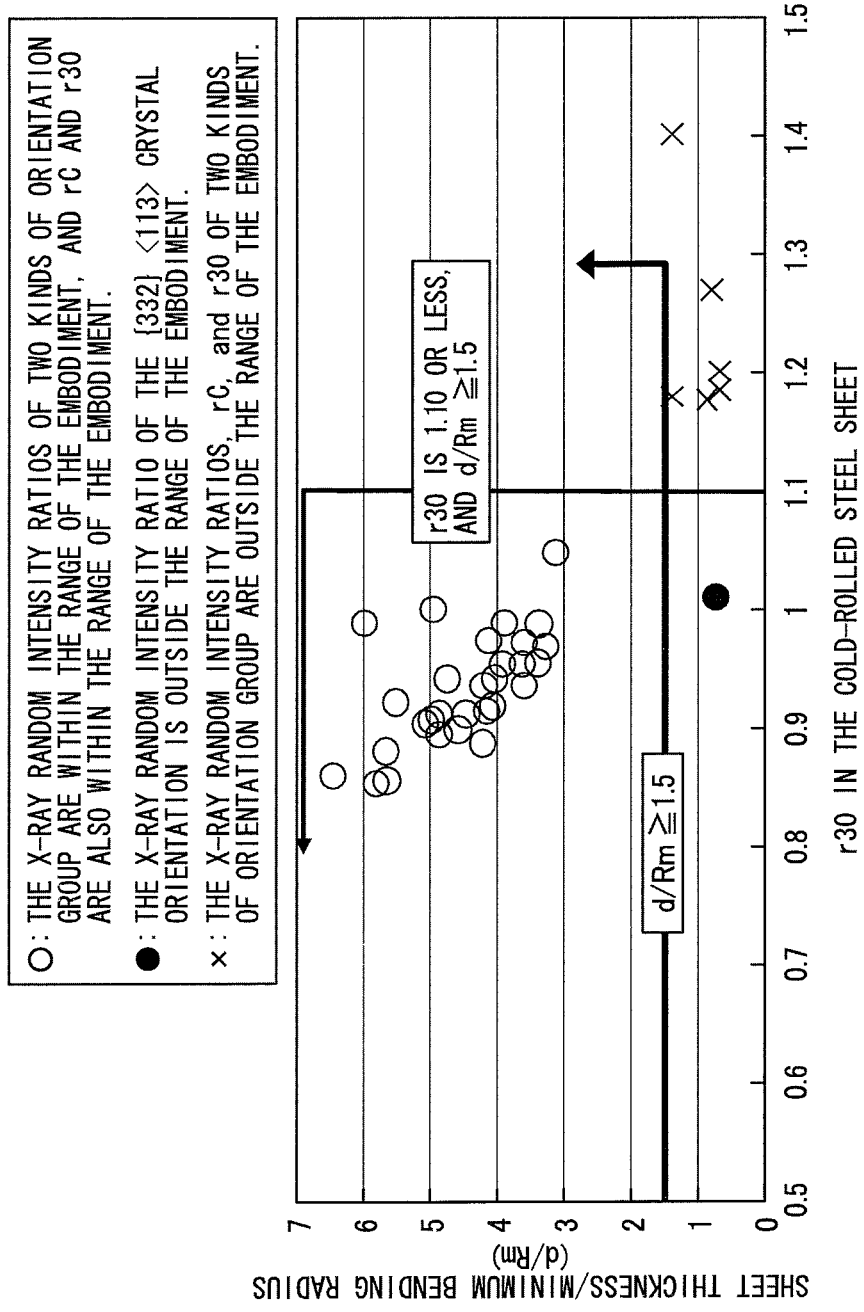
FIG. 10 is a view showing the relationship between r30 which is the r value in the direction that forms an angle of 30° with respect to the rolling direction and the sheet thickness/minimum bending radius of the cold-rolled steel sheet.

(3) r30 which is the r value in the direction that forms an angle of 30° with respect to the rolling direction:

r30 is important in the embodiment. That is, as a result of thorough studies, the inventors found that favorable local deformability cannot be always obtained even when only the X-ray random intensity ratios of the above variety of crystal orientations are appropriate. As shown in FIG. 10, in addition to the X-ray random intensity ratio, r30 should be 1.10 or less.

When the lower limit of r30 is set to 0.70, more favorable local deformability can be obtained.

Figure 11:
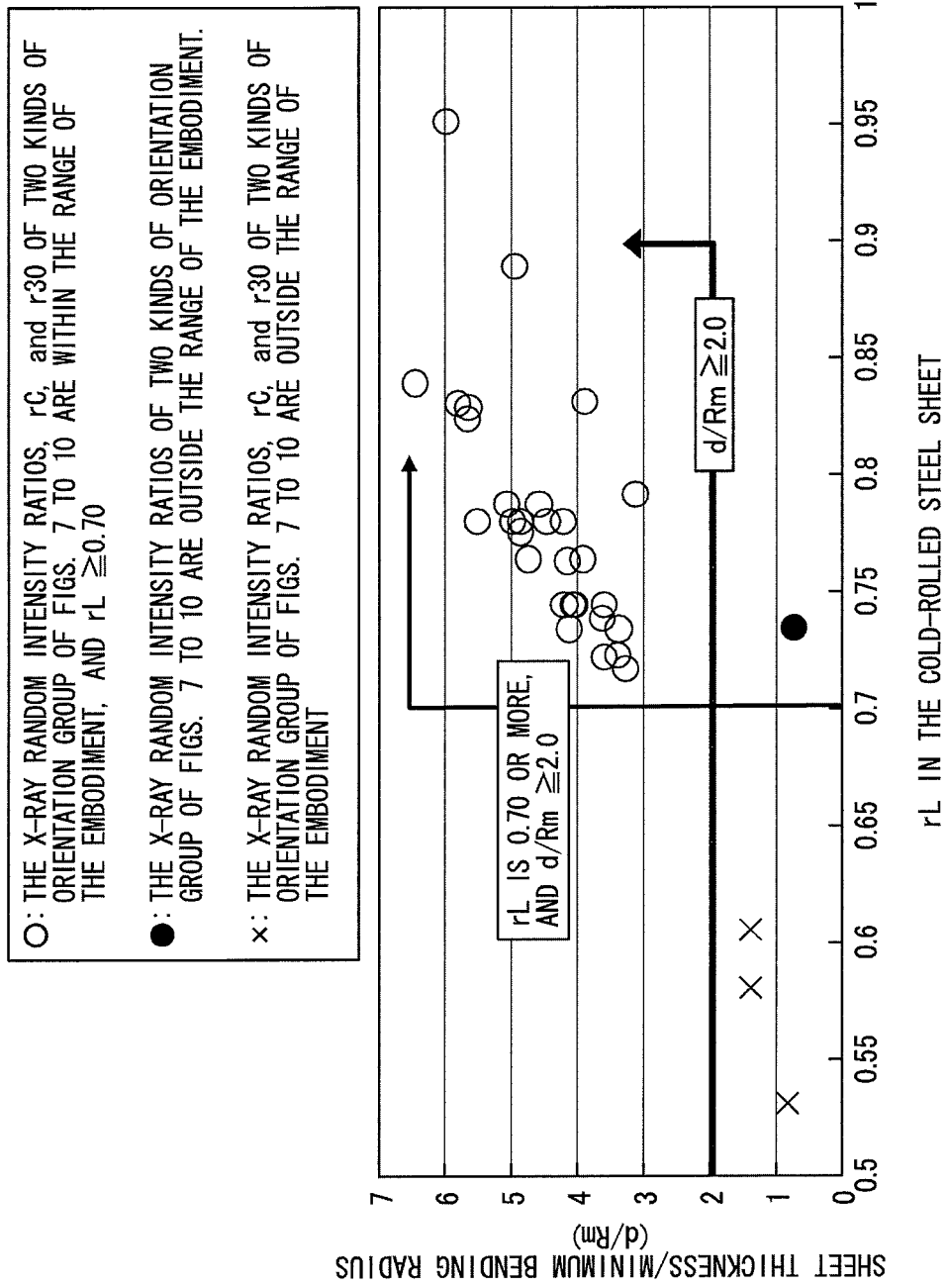
FIG. 11 is a view showing the relationship between rL which is the r value in the rolling direction and the sheet thickness/minimum bending radius of the cold-rolled steel sheet.
Figure 12:
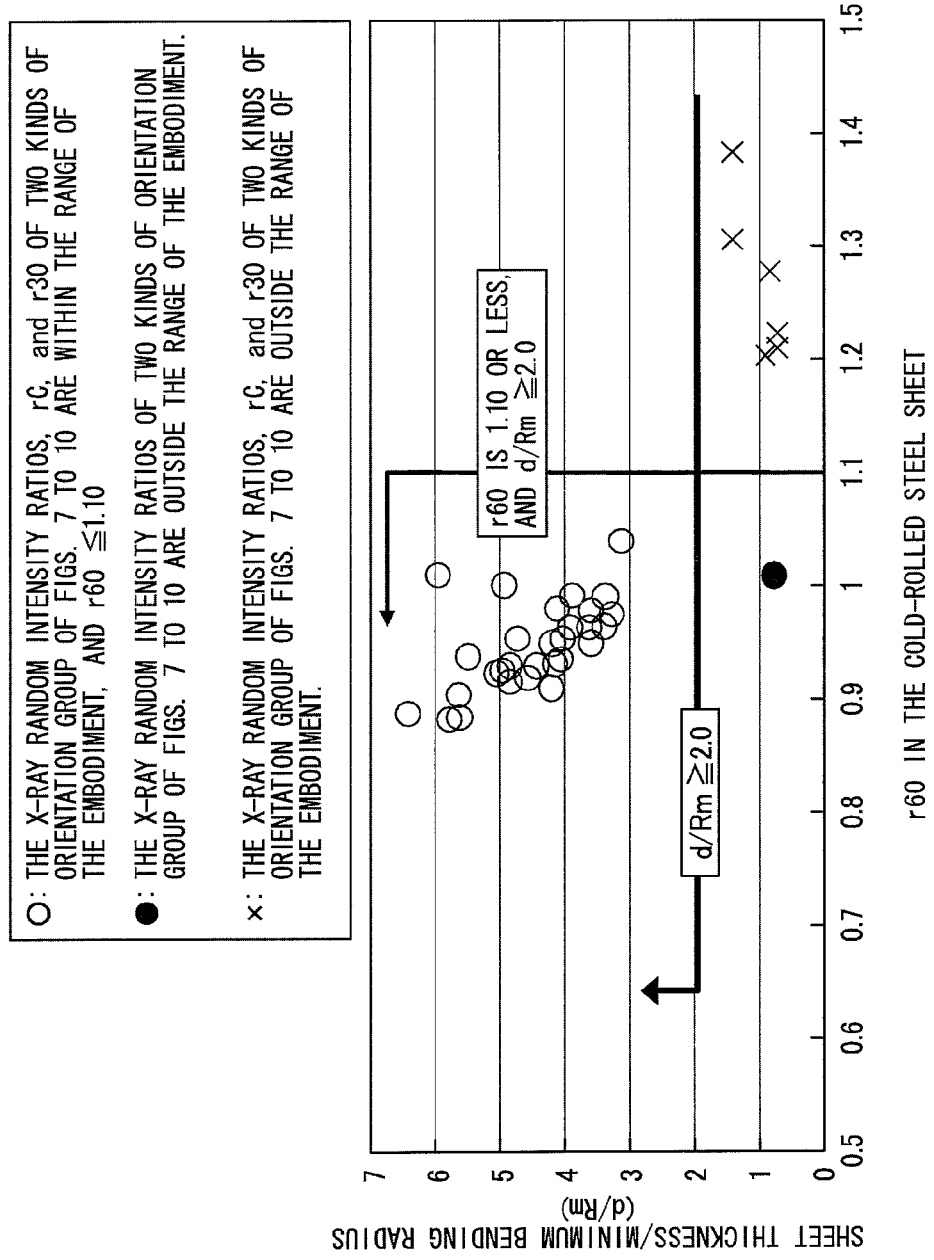
FIG. 12 is a view showing the relationship between r60 which is the r value in the direction that forms an angle of 60° with respect to the rolling direction and the sheet thickness/minimum bending radius of the cold-rolled steel sheet.

(4) rL which is the r value in the rolling direction and r60 which is the r value in the direction that forms an angle of 60° with respect to the rolling direction:

Furthermore, as a result of thorough studies, the inventors found that, in addition to the X-ray random intensity ratios of the above variety of crystal orientations, rC, and r30, when, furthermore, rL in the rolling direction is 0.70 or more, and r60 which is the r value in the direction that forms an angle of 60° with respect to the rolling direction is 1.10 or less as shown in FIGS. 11 and 12, the sheet thickness/minimum bending radius is equal to or greater than 2.0.

When the rL and the r60 are set to 1.10 or less and 0.70 or more respectively, more a favorable local deformability can be obtained.

Meanwhile, generally, it is known that there is a correlation between a texture and the r value, in the cold-rolled steel sheet according to the embodiment, the limitation on the X-ray intensity ratio of the crystal orientation and the limitation on the r value are not identical to each other, and favorable local deformability cannot be obtained as long as both limitations are satisfied at the same time.

(5) dL/dt ratios of bainite, martensite, pearlite, and austenite grains:

As a result of further investigating local deformability, the inventors found that, when the texture and the r value are satisfied, and further the equiaxed properties of crystal grains are excellent, the direction dependency of bending working almost disappears. As an index that indicates the equiaxed properties, it is important that the fraction of grains that have a dL/dt, which is a ratio of dL which is the length of crystal grains in the structure in the cold-rolling direction to dt which is the length in the sheet thickness direction, of 3.0 or less, and are excellent in terms of equiaxed properties is 50% to 100% in the crystal grains. When the fraction is less than 50%, bending properties R in an L direction which is the rolling direction or in a C direction which is the direction perpendicular to the rolling direction degrade.

The respective structures can be determined as follows.

Pearlite is specified through structure observation using an optical microscope. Next, a crystal structure is determined using electron back scattering diffraction (EBSD), and a crystal having an fcc structure is determined to be austenite. Ferrite, bainite, and martensite having a bcc structure can be recognized through Kernel Average Misorientation with which EBSP-OIM™ is equipped, that is, through a KAM method. In the KAM method, among measurement data, the orientation differences of 6 closest pixels of a regular hexagonal pixel, of 12 second closest pixels outside the closest pixels, or of 18 third closest pixels outside the second closest pixels are averaged, and a value is computed by carrying out calculation in which the averaged value is used as the value of the central pixel on the respective pixels. A map that represents an orientation change in a grain can be prepared by carrying out the calculation within grain boundaries. The map represents a distribution of strain based on the local orientation change in the grain.

In the examples of the present invention, as a condition under which the orientation difference between adjacent pixels in EBSP-OIM™, the orientation difference was set to 5° or less with respect to the third closest pixel, and a pixel having an orientation difference with respect to the third closet pixel of more than 1° was defined as bainite or martensite which is a product of low-temperature transformation, and a pixel having an orientation difference with respect to the third closet pixel of 1° or less was defined as ferrite. This is because polygonal pro-eutectic ferrite transformed at a high temperature is generated through diffusion transformation, and therefore the dislocation density is small, and strain in the grain is small so that the difference of crystal orientations in the grain is small, and the ferrite volume fraction obtained from a variety of investigations that the inventors have carried out using optical microscope observation and the area fraction obtained at an orientation difference third closest pixel of 1° measured through the KAM method approximately match.

(6) Fraction of crystal grains having a grain diameter of more than 20 μm:

Furthermore, it was found that the bending properties are strongly influenced by the equiaxed properties of crystal grains, and the effect is large. The reasons are not evident, but it is considered that bending deformation is a mode in which strain locally concentrates, and a state in which all crystal grains are uniformly and equivalently strained is advantageous for bending properties. It is considered that, in a case in which there are many crystal grains having a large grain diameter, even when crystal grains are sufficiently made to be isotropic and equiaxed, crystal grains locally strain, and a large variation appears in the bending properties due to the orientation of the locally strained crystal grains such that degradation in the bending properties is caused. Therefore, in order to suppress localization of strain and improve the bending properties through the effect of making isotropic and equiaxed, the area fraction of crystal grains having a grain diameter of more than 20 μm is preferably smaller, and needs to be 0% to 10%. When the area fraction is larger than 10%, the bending properties deteriorate. The crystal grains mentioned herein refer to crystal grains of ferrite, pearlite, bainite, martensite, and austenite.

The present invention is generally applicable to cold-rolled steel sheets, and, as long as the above limitations are satisfied, local deformability, such as the bending workability or hole expanding properties of a cold-rolled steel sheet, drastically improves without limitation on combination of structures.

Figure 13:
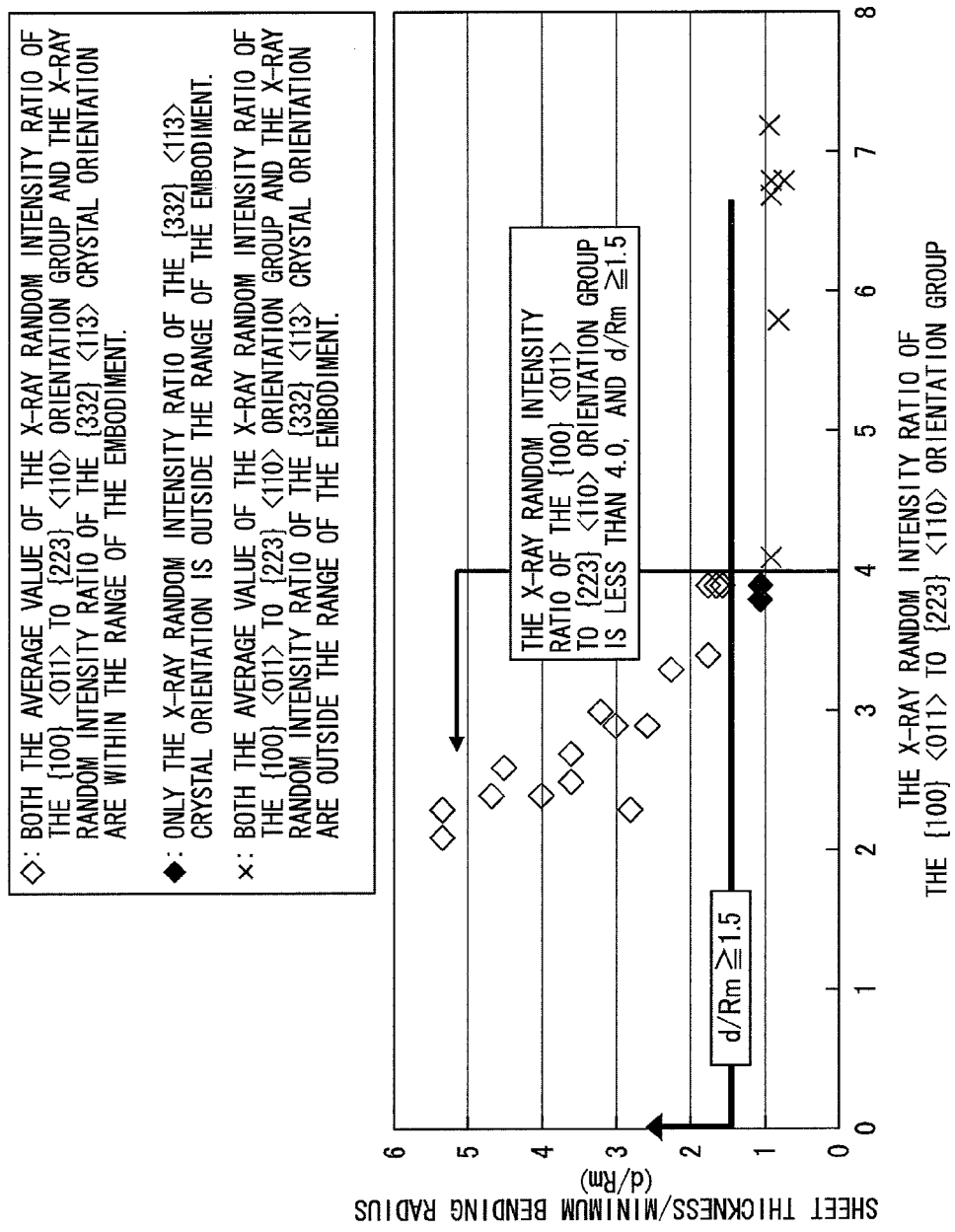
FIG. 13 is a view showing the relationship between the average value of the X-ray random intensity ratio of a {100} <011> to {22} <110> orientation group and the sheet thickness/minimum bending radius of a galvanized steel sheet.

3. Regarding a Galvanized Steel Sheet (1) An average value of the X-ray random intensity ratio of a $\{100\}$ <011> to $\{223\}$ <110> orientation group in a sheet thickness central portion that is in a sheet thickness range of ⅝ to ⅜ from the surface of a steel sheet, an X-ray random intensity ratio of a $\{332\}$ <113> crystal orientation:

The average value of the X-ray random intensity ratio of a $\{100\}$ <011> to $\{223\}$ <110> orientation group in a sheet thickness central portion that is in a sheet thickness range of ⅝ to ⅜ from the surface of the steel sheet is particularly important in the embodiment. As shown in FIG. 13, if the average value of the $\{100\}$ <011> to $\{223\}$ <110> orientation group is less than 4.0 when an X-ray diffraction is carried out on a sheet surface in the sheet thickness central portion that is in a sheet thickness range of ⅝ to ⅜ from the surface of the steel sheet so that the intensity ratios of the respective orientations with respect to a random specimen are obtained, a sheet thickness/minimum bending radius necessary for working of underbody components or skeleton components is 1.5 or more. Furthermore, in a case in which hole expanding properties or a small limit bending characteristic is required, the sheet thickness/minimum bending radius is desirably less than 3.0. When the sheet thickness/minimum bending radius is 4.0 or more, the anisotropy of the mechanical characteristics of the steel sheet becomes extremely strong, and, consequently, even when local deformability in a certain direction improves, material qualities in directions different from the above direction significantly degrade, and therefore it becomes impossible for the sheet thickness/minimum bending radius to be greater than or equal to 1.5.

Meanwhile, while it is difficult to realize in a current ordinary continuous hot rolling process, when the X-ray random intensity ratio becomes less than 1.0, there is a concern that local deformability may degrade.

Figure 14:
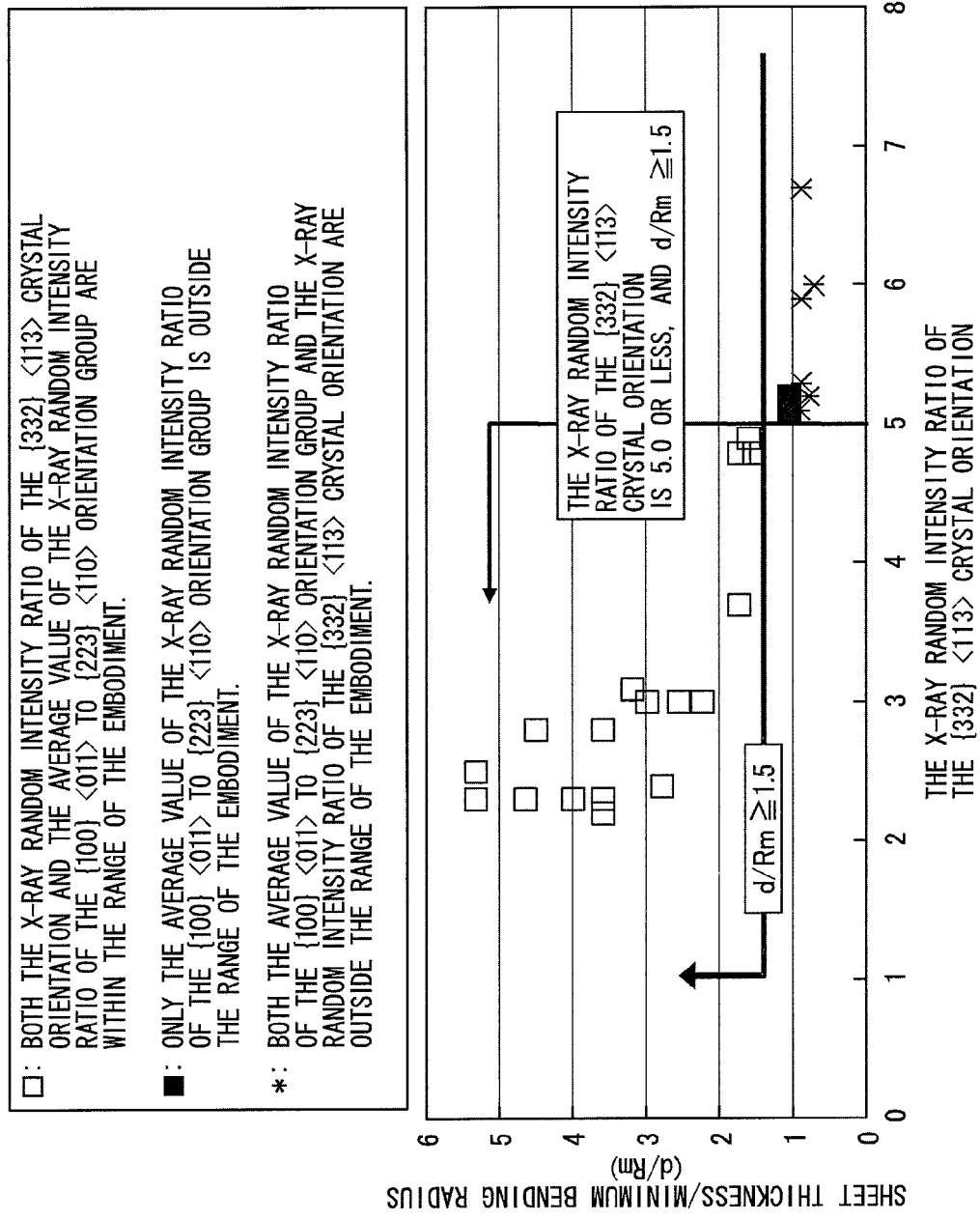
FIG. 14 is a view showing the relationship between the average value of the X-ray random intensity ratio of the {332} <113> crystal orientation and the sheet thickness/minimum bending radius of the galvanized steel sheet.

Furthermore, due to the same reason, if the X-ray random intensity ratio of the $\{332\}$ <113> crystal orientation in the sheet thickness central portion that is in a sheet thickness range of ⅝ to ⅜ from the surface of the steel sheet is 5.0 or less as shown in FIG. 14, the sheet thickness/minimum bending radius necessary for working of underbody components is 1.5 or more. The sheet thickness/minimum bending radius is more desirably 3.0 or less. When the sheet thickness/minimum bending radius is more than 5.0, the anisotropy of the mechanical characteristics of the steel sheet becomes extremely strong, and, consequently, even when local deformability improves only in a certain direction, material qualities in directions different from the above direction significantly degrade, and therefore it becomes impossible to reliably satisfy the sheet thickness/minimum bending radius 1.5. Meanwhile, while it is difficult to realize in a current ordinary continuous hot rolling process, when the X-ray random intensity ratio becomes less than 1.0, there is a concern that local deformability may degrade.

Figure 15:
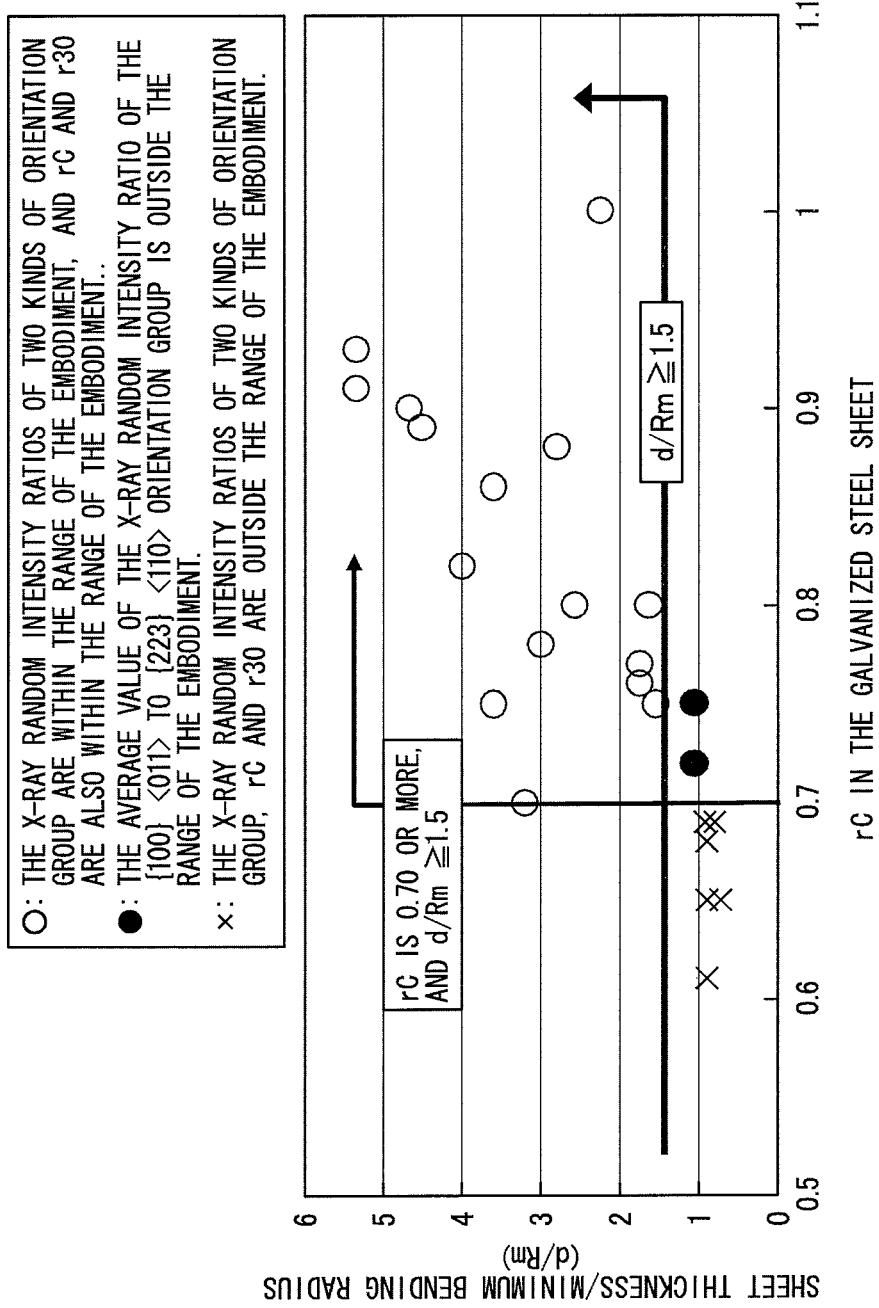
FIG. 15 is a view showing the relationship between rC which is the r value in the direction perpendicular to the rolling direction and the sheet thickness/minimum bending radius of the galvanized steel sheet.

The reason is not absolutely evident why the X-ray random intensity ratio of the above crystal orientation is important for shape freezing properties during bending working, but it is assumed that the X-ray random intensity ratio of the crystal orientation has a relationship with the slip behavior of crystals during bending working.

rC which is the r value in the direction perpendicular to the rolling direction:

rC is important in the embodiment. That is, as a result of thorough studies, the inventors found that favorable hole expanding properties or bending properties cannot be always obtained even when only the X-ray random intensity ratios of the above variety of crystal orientations are appropriate. As shown in FIG. 15, in addition to the X-ray random intensity ratio, rC should be 0.70 or more.

Figure 16:
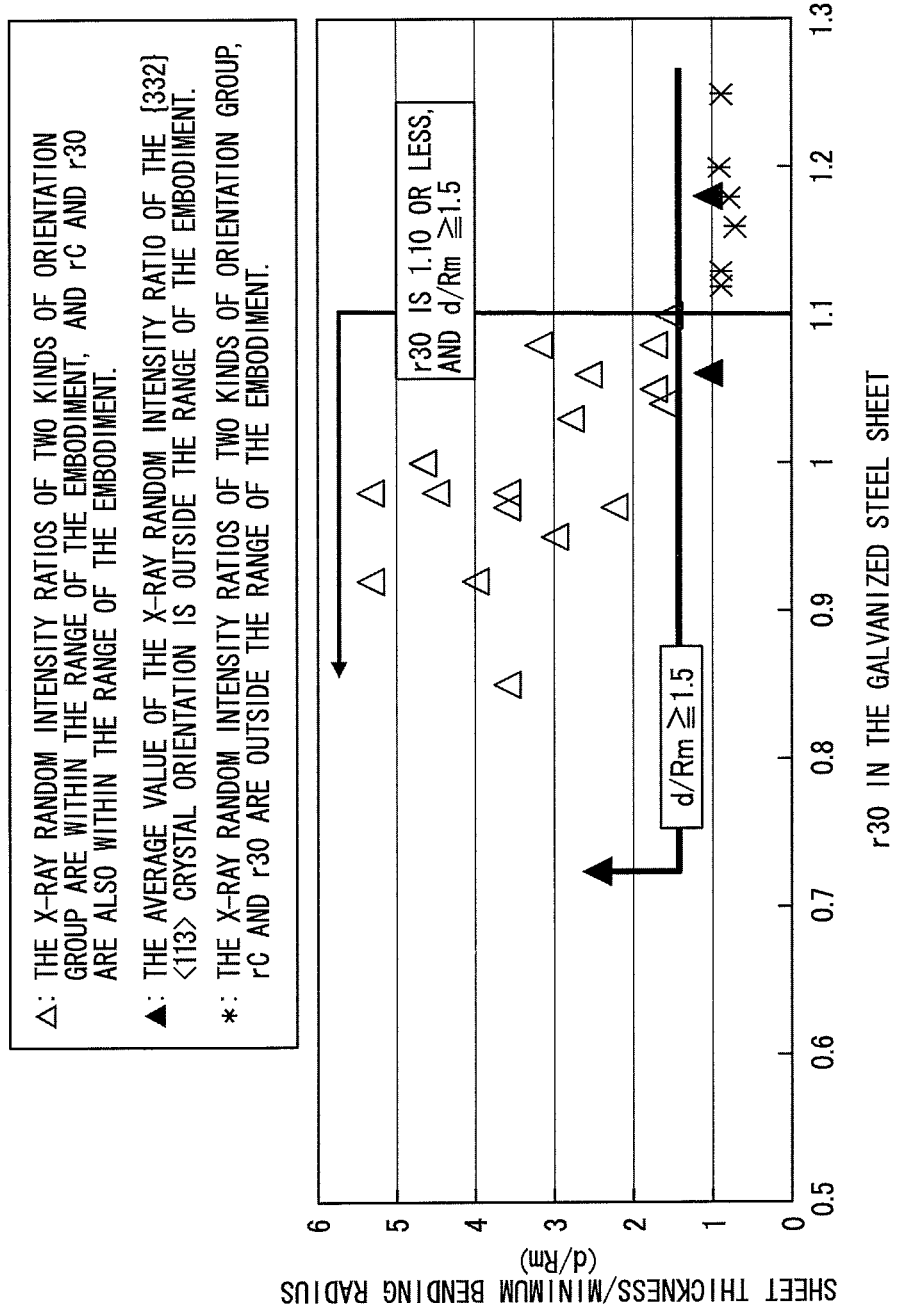
FIG. 16 is a view showing the relationship between r30 which is the r value in the direction that forms an angle of 30° with respect to the rolling direction and the sheet thickness/minimum bending radius of the galvanized steel sheet.

When the upper limit of rC is set to 1.10, more favorable local deformability can be obtained.

r30 which is the r value in the direction that forms an angle of 30° with respect to the rolling direction:

r30 is important in the embodiment. That is, as a result of thorough studies, the inventors found that favorable hole expanding properties or bending properties cannot be always obtained even when only the X-ray random intensity ratios of the above variety of crystal orientations are appropriate. As shown in FIG. 16, in addition to the X-ray random intensity ratio, r30 should be 1.10 or less.

Figure 17:
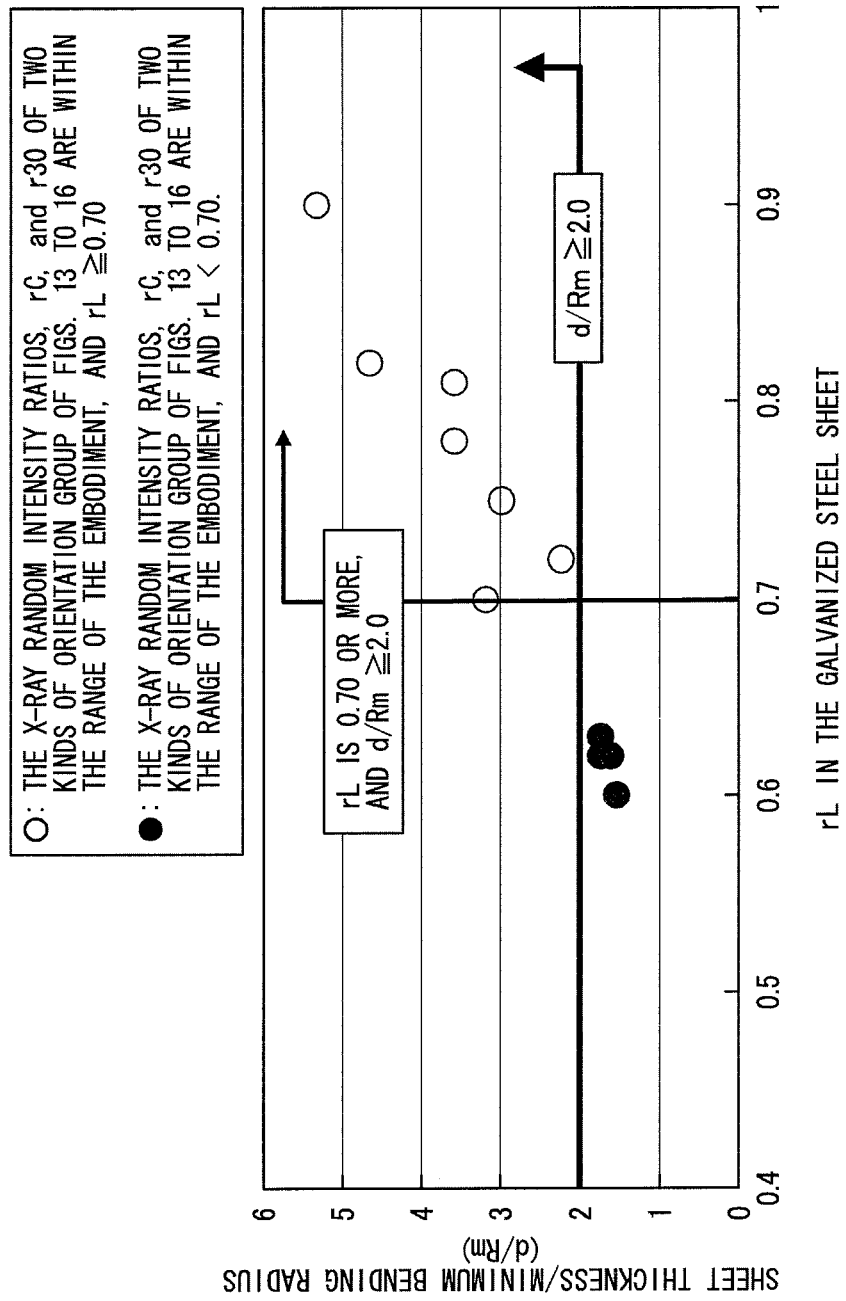
FIG. 17 is a view showing the relationship between rL which is the r value in the rolling direction and the sheet thickness/minimum bending radius of the galvanized steel sheet.
Figure 18:
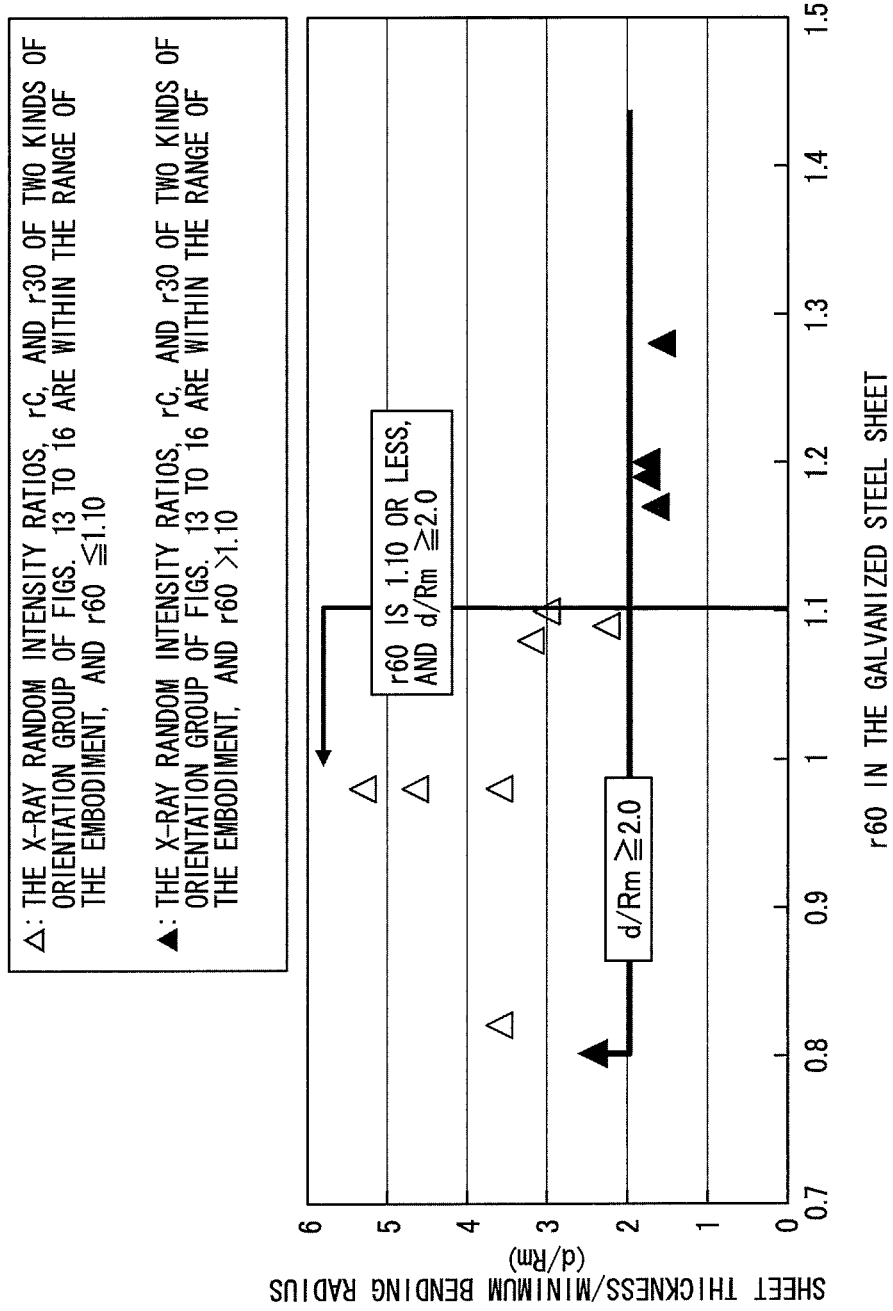
FIG. 18 is a view showing the relationship between r60 which is the r value in the direction that forms an angle of 60° with respect to the rolling direction and the sheet thickness/minimum bending radius of the galvanized steel sheet.

When the lower limit of r30 is set to 0.70, more favorable local deformability can be obtained.

rL which is the r value in the rolling direction, and r60 which is the r value in the direction that forms an angle of 60° with respect to the rolling direction:

Furthermore, as a result of thorough studies, the inventors found that, in addition to the X-ray random intensity ratios of the above variety of crystal orientations, rC, and r30, when, furthermore, rL in the rolling direction is 0.70 or more, and r60 which is the r value in the direction that forms an angle of 60° with respect to the rolling direction is 1.10 or less as shown in FIGS. 17 and 18, the sheet thickness/minimum bending radius will be greater than or equal to 2.0.

When the rL value and the r60 value are set to 1.10 or less and 0.70 or more, respectively, more favorable local deformability can be obtained.

Meanwhile, generally, it is known that there is a correlation between a texture and the r value, in the galvanized steel sheet according to the present invention, the limitation on the X-ray intensity ratio of the crystal orientation and the limitation on the r value are not identical to each other, and favorable local deformability cannot be obtained as long as both limitations are not satisfied at the same time.

The present invention is generally applicable to galvanized steel sheets, and, as long as the above limitations are satisfied, local deformability, such as the bending workability or hole expanding properties of a galvanized steel sheet, drastically improves without limitation on a combination of structures.

Main orientations included in the {100} <011> to {223} <110> orientation group are {100} <011>, {116} <110>, {114} <110>, {113} <110>, {112} <110>, {335} <110>, and {223} <110>.

The X-ray random intensity ratios of the respective orientations can be measured using a method, such as X-ray diffraction or electron back scattering diffraction (EBSD). Specifically, the X-ray random intensity may be obtained from a 3-dimensional texture computed through a vector method based on the {110} pole figure or a 3-dimensional texture computed through a series expansion method using a plurality of pole figures (preferably three or more) among {110}, {100}, {211}, and {310} pole figures.

For example, as the X-ray random intensity ratios of the respective crystal orientations in the EBSD method, the intensities of (001) [1-10], (116) [1-10], (114) [1-10], (113) [1-10], (112) [1-10], (335) [1-10], and (223) [1-10] in a φ2=45° cross section of a 3-dimensional texture may be used as they are. The 1 with bar above which indicates negative 1 is expressed by −1.

In addition, the average value of the {100} <011> to {223} <110> orientation group is the arithmetic average of the respective orientations. In a case in which the intensities of all of the above orientations cannot be obtained, the intensities may be replaced with the arithmetic average of the respective orientations of {100} <011>, {116} <110>, {114} <110>, {112} <110>, and {223} <110>.

For measurement, a specimen provided for X-ray diffraction or EBSD is subjected to mechanical polishing or the like so that the steel sheet is reduced from the surface to be a predetermined sheet thickness, next, strain is removed through chemical polishing or electrolytic polishing, and, at the same time, the specimen is adjusted through the above method so that an appropriate surface in a sheet thickness range of ⅝ to ⅜ becomes a measurement surface. The specimen is desirably taken from a location of a ¼ or ¾ width from the end portion in the sheet width direction.

It is needless to say that, when the limitation on the X-ray intensity is satisfied not only at the vicinity of ½ of the sheet thickness but also at as many thicknesses as possible, local deformability becomes more favorable. However, since, generally, the material characteristics of the entire steel sheet can be represented by measuring the sheet thickness central portion that is in a sheet thickness range of ⅝ to ⅜ from the surface of the steel sheet, the average value of the X-ray random intensity ratios of the {100} <011> to {22} <110> orientation group in the sheet thickness central portion that is in a sheet thickness range of ⅝ to ⅜ from the surface of the steel sheet and the X-ray random intensity ratio of the {332} <113> crystal orientation are specified. The crystal orientation that is represented by {hkl} <uvw> indicates that the normal direction of the sheet surface is parallel with {hkl}, and the rolling direction is parallel to <uvw>.

In addition, the respective r values are evaluated through tensile tests in which JIS No. 5 tensile test specimens are used. In the case of a high-strength steel sheet, tensile strain may be evaluated in a range of 5% to 15% using a range of uniform elongation.

Since a direction in which bending working is carried out varies by components to be worked, the direction is not particularly limited; however, according to the present invention, the same characteristics can be obtained in all bending directions.

The dL/dt and grain diameter of pearlite can be obtained through a binarization and a point counter method in structure observation using an optical microscope.

In addition, the grain diameters of ferrite, bainite, martensite, and austenite can be obtained by measuring orientations, for example, at a magnification of 1500 times and a measurement step (pitch) of 0.5 μm or less in an analysis of steel sheet orientations through the EBSD method, specifying locations at which the orientation difference between adjacent measurement points exceeds 15° as grain boundaries, and obtaining a diameter of the equivalent circle. At this time, the lengths of a grain in the rolling direction and the sheet thickness direction are obtained at the same time, thereby obtaining dL/dt.

Next, conditions for limiting the steel sheet components will be described. % for contents is mass %.

Since the cold-rolled steel sheet and galvanized steel sheet of the present invention use the hot-rolled steel sheet of the present invention as a raw sheet, the components of a steel sheet will be as follows for all of the hot-rolled steel sheet, the cold-rolled steel sheet, and the galvanized steel sheet.

C is a basically included element, and the reason why the lower limit is set to 0.0001% is to use the lower limit value obtained from practical steel. When the upper limit exceeds 0.40%, workability or weldability deteriorates, and therefore the upper limit is set to 0.40%. Meanwhile, since excessive addition of C significantly deteriorates spot weldability, the upper limit is more desirably set to 0.30% or lower.

Si is an effective element for enhancing the mechanical strength of a steel sheet, and, when the content exceeds 2.5%, workability deteriorates, or surface defects are generated, and therefore the upper limit is set to 2.5%. On the other hand, since it is difficult to include Si at less than 0.001% in practical steel, the lower limit is set to 0.001%.

Mn is an effective element for enhancing the mechanical strength of a steel sheet, and, when the content exceeds 4.0%, the workability deteriorates, and therefore the upper limit is set to 4.0%. On the other hand, since it is difficult to include Mn at less than 0.001% in practical steel, the lower limit is set to 0.001%. However, in order to avoid an extreme increase in steel-manufacturing costs, the lower limit is desirably set to 0.01% or more. Since Mn suppresses generation of ferrite, in a case in which it is intended to include a ferrite phase in a structure so as to secure elongation, the lower limit is desirably set to 3.0% or less. In addition, in a case in which, other than Mn, elements which suppress generation of hot cracking caused by S, such as Ti, are not added, Mn is desirably added at an amount so that Mn/S becomes equal to or larger than 20 in terms of mass %.

The upper limits of P and S are 0.15% or less and 0.03% or less respectively in order to prevent deterioration of workability or cracking during hot rolling or cold rolling. The respective lower limits are set to 0.001% for P and 0.0005% for S which are values obtainable through current ordinary purification (including secondary purification). Meanwhile, since extreme desulfurization significantly increases the costs, the lower limit of S is more desirably 0.001% or more.

For deoxidizing, Al is added at 0.001% or more. However, in a case in which sufficient deoxidizing is required, Al is more desirably added at 0.01% or more. In addition, since Al significantly increases the $\gamma \rightarrow \alpha$ transformation point from $\gamma$ to $\alpha$, Al is an effective element in a case in which hot rolling particularly at Ar3 point or lower is oriented. However, when Al is excessive, weldability deteriorates, and therefore the upper limit is set to 2.0%.

N and O are impurities, and are both set to 0.01% or less so as to prevent workability from degrading. The lower limits are set to 0.0005% which is a value obtainable through current ordinary purification (including secondary purification) for both elements. However, the contents of N and O are desirably set to 0.001% or more in order to suppress an extreme increase in steel-manufacturing costs.

Furthermore, in order to enhance the mechanical strength through precipitation strengthening, or to control inclusions or refine precipitates for improving local deformability, the steel sheet may contain one or two or more of any of Ti, Nb, B, Mg, REM, Ca, Mo, Cr, V, W, Cu, Ni, Co, Sn, Zr, and As which have been thus far used. In order to achieve precipitation strengthening, it is effective to generate fine carbonitrides, and addition of Ti, Nb, V, or W is effective. In addition, Ti, Nb, V, and W also have an effect of contributing to refinement of crystal grains as solid solution elements.

In order to obtain the effect of precipitation strengthening through addition of Ti, Nb, V, or W, it is necessary to add 0.001% or more of Ti, 0.001% or more of Nb, 0.001% or more of V, or 0.001% or more of W. In a case in which precipitation strengthening is particularly required, it is more desirable to add 0.01% or more of Ti, 0.005% or more of Nb, 0.01% or more of V, or 0.01% or more of W. Furthermore, Ti and Nb have an effect of improving material quality through mechanisms of fixation of carbon and nitrogen, structure control, fine grain strengthening, and the like in addition to precipitate strengthening. In addition, V is effective for precipitation strengthening, causes less degradation of local deformability induced from strengthening due to addition than Mo or Cr, and an effective addition element in a case in which a high strength and better hole expanding properties or bending properties are required.

However, even when the above elements are excessively added, since the effect of an increase in strength is saturated, and, furthermore, recrystallization after hot rolling is suppressed such that it is difficult to control crystal orientation, it is necessary to add Ti and Nb at 0.20% or less and V and W at 1.0% or less. However, in a case in which elongation is particularly required, it is more desirable to include V at 0.50% or less and W at 0.50% or less.

In a case in which the hardenability of a structure is enhanced, and a second phase is controlled so as to secure strength, it is effective to add one or two or more of B, Mo, Cr, Cu, Ni, Co, Sn, Zr, and As. Furthermore, in addition to the above effect, B has an effect of improving material quality through mechanisms of fixation of carbon and nitrogen, structure control, fine grain strengthening, and the like. In addition, in addition to the effect of enhancing the mechanical strength, Mo and Cr have an effect of improving material quality.

In order to obtain the above effects, it is necessary to add B at 0.0001% or more, Mo, Cr, Ni, and Cu at 0.001% or more, and Co, Sn, Zr, and As at 0.0001% or more. However, in contrast, since excessive addition deteriorates workability, the upper limit of B is set to 0.0050%, the upper limit of Mo is set to 1.0%, the upper limits of Cr, Ni, and Cu are set to 2.0%, the upper limit of Co is set to 1.0%, the upper limits of Sn and Zr are set to 0.2%, and the upper limit of As is set to 0.50%. In a case in which there is a strong demand for workability, it is desirable to set the upper limit of B to 0.005% and the upper limit of Mo to 0.50%. In addition, it is more desirable to select B, Mo, Cr, and As among the above addition elements from the viewpoint of costs.

Mg, REM, and Ca are important addition elements that detoxify inclusions and further improve local deformability. The lower limits for obtaining the above effect are 0.0001% respectively; however, in a case in which it is necessary to control the shapes of inclusions, Mg, REM, and Ca are desirably added at 0.0005% or more respectively. Meanwhile, since excessive addition results in degradation of cleanness, the upper limits of Mg, REM, and Ca are set to 0.010%, 0.1%, and 0.010% respectively.

The effect of improving local deformability is not lost even when a surface treatment is carried out on the hot-rolled steel sheet and cold-rolled steel sheet of the present invention, and the effects of the present invention can be obtained even when any of electroplating, hot dipping, deposition plating, organic membrane formation, film laminating, an organic salts/inorganic salts treatment, non-chromium treatment, and the like is carried out.

In addition, the galvanized steel sheet of the present invention has a galvanized layer by carrying out a galvanizing treatment on the surface of the cold-rolled steel sheet of the present invention, and galvanizing can obtain the effects both in hot dip galvanizing and electrogalvanizing. In addition, the galvanized steel sheet of the present invention may be produced as a zinc alloy-plated steel sheet mainly used for automobiles by carrying out an alloying treatment after galvanizing.

Additionally, the effects of the present invention are not lost even when a surface treatment is further carried out on the high-strength galvanized steel sheet of the present invention, and the effects of the present invention can be obtained even when any of electroplating, hot dipping, deposition plating, organic membrane formation, film laminating, an organic salts/inorganic salts treatment, non-chromium treatment, and the like is carried out.

2. Regarding the Manufacturing Method

Next, the method of manufacturing a hot-rolled steel sheet according to the embodiment will be described.

In order to realize excellent local deformability, it is important to form a texture having a predetermined X-ray random intensity ratio, satisfy the conditions for the r values in the respective directions, and control the grain shapes. Details of the manufacturing conditions for satisfying the above will be described below.

A manufacturing method preceding hot rolling is not particularly limited. That is, subsequent to ingoting using a blast furnace, an electric furnace, or the like, a variety of secondary purifications are carried out, then, the ingot may be cast through a method, such as ordinary continuous casting, an ingot method, or thin slab casting. In the case of continuous casting, the ingot may be once cooled to a low temperature, reheated, and then hot-rolled, or a cast slab may also be hot-rolled as it is after casting without cooling the cast slab to a low temperature. Scraps may be used as a raw material.

The hot-rolled steel sheet according to the embodiment is obtained in a case in which the following conditions are satisfied.

Figure 19:
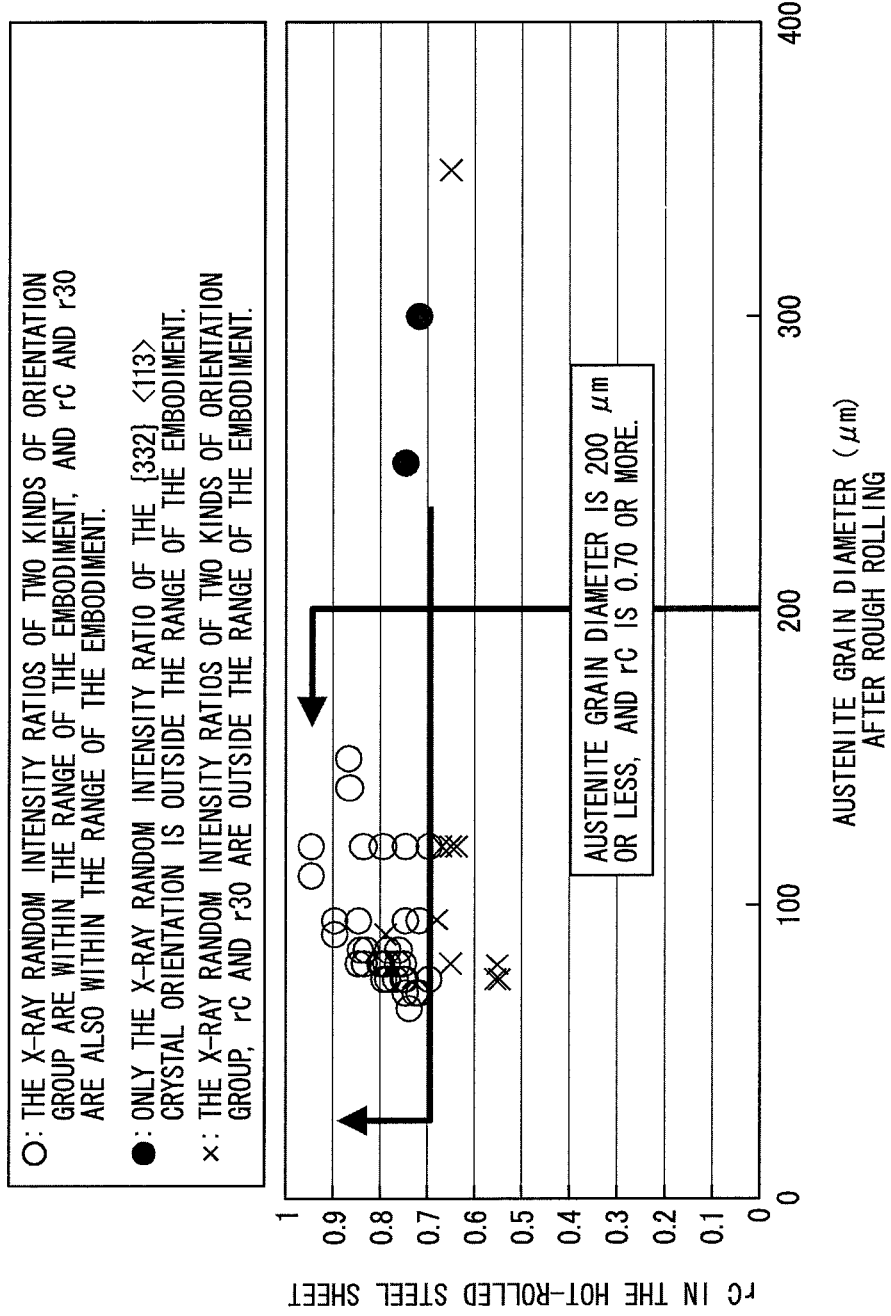
FIG. 19 is a view showing the relationship between the austenite grain diameter after rough rolling and rC which is the r value in the direction perpendicular to the rolling direction in the hot-rolled steel sheet.
Figure 20:
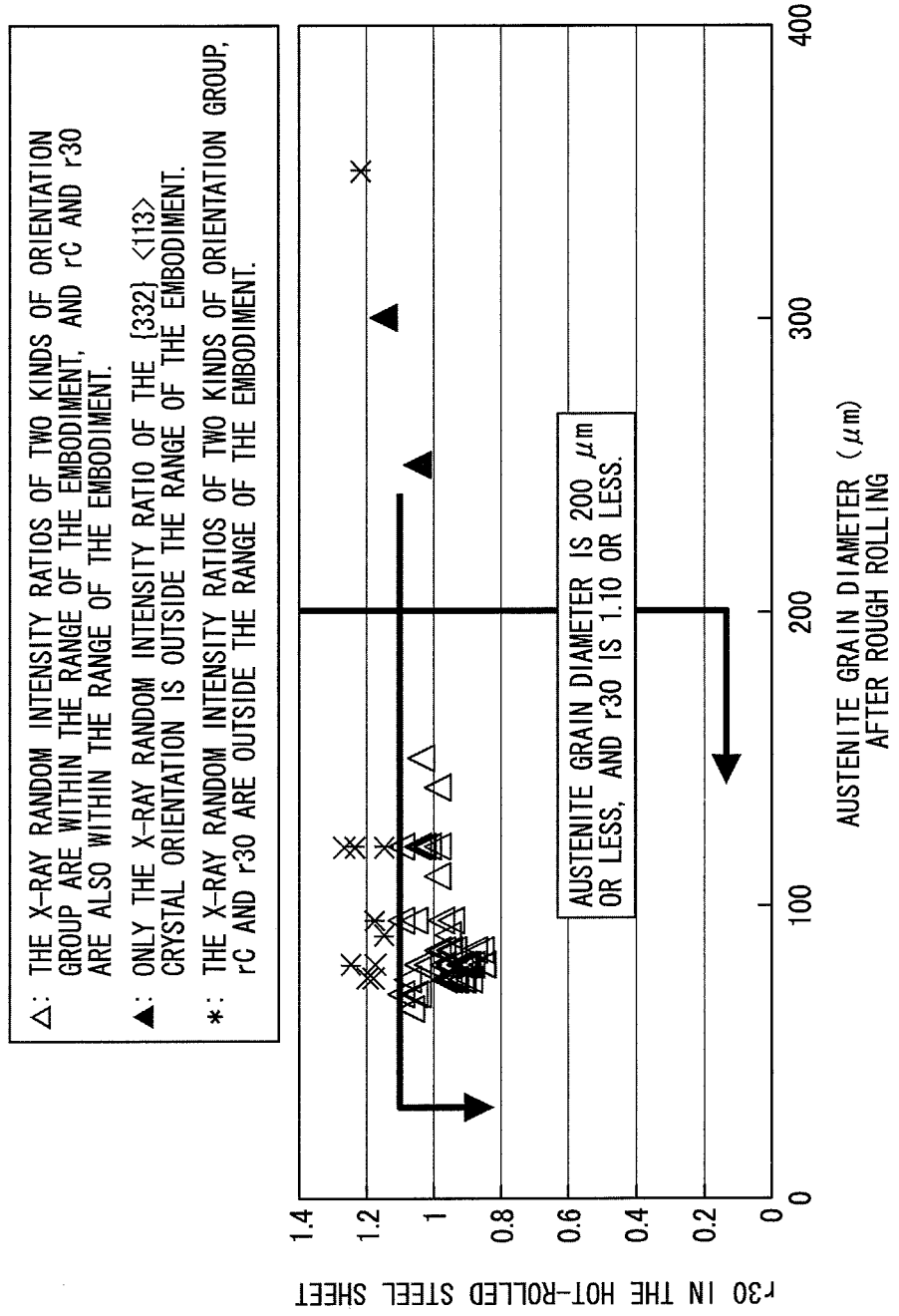
FIG. 20 is a view showing the relationship between the austenite grain diameter after rough rolling and r30 which is the r value in the direction that forms an angle of 30° with respect to the rolling direction in the hot-rolled steel sheet.

In order to satisfy the above predetermined values of rC of 0.70 or more and r30 of 1.10 or less, the austenite grain diameter after rough rolling, that is, before finishing rolling is important. As shown in FIGS. 19 and 20, the austenite grain diameter before finishing rolling may be 200 μm or less.

Figure 21:
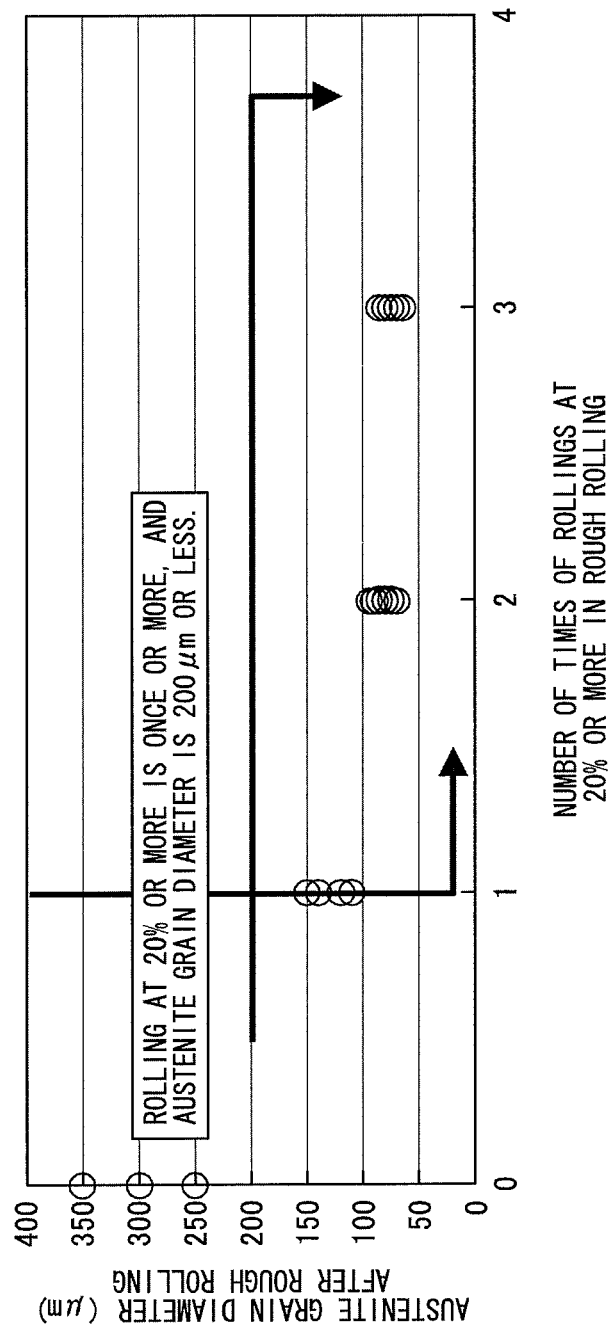
FIG. 21 is a view showing the relationship between the number of times of rolling at a rolling reduction ratio of 20% or more in rough rolling and the austenite grain diameter after the rough rolling.

In order to obtain an austenite grain diameter before finishing rolling of 200 μm or less, in the rough rolling, it is necessary to carry out rolling in a temperature range of 1000° C. to 1200° C. and carry out rolling once or more at a rolling reduction ratio of at least 20% or more in the temperature range as shown in FIG. 21. However, in order to further enhance homogeneity and enhance elongation and local deformability, it is desirable to carry out rolling once or more at a rolling reduction ratio of at least 40% or more in a temperature range of 1000° C. to 1200° C.

The austenite grain diameter is more desirably set to 100 μm or less, and, in order to achieve the austenite grain diameter of 100 μm or less, it is desirable to carry out rolling twice or more at a rolling reduction ratio of 20% or more. Desirably, rolling is carried out twice or more at a rolling reduction ratio of 40% or more. As the rolling reduction ratio and the number of times of rolling increase, smaller grains can be obtained, but there is a concern that the temperature may decrease or scales may be excessively generated when the rolling exceeds 70% or the number of times of the rough rolling exceeds 10 times. As such, a decrease in the austenite grain diameter before finishing rolling is effective to improve local deformability through acceleration of recrystallization of austenite during subsequent finishing rolling, particularly through control of rL or r30.

The reason why refinement of the austenite grain diameter has an influence on local deformability is assumed to be that austenite grain boundaries after the rough rolling, that is, austenite grain boundaries before the finishing rolling function as one of recrystallization nuclei during the finishing rolling.

In order to confirm the austenite grain diameter after the rough rolling, it is desirable to cool a sheet piece that is about to be finishing-rolled as rapidly as possible. The sheet piece is cooled at a cooling rate of 10° C./s or more, the structure on the cross section of the sheet piece is etched, austenite grain boundaries are made to appear, and the austenite grain diameter is measured using an optical microscope. At this time, the austenite grain diameter is measured at a magnification of 50 times or more at 20 sites or more through an image analysis or a point counter method.

In addition, in order to achieve an average value of the X-ray random intensity ratio of the {100} <011> to {223} <110> orientation group in a thickness central portion that is in a sheet thickness range of ⅝ to ⅜ from the steel sheet surface and an X-ray random intensity ratio of the {332} <113> crystal orientation in the above value ranges, based on the T1 temperature described in the formula 1 which is determined by the steel sheet components in the finishing rolling after the rough rolling, working is carried out at a large rolling reduction ratio in a temperature range of T1+30° C. to T1+200° C., desirably in a temperature range of T1+50° C. to T1+100° C., and working is carried out at a small rolling reduction ratio in a temperature range of T1° C. to lower than T1+30° C. According to the above, the local deformability and shape of a final hot-rolled product can be secured. FIGS. 22 to 25 show the relationships between the rolling reduction ratios in the respective temperature ranges and the X-ray random intensity ratios of the respective orientations.

Figure 22:
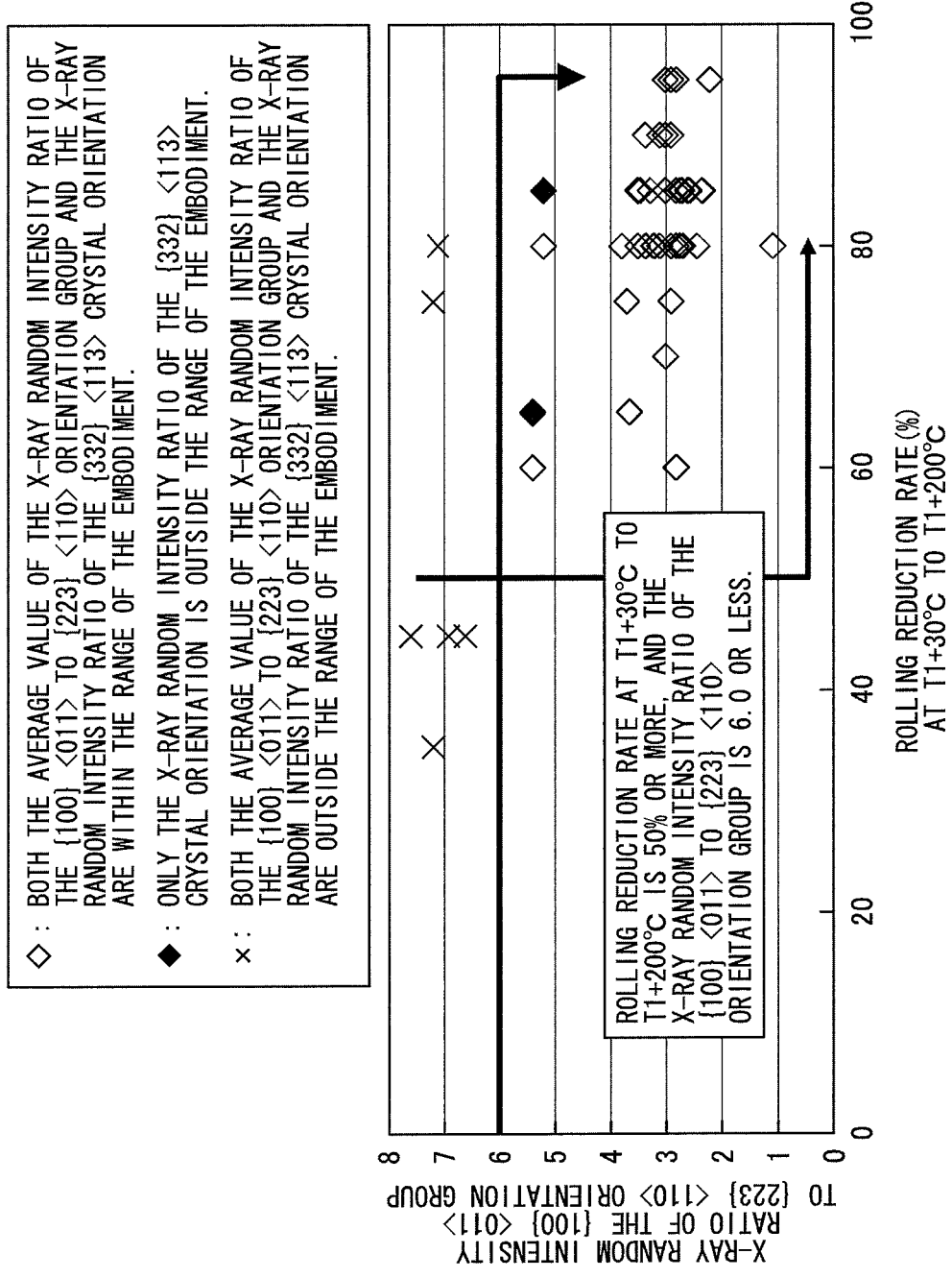
FIG. 22 is a view showing the relationship between a total rolling reduction ratio in a temperature range of T1+30° C. to T1+200° C. and the average value of the X-ray random intensity ratio of a {100} <011> to {223} <110> orientation group in the hot-rolled steel sheet.
Figure 23:
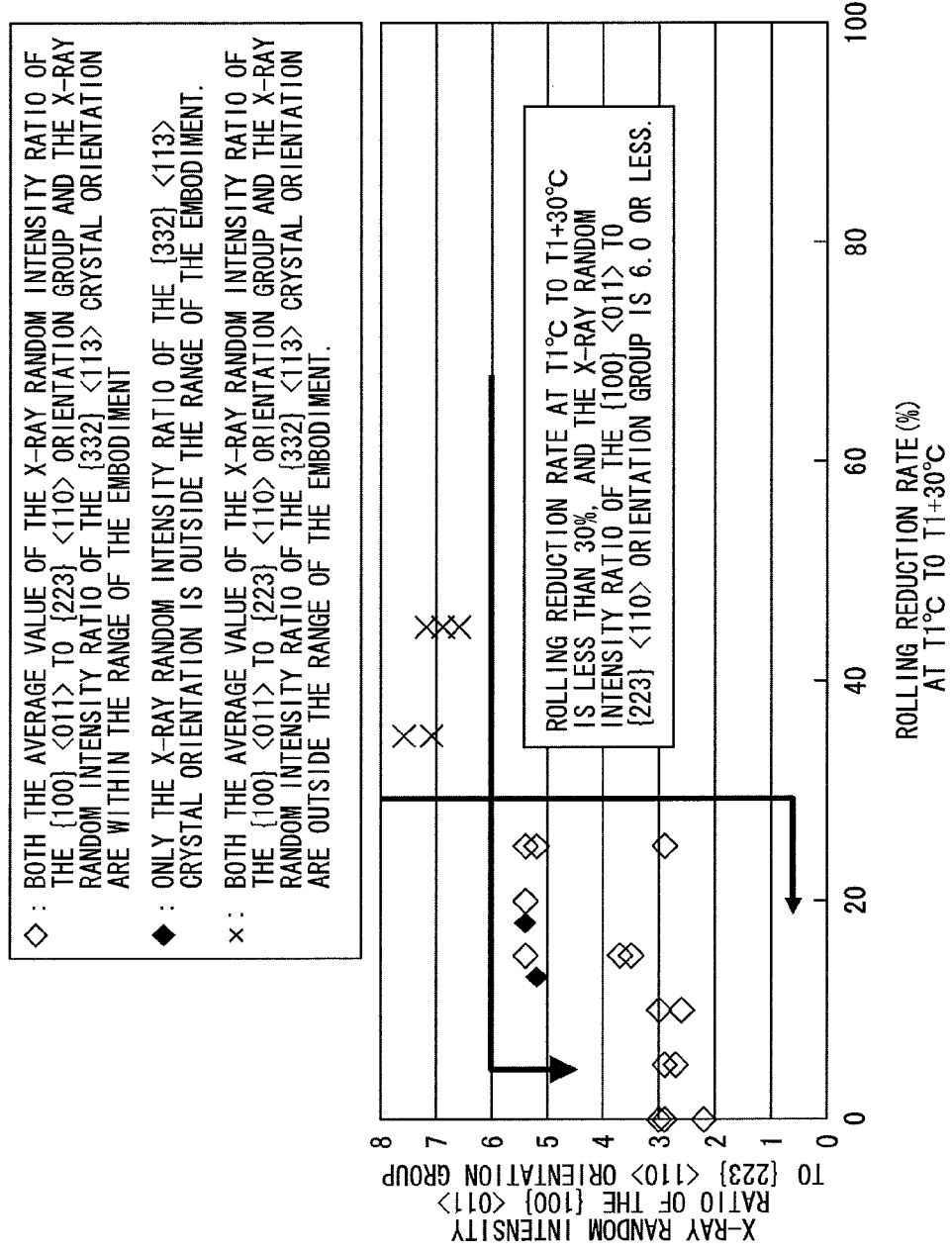
FIG. 23 is a view showing the relationship between a total rolling reduction ratio in a temperature range of T1° C. to lower than T1+30° C. and the average value of the X-ray random intensity ratio of a {100} <011> to {22} <110> orientation group in the hot-rolled steel sheet.
Figure 24:
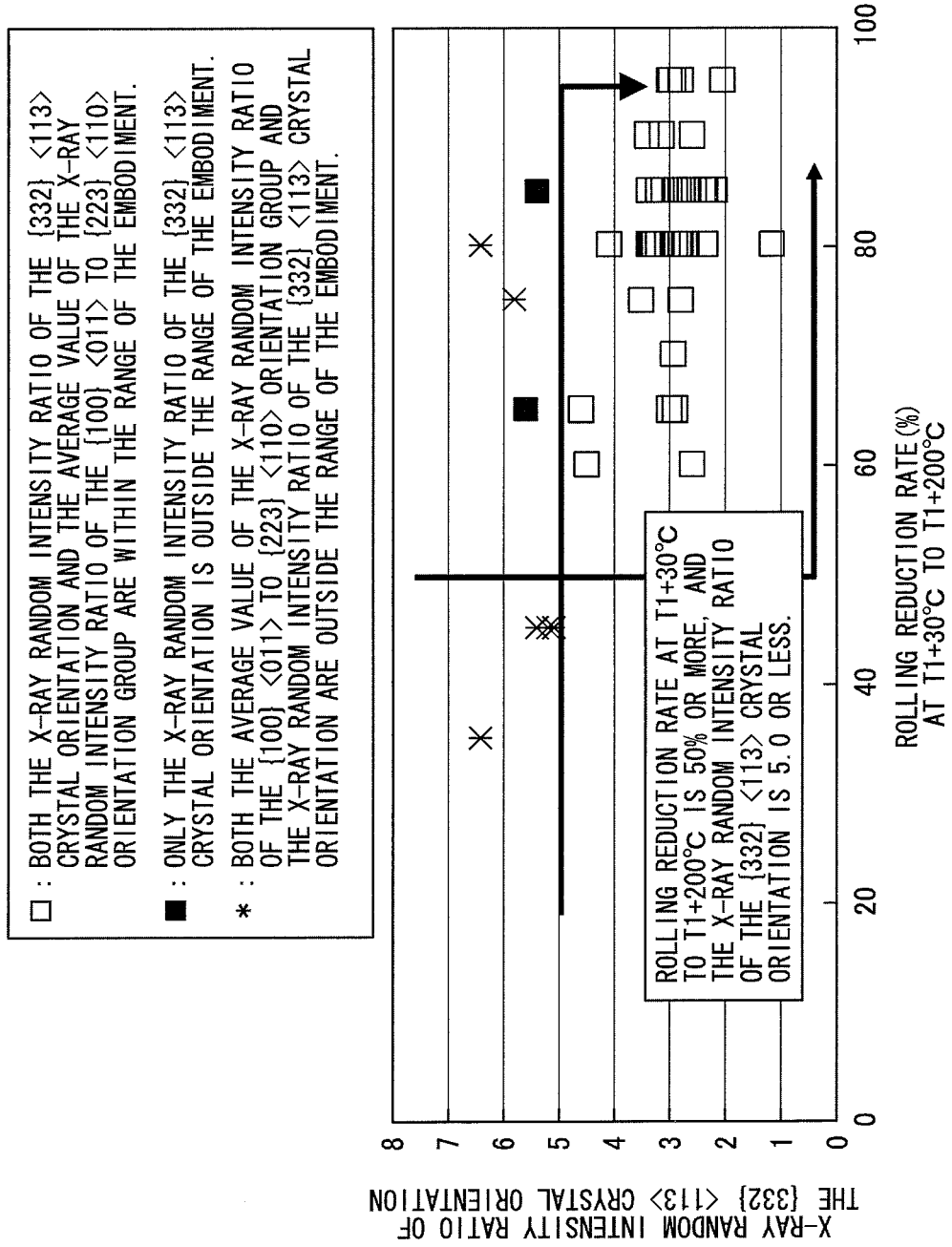
FIG. 24 is a view showing the relationship between a total rolling reduction ratio in a temperature range of T1+30° C. to T1+200° C. and the X-ray random intensity ratio of the {332} <113> crystal orientation in the hot-rolled steel sheet.
Figure 25:
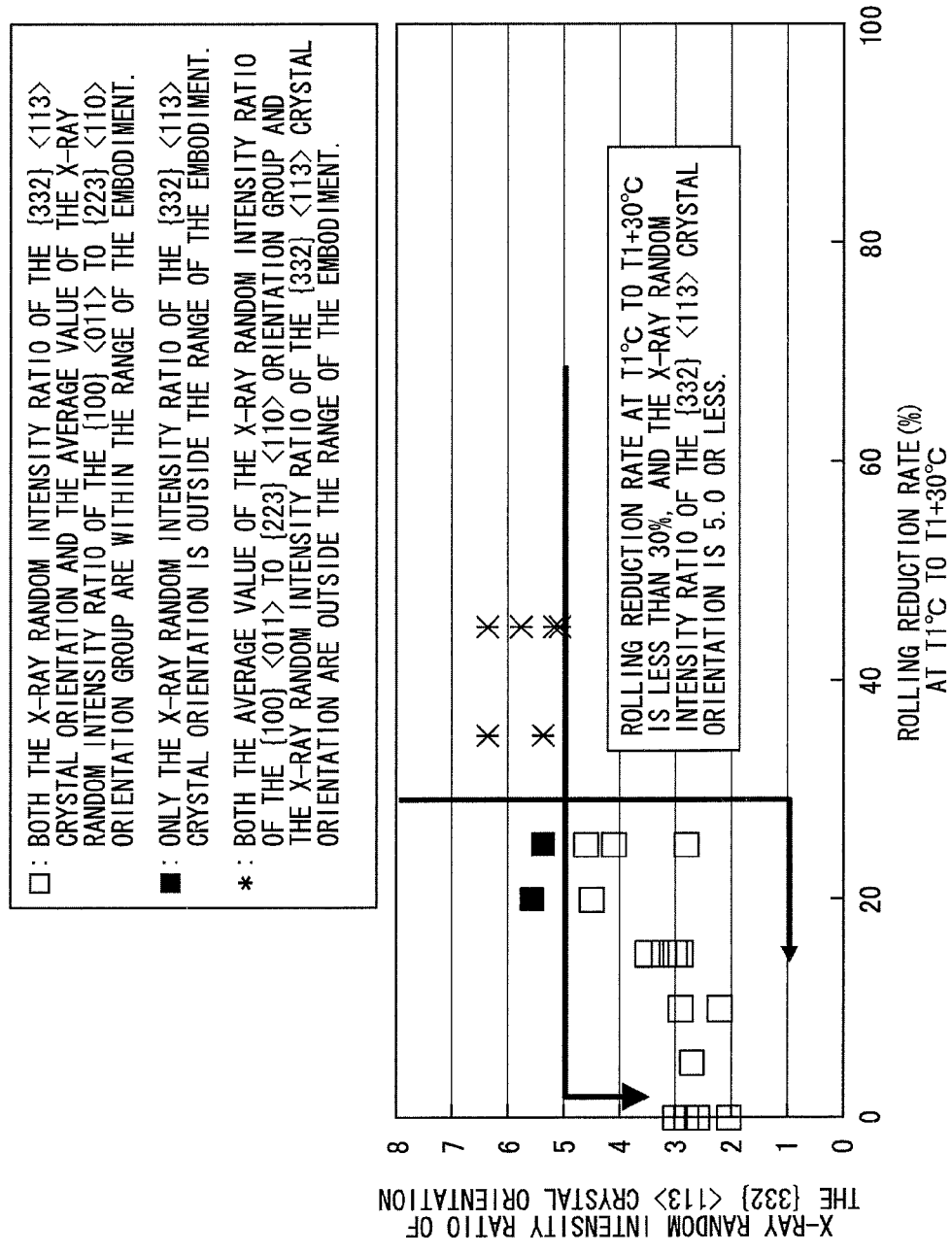
FIG. 25 is a view showing the relationship between a total rolling reduction ratio in a temperature range of T1° C. to lower than T1+30° C. and the X-ray random intensity ratio of the {332} <113> crystal orientation in the hot-rolled steel sheet.

That is, as shown in FIGS. 22 and 24, large reduction in a temperature range of T1+30° C. to T1+200° C. and subsequent light rolling at T1° C. to lower than T1+30° C. as shown in FIGS. 23 and 25 control the average value of the X-ray random intensity ratio of the {100} <011> to {223} <110> orientation group in a thickness central portion that is in a sheet thickness range of ⅝ to ⅜ from the steel sheet surface and the X-ray random intensity ratio of the {332} <113> crystal orientation so as to drastically improve the local deformability of the final hot-rolled product.

The T1 temperature is experimentally obtained, and the inventors found from experiments that recrystallization in the austenite range of the respective steels is accelerated with the T1 temperature as a basis.

In order to obtain more favorable local deformability, it is important to accumulate strain through the large reduction or repeatedly recrystallize the structure every rolling. In order to accumulate strain, the total rolling reduction ratio is 50% or more, and desirably 70% or more, and, furthermore, an increase in the temperature of the steel sheet between passes is desirably set to 18° C. or lower. Meanwhile, the total rolling reduction of more than 90% is not desirable from the viewpoint of temperature securement or excessive rolling load. Furthermore, in order to enhance the homogeneity of a hot-rolled sheet, and enhance the local deformability to the extreme, among the rolling passes in a temperature range of T1+30° C. to T1+200° C., at least one pass is carried out at a rolling reduction ratio of 30% or more, and desirably at 40% or more. Meanwhile, when the rolling reduction ratio exceeds 70% in a pass, there is a concern that the shape may be impaired. In a case in which there is a demand for more favorable workability, it is more desirable to set the rolling reduction ratio to 30% or more in the final 2 passes.

Furthermore, in order to accelerate uniform recrystallization through releasing of accumulated strain, it is necessary to suppress as much as possible the working amount in a temperature range of T1° C. to lower than T1+30° C. after the large reduction at T1+30° C. to T1+200° C., and the total rolling rate at T1° C. to lower than T1+30° C. is set to less than 30%. A rolling reduction ratio of 10% or more is desirable from the viewpoint of the sheet shape, but a rolling reduction ratio of 0% is desirable in a case in which local deformability matters more. When the rolling reduction ratio at T1° C. to lower than T1+30° C. exceeds a predetermined range, recrystallized austenite grains are expanded, and, when the retention time is short, recrystallization does not sufficiently proceed, and the local deformability deteriorates. That is, in the manufacturing conditions according to the embodiment, it is important to uniformly and finely recrystallize austenite during finishing rolling so as to control the texture of a hot-rolled product in order to improve local deformability, such as hole expanding properties or bending properties.

When rolling is carried out at a lower temperature than the temperature range specified above or at a larger rolling reduction ratio than the specified rolling reduction ratio, the texture of austenite develops, and the X-ray random intensity ratios in the respective crystal orientations, such as the average value of the X-ray random intensity ratio of the {100} <011> to {22} <110> orientation group at least in a thickness central portion that is in a sheet thickness range of ⅝ to ⅜ from a steel sheet surface of 6.0 or less and the X-ray random intensity ratio of the {332} <113> crystal orientation of 5.0 or less, cannot be obtained in the finally obtained hot-rolled steel sheet.

Meanwhile, when rolling is carried out at a higher temperature than the specified temperature range or at a smaller rolling reduction ratio than the specified rolling reduction ratio, grain coarsening or duplex grains results, and the area fraction of crystal grains having a grain diameter of larger than 20 μm increases. Whether or not the above-specified rolling is carried out can be determined from rolling reduction ratio, rolling load, sheet thickness measurement, or the like through actual performance or calculation. In addition, since the temperature can be also measured if a thermometer is present between stands, and calculation simulation in which working heat generation and the like are considered from line speed, rolling reduction ratio, and the like is available, whether or not the above-specified rolling is carried out can be determined using either or both of temperature and calculation simulation.

The hot rolling carried out in the above manner ends at a temperature of Ar3 or higher. When the end temperature of the hot rolling is lower than Ar3, since two-phase region rolling in an austenite area and a ferrite area is included, accumulation into the {100} <011> to {22} <110> orientation group becomes strong, and, consequently, local deformability significantly degrades.

As long as rL and r60 are 0.70 or more and 1.10 or less respectively, furthermore, favorable sheet thickness/minimum bending radius 2.0 is satisfied. In order to achieve the sheet thickness/minimum bending radius 2.0, in a case in which a pass in which the rolling reduction ratio is 30% or more in the temperature range of T1+30° C. to T1+200° C. is defined as a large reduction pass, a waiting time t (seconds) from completion of the final pass of the large reduction pass to initiation of cooling satisfies the formula 2, and the temperature increase of the steel sheet between the respective passes is desirably 18° C. or lower.

Figure 26:
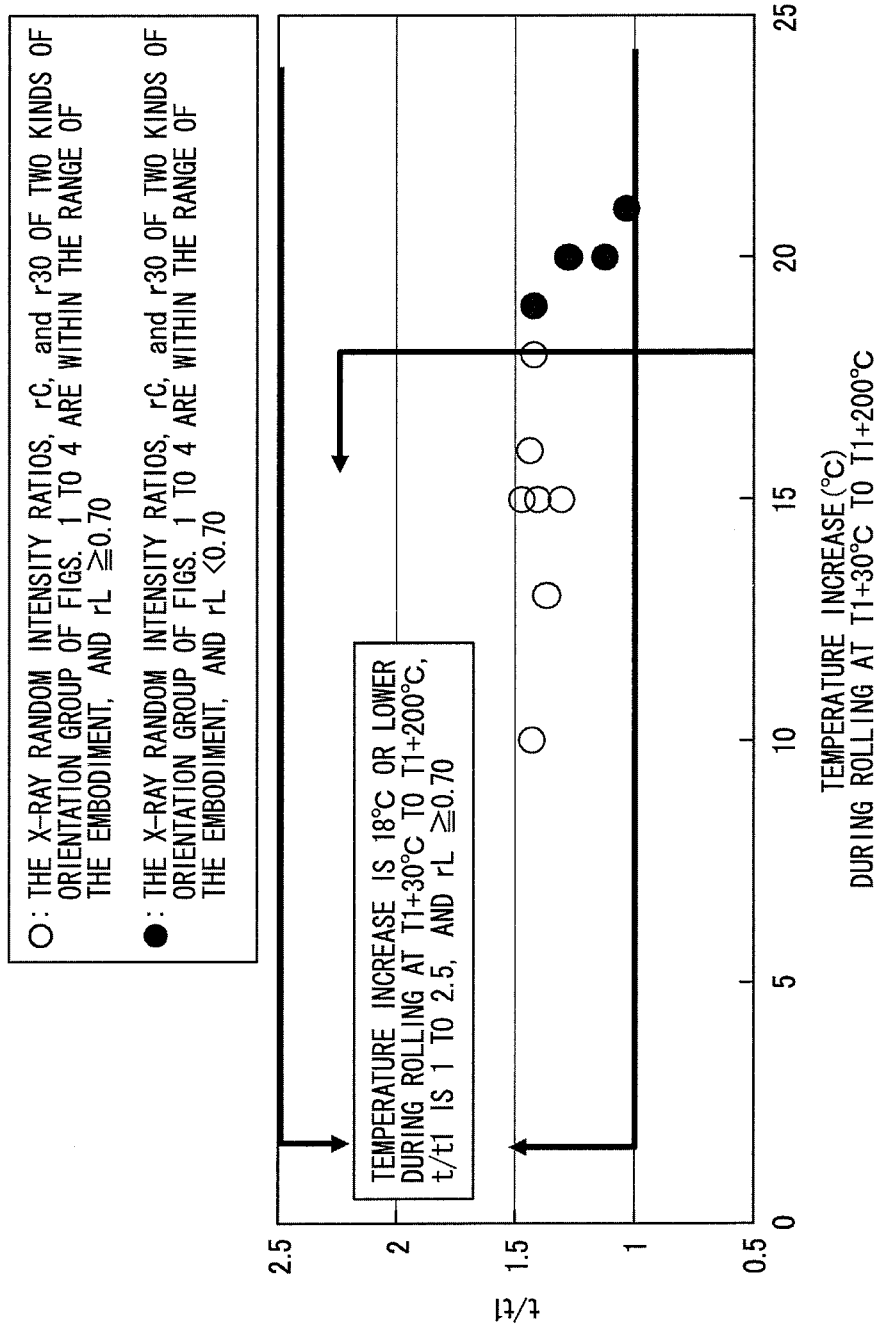
FIG. 26 is a view showing the relationship among a maximum temperature increase amount of the steel sheet between the respective passes during rolling in a temperature range of T1+30° C. to T1+200° C., a waiting time from completion of a final pass of the large reduction pass to initiation of cooling in a case in which the pass in which the rolling reduction ratio is 30% or more in the temperature range of T1+30° C. to T1+200° C. is defined as a large reduction pass, and rL which is the r value in the rolling direction in the hot-rolled steel sheet.
Figure 27:
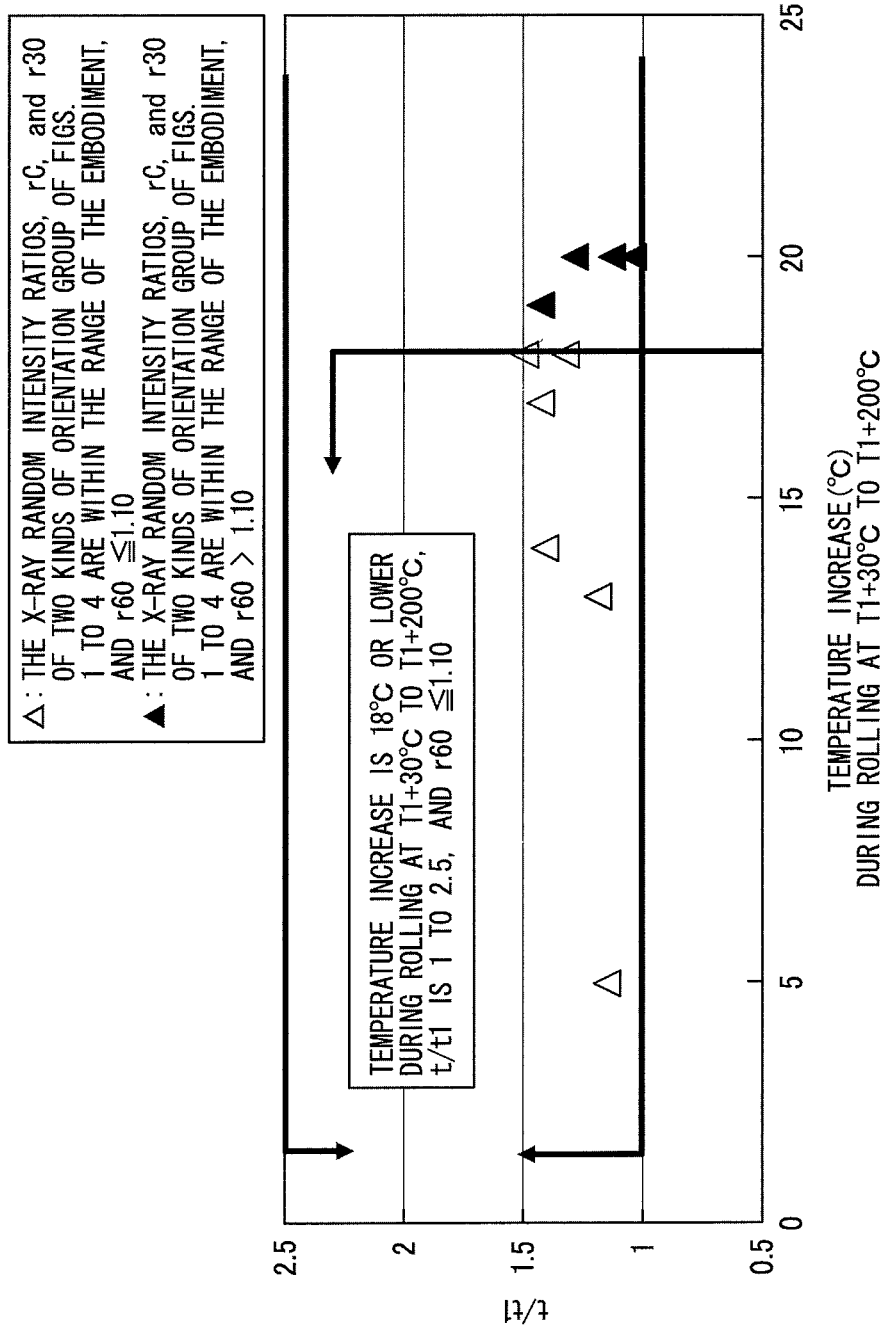
FIG. 27 is a view showing the relationship among a maximum temperature increase amount of the steel sheet between the respective passes during rolling in a temperature range of T1+30° C. to T1+200° C., a waiting time from completion of a final pass of the large reduction pass to initiation of cooling in a case in which the pass in which the rolling reduction ratio is 30% or more in the temperature range of T1+30° C. to T1+200° C. is defined as a large reduction pass, and r60 which is the r value in the direction that forms an angle of 60° with respect to the rolling direction in the hot-rolled steel sheet.

FIGS. 26 and 27 show the relationship among the temperature increase amount of the steel sheet between the passes during rolling at T1+30° C. to T1+200° C.; the waiting time t; and rL and r60. In a case in which the temperature increase of the steel sheet between the respective passes at T1+30° C. to T1+200° C. is 18° C. or lower, and t satisfies the formula 2, it is possible to obtain uniform recrystallized austenite having an rL of 0.70 or more and an r60 of 1.10 or less.

When the waiting time t exceeds t1×2.5, grain coarsening proceeds, and elongation significantly degrades. In addition, when the waiting time t is shorter than t1, anisotropy increases, and the equiaxed grain proportion decreases.

In a case in which the temperature increase of the steel sheet at T1+30° C. to T1+200° C. is too low to obtain a predetermined rolling reduction ratio in a range of T1+30° C. to T1+200° C., recrystallization is suppressed. In addition, in a case in which the waiting time t (seconds) does not satisfy the formula 2, grains are coarsened by the time being too long, recrystallization does not proceed by the time being too short, and sufficient local deformability cannot be obtained.

A cooling pattern after rolling is not particularly limited. The effects of the present invention can be obtained by employing a cooling pattern for controlling the structure according to the respective objects.

During hot rolling, a sheet bar may be joined after rough rolling, and finishing rolling may be continuously carried out. At this time, a rough bar may be once rolled into a coil shape, stored in a cover having a heat-retention function as necessary, and again rolled back, whereby the rough bar is joined.

In addition, rolling may be carried out after hot rolling.

Skin pass rolling may be carried out on the hot-rolled steel sheet according to necessity. Skin pass rolling has an effect of preventing the stretcher strain which occurs during working forming or flatness correction.

The structure of the hot-rolled steel sheet obtained in the embodiment mainly includes ferrite, but may include pearlite, bainite, martensite, austenite, and compounds such as carbonitrides, as metallic structures other than ferrite. Since the crystal structure of martensite or bainite is the same as or similar to the crystal structure of ferrite, the above structures may be a main component instead of ferrite.

Further, the steel sheet according to the present invention can be applied not only to bending working but also to combined forming composed mainly of bending, overhanging, drawing, and bending working.

Next, the method of manufacturing a cold-rolled steel sheet according to the embodiment will be described. In order to realize excellent local deformability, in a steel sheet that has undergone cold rolling, it is important to form a texture having a predetermined X-ray random intensity ratio, satisfy the conditions of the r values in the respective directions, and control grain shapes. Details of the manufacturing conditions for satisfying the above will be described below.

A manufacturing method preceding hot rolling is not particularly limited. That is, subsequent to ingoting using a blast furnace, an electric furnace, or the like, a variety of secondary purifications are carried out, then, the ingot may be cast through a method, such as ordinary continuous casting, an ingot method, or thin slab casting. In the case of continuous casting, the ingot may be once cooled to a low temperature, reheated, and then hot-rolled, or a cast slab may also be hot-rolled as it is after casting without cooling the cast slab to a low temperature. Scraps may be used as a raw material.

The cold-rolled steel sheet having excellent local deformability according to the embodiment is obtained in a case in which the following conditions are satisfied.

Figure 28:
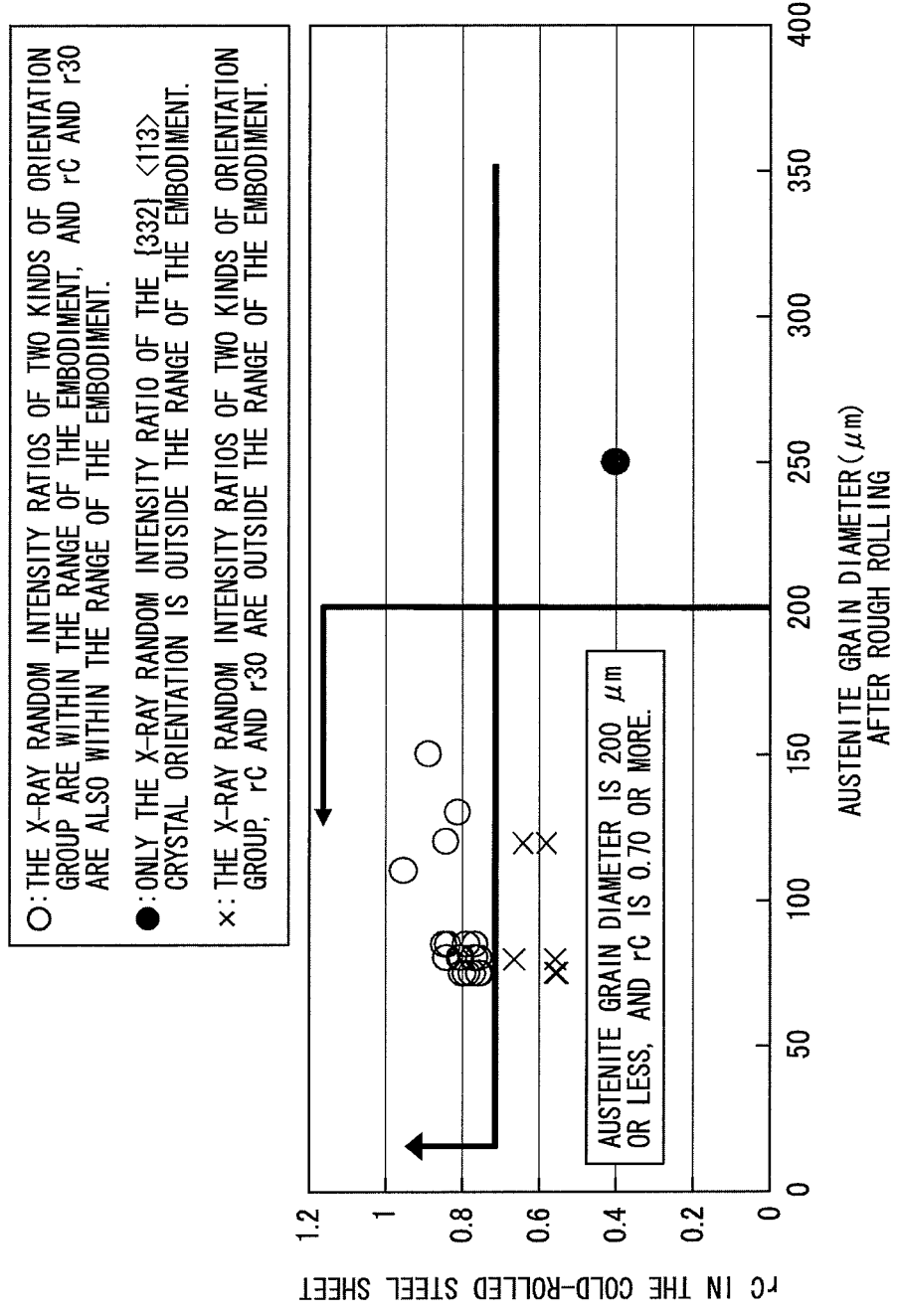
FIG. 28 is a view showing the relationship between the austenite grain diameter after the rough rolling and rC which is the r value in the direction perpendicular to the rolling direction in the cold-rolled steel sheet.
Figure 29:
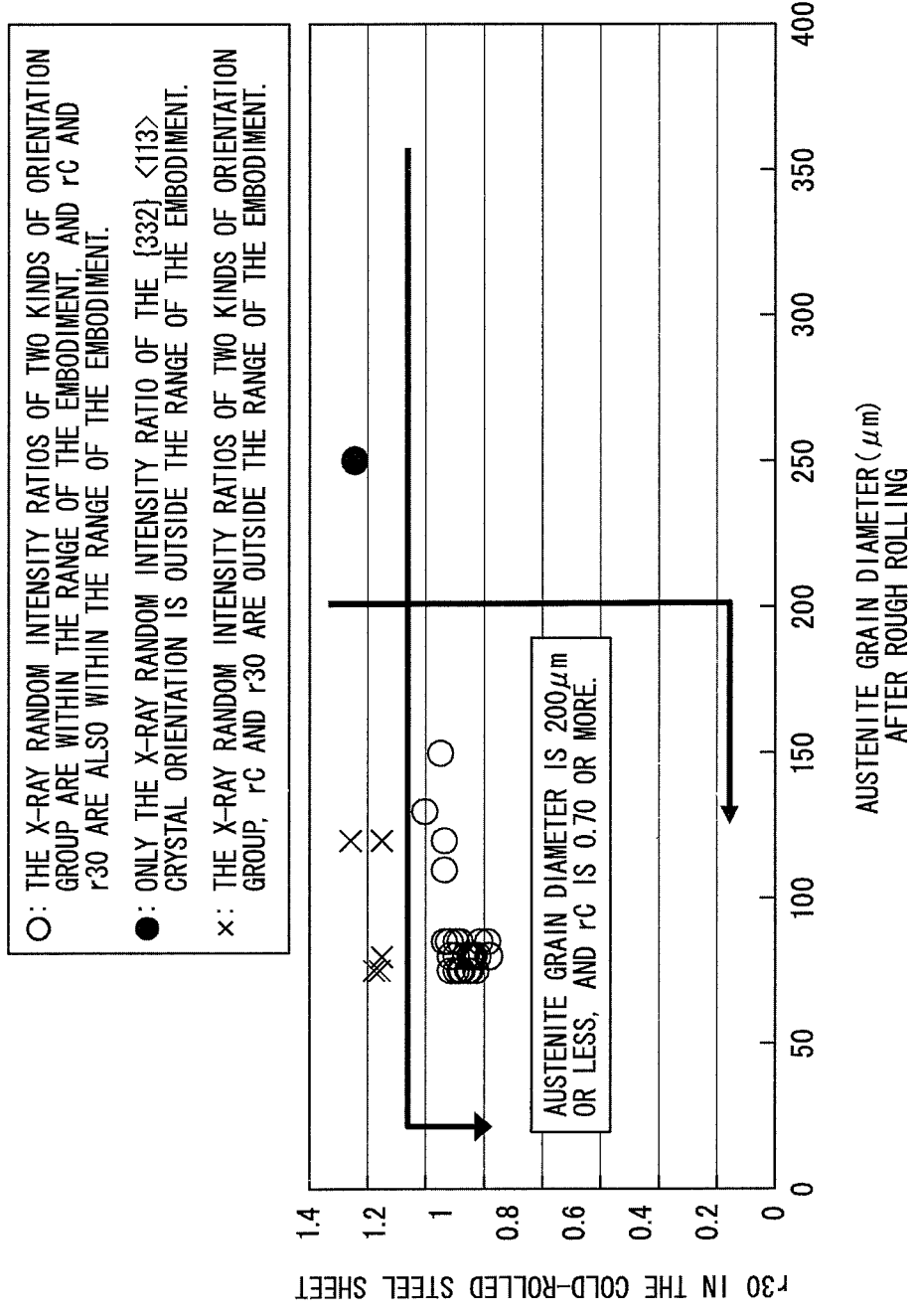
FIG. 29 is a view showing the relationship between the austenite grain diameter after the rough rolling and r30 which is the r value in the direction that forms an angle of 30° with respect to the rolling direction in the cold-rolled steel sheet.

In order for rC and r30 to satisfy the above predetermined values, the austenite grain diameter after rough rolling, that is, before finishing rolling is important. As shown in FIGS. 28 and 29, the austenite grain diameter before finishing rolling is desirably small, and the above values are satisfied when the austenite grain diameter is 200 μm or less.

In order to obtain an austenite grain diameter before finishing rolling of 200 μm or less, as shown in FIG. 21, it is necessary to carry out the rough rolling in a temperature range of 1000° C. to 1200° C. and carry out rolling once or more at a rolling reduction ratio of at least 20% or more. As the rolling reduction ratio and the number of times of rolling increase, smaller grains can be obtained.

The austenite grain diameter is more desirably set to 100 μm or less, and, in order to achieve the austenite grain diameter of 100 μm or less, it is desirable to carry out rolling twice or more at a rolling reduction ratio of 20% or more. Desirably, rolling is carried out twice or more at a rolling reduction ratio of 40% or more. As the rolling reduction ratio and the number of times of rolling increase, smaller grains can be obtained, but there is a concern that the temperature may decrease or the scales may be excessively generated when the rolling exceeds 70% or the number of times of the rough rolling exceeds 10 times. As such, a decrease in the austenite grain diameter before finishing rolling is effective to improve local deformability through acceleration of recrystallization of austenite during subsequent finishing rolling, particularly through control of rL or r30.

The reason why refinement of the austenite grain diameter has an influence on local deformability is assumed to be that austenite grain boundaries after the rough rolling, that is, austenite grain boundaries before the finishing rolling, function as one of recrystallization nuclei during the finishing rolling. In order to confirm the austenite grain diameter after the rough rolling, it is desirable to cool a sheet piece that is about to be finishing-rolled as rapidly as possible. The sheet piece is cooled at a cooling rate of 10° C./s or more, the structure on the cross section of the sheet piece is etched, austenite grain boundaries are made to appear, and the austenite grain diameter is measured using an optical microscope. At this time, the austenite grain diameter is measured at a magnification of 50 times or more at 20 sites or more through an image analysis or a point counter method.

Figure 30:
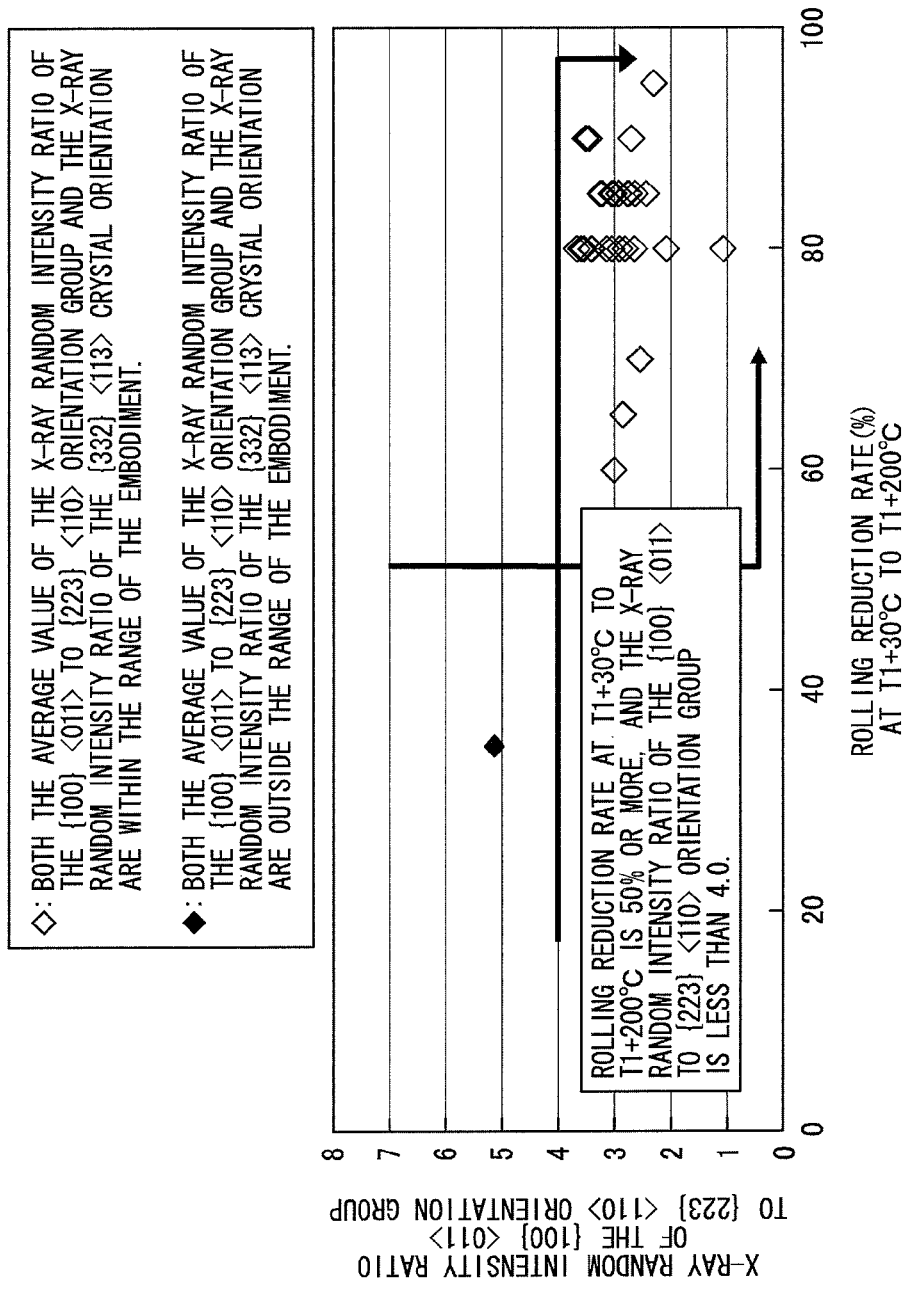
FIG. 30 is a view showing the relationship between the rolling reduction ratio of T1+30° C. to T1+200° C. and the average value of the X-ray random intensity ratio of a {100} <011> to {223} <110> orientation group in the cold-rolled steel sheet.
Figure 31:
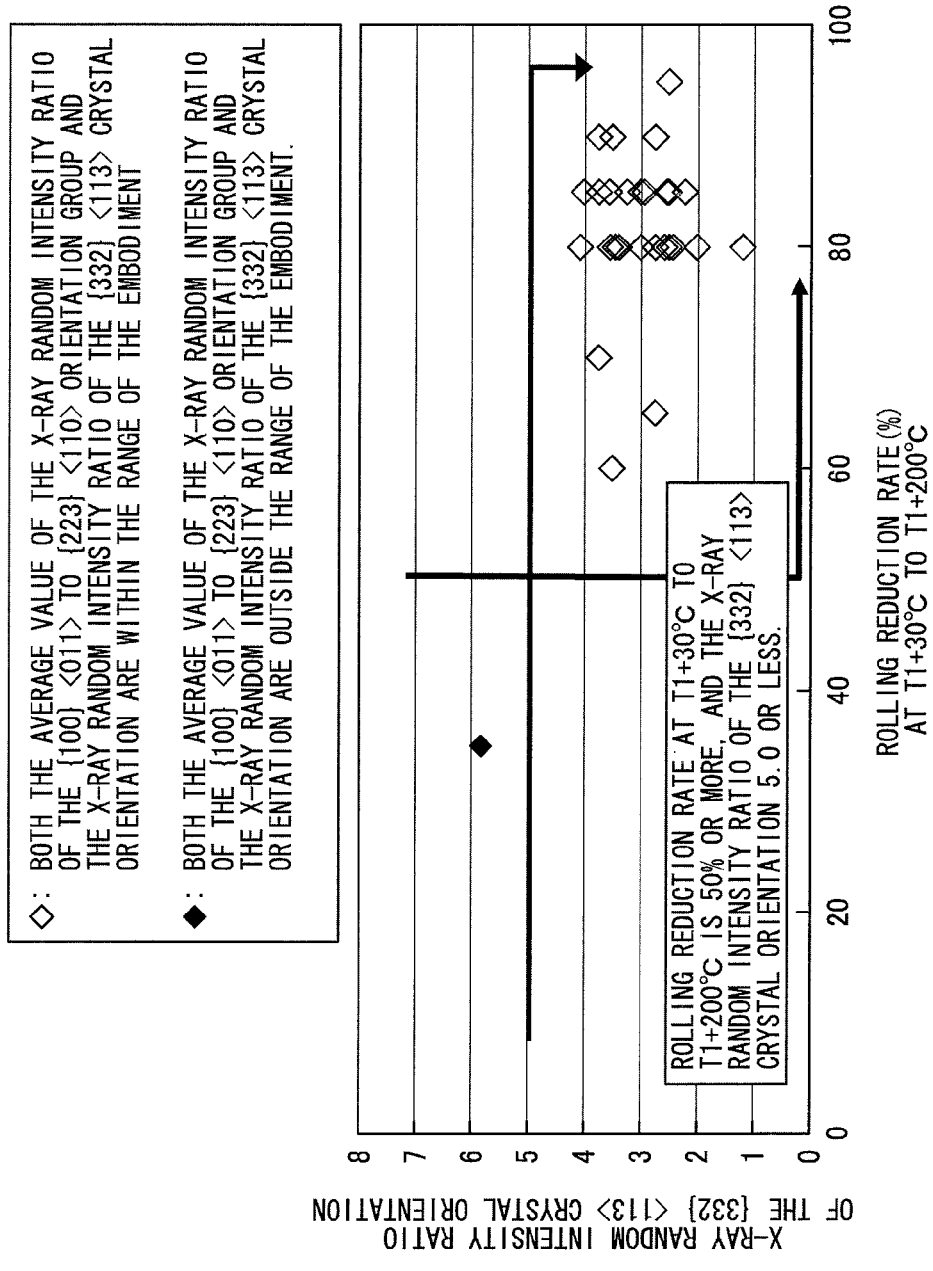
FIG. 31 is a view showing the relationship between the total rolling reduction ratio in a temperature range of T1+30° C. to T1+200° C. and the X-ray random intensity ratio of the {332} <113> crystal orientation in the cold-rolled steel sheet.

In addition, in order to achieve an average value of the X-ray random intensity ratio of the {100} <011> to {22} <110> orientation group in a thickness central portion that is in a sheet thickness range of ⅝ to ⅜ from the steel sheet surface, and an X-ray random intensity ratio of the {332} <113> crystal orientation in the above value ranges, based on the T1 temperature determined by the steel sheet components in the finishing rolling after the rough rolling, working is carried out at a large rolling reduction ratio in a temperature range of T1+30° C. to T1+200° C., desirably in a temperature range of T1+50° C. to T1+100° C., and working is carried out at a small rolling reduction ratio in a temperature range of T1° C. to lower than T1+30° C. According to the above, the local deformability and shape of a final hot-rolled product can be secured. FIGS. 30 to 31 show the relationships between the rolling reduction ratios in the temperature range of T1+30° C. to T1+200° C. and the X-ray random intensity ratios of the respective orientations.

That is, large reduction in a temperature range of T1+30° C. to T1+200° C. and subsequent light rolling at T1° C. to lower than T1+30° C. as shown in FIGS. 30 and 31 control the average value of the X-ray random intensity ratio of the {100} <011> to {223} <110> orientation group in a thickness central portion that is in a sheet thickness range of ⅝ to ⅜ from the steel sheet surface, and the X-ray random intensity ratio of the {332} <113> crystal orientation so as to drastically improve the local deformability of the final hot-rolled product as shown in Tables 7 and 8 below. The T1 temperature is experimentally obtained, and the inventors found from experiments that recrystallization in the austenite range of the respective steels is accelerated with the T1 temperature as a basis.

Furthermore, in order to obtain more favorable local deformability, it is important to accumulate strain through the large reduction, and the total rolling reduction ratio is 50% or more, more desirably 60% or more, and still more desirably 70% or more. On the other hand, a total rolling reduction ratio exceeding 90% is not desirable from the viewpoint of temperature securement or excessive rolling loads. Furthermore, in order to enhance the homogeneity of a hot-rolled sheet, and enhance the local deformability to the extreme, among the rolling passes in a temperature range of T1+30° C. to T1+200° C., in at least one pass, rolling is carried out at a rolling reduction ratio of 30% or more, and desirably at 40% or more. Meanwhile, when the rolling reduction ratio exceeds 70% in a pass, there is a concern that the shape may be impaired. In a case in which there is a demand for more favorable workability, it is more desirable to set the rolling reduction ratio to 30% or more in the final 2 passes.

Furthermore, in order to accelerate uniform recrystallization through releasing of accumulated strain, it is necessary to suppress as much as possible the working amount in a temperature range of T1° C. to lower than T1+30° C. after the large reduction at T1+30° C. to T1+200° C., and the total rolling rate at T1° C. to lower than T1+30° C. is set to less than 30%. A rolling reduction ratio of 10% or more is desirable from the viewpoint of the sheet shape, but a rolling reduction ratio of 0% is desirable in a case in which local deformability matters more. When the rolling reduction ratio at T1° C. to lower than T1+30° C. exceeds a predetermined range, recrystallized austenite grains are expanded, and, when the retention time is short, recrystallization does not sufficiently proceed, and the local deformability deteriorates. That is, in the manufacturing conditions according to the embodiment, it is important to uniformly and finely recrystallize austenite during finishing rolling so as to control the texture of a hot-rolled product in order to improve local deformability, such as hole expanding properties or bending properties.

When rolling is carried out at a lower temperature than the temperature range specified above or at a larger rolling reduction ratio than the specified rolling reduction ratio, the texture of austenite develops, and the X-ray random intensity ratios in the respective crystal orientations, such as the average value of the X-ray random intensity ratio of the {100} <011> to {223} <110> orientation group at least in a thickness central portion that is in a sheet thickness range of ⅝ to ⅜ from a steel sheet surface of less than 4.0 and the X-ray random intensity ratio of the {332} <113> crystal orientation of 5.0 or less, cannot be obtained in the finally obtained cold-rolled steel sheet.

Meanwhile, when rolling is carried out at a higher temperature than the specified temperature range or at a smaller rolling reduction ratio than the specified rolling reduction ratio, grain coarsening or duplex grains results, and the area fraction of crystal grains having a grain diameter of larger than 20 μm increases. Whether or not the above-specified rolling is carried out can be determined from the rolling reduction ratio, rolling load, sheet thickness measurement, or the like through actual performance or calculation. In addition, since the temperature can also be measured if a thermometer is present between stands, and calculation simulation in which working heat generation and the like are considered from line speed, rolling reduction ratio, and the like is available, whether or not the above-specified rolling is carried out can be determined using either or both of temperature and calculation simulation.

The hot rolling carried out in the above manner ends at a temperature of Ar3 or higher. When the end temperature of the hot rolling is lower than Ar3, since two-phase region rolling in an austenite area and a ferrite area is included, accumulation into the {100} <011> to {223} <110> orientation group becomes strong, and, consequently, local deformability significantly degrades.

As long as rL and r60 are 0.70 or more and 1.10 or less respectively, furthermore, favorable sheet thickness/minimum bending radius is greater than or equal to 2.0 is satisfied. In order to achieve the sheet thickness/minimum bending radius of greater than or equal to 2.0, the temperature increase of the steel sheet between the respective and it is desirable to employ cooling between stands, or the like.

Furthermore, cooling after rolling at the final rolling stand of rolling mill in a temperature range of T1+30° C. to T1+200° C. has a strong influence on the grain diameter of austenite, which has a strong influence on the equiaxed grain proportion and coarse grain proportion of a cold-rolled and annealed structure. Therefore, in a case in which a pass in which a rolling reduction ratio is 30% or more in a temperature range of T1+30° C. to T1+200° C. is defined as a large reduction pass, it is necessary for the waiting time t from completion of the final pass of the large reduction pass to initiation of cooling to satisfy the formula 4. When the time being too long, grains are coarsened and elongation significantly degrades. When the time being too short, recrystallization does not proceed and sufficient local deformability cannot be obtained. Therefore, it is not possible for the sheet thickness/minimum bending radius is greater than or equal to 2.0.

In addition, a cooling pattern after hot rolling is not particularly specified, and the effects of the present invention can be obtained by employing a cooling pattern for controlling the structure according to the respective objects.

During hot rolling, a sheet bar may be joined after rough rolling, and finishing rolling may be continuously carried out. At this time, a rough bar may be once rolled into a coil shape, stored in a cover having a heat-retention function as necessary, and again rolled back, whereby the rough bar is joined.

On the steel sheet for which the hot rolling has been completed, cold rolling is carried out at a rolling reduction ratio of 20% to 90%. At a rolling reduction ratio of less than 20%, it becomes difficult to cause recrystallization in a subsequent annealing process, and annealed crystal grains are coarsened and the equiaxed grain proportion decreases. At a rolling reduction ratio of more than 90%, since a texture develops during annealing, anisotropy becomes strong. Therefore, the rolling reduction ratio is set to 20% to 90% of cold rolling.

The cold-rolled steel sheet is, then, held in a temperature range of 720° C. to 900° C. for 1 second to 300 seconds. When the temperature is less than 720° C. or the holding time is less than 1 second, reverse transformation does not proceed sufficiently at a low temperature or for a short time, and a second phase cannot be obtained in a subsequent cooling process, and therefore a sufficient strength cannot be obtained. On the other hand, when the temperature exceeds 900° C. or the cold-rolled steel sheet is held for 300 seconds or more, crystal grains coarsen, and therefore the area fraction of crystal grains having a grain diameter of 20 μM or less increases. After that, the temperature is decreased to 500° C. or less at a cooling rate of 10° C./s to 200° C./s from 650° C. to 500° C. When the cooling rate is less than 10° C./s or the cooling ends at higher than 500° C., pearlite is generated, and therefore local deformability degrades. On the other hand, even when the cooling rate is set to more than 200° C./s, the effect of suppressing pearlite is saturated, and, conversely, the controllability of the cooling end temperature significantly deteriorates, and therefore the cooling rate is set to 200° C./s or less.

The structure of the cold-rolled steel sheet obtained in the embodiment includes ferrite, but may include pearlite, bainite, martensite, austenite, and compounds such as carbonitrides, as metallic structures other than ferrite. However, since pearlite deteriorates local deformability, the content of pearlite is desirably 5% or less. Since the crystal structure of martensite or bainite is the same as or similar to the crystal structure of ferrite, the structure may mainly include any of ferrite, bainite, and martensite.

Further, the cold-rolled steel sheet according to the present invention can be applied not only to bending working but also to combined forming composed mainly of bending, overhanging, drawing, and bending working.

Next, the method of manufacturing a galvanized steel sheet according to the embodiment will be described.

In order to realize excellent local deformability, in a steel sheet that has undergone a galvanizing treatment, it is important to form a texture having a predetermined X-ray random intensity ratio, satisfy the conditions of the r values in the respective directions. Details of the manufacturing conditions for satisfying the above will be described below.

A manufacturing method preceding hot rolling is not particularly limited. That is, subsequent to ingoting using a blast furnace, an electric furnace, or the like, a variety of secondary purifications are carried out, then, the ingot may be cast through a method, such as ordinary continuous casting, an ingot method, or thin slab casting. In the case of continuous casting, the ingot may be once cooled to a low temperature, reheated, and then hot-rolled, or a cast slab may also be hot-rolled as it is after casting without cooling the cast slab to a low temperature. Scraps may be used as a raw material.

The galvanized steel sheet having excellent local deformability according to the embodiment is obtained in a case in which the following conditions are satisfied.

Figure 32:
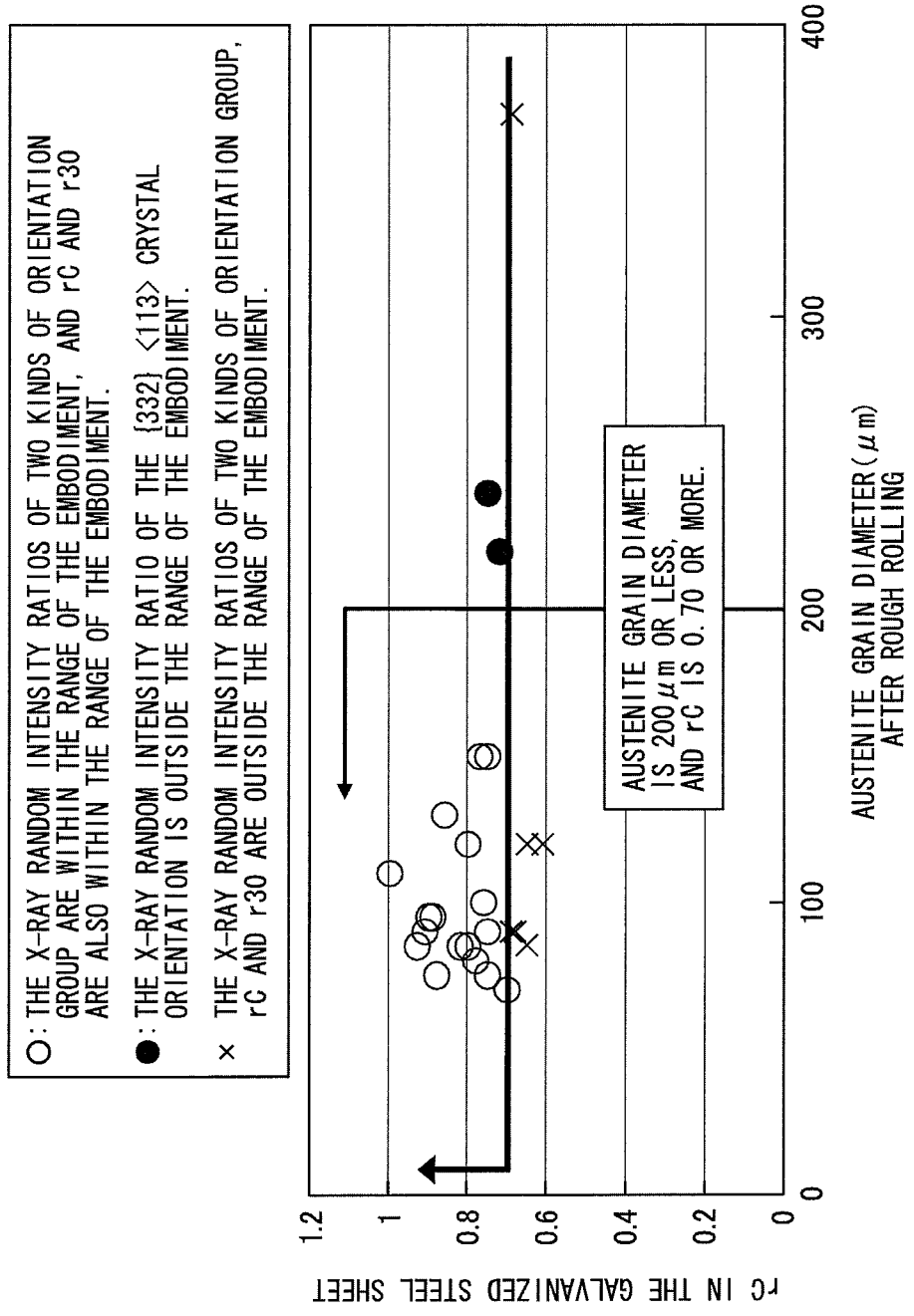
FIG. 32 is a view showing the relationship between the austenite grain diameter after the rough rolling and rC which is the r value in the perpendicular direction to the rolling direction in a galvanized steel sheet.
Figure 33:
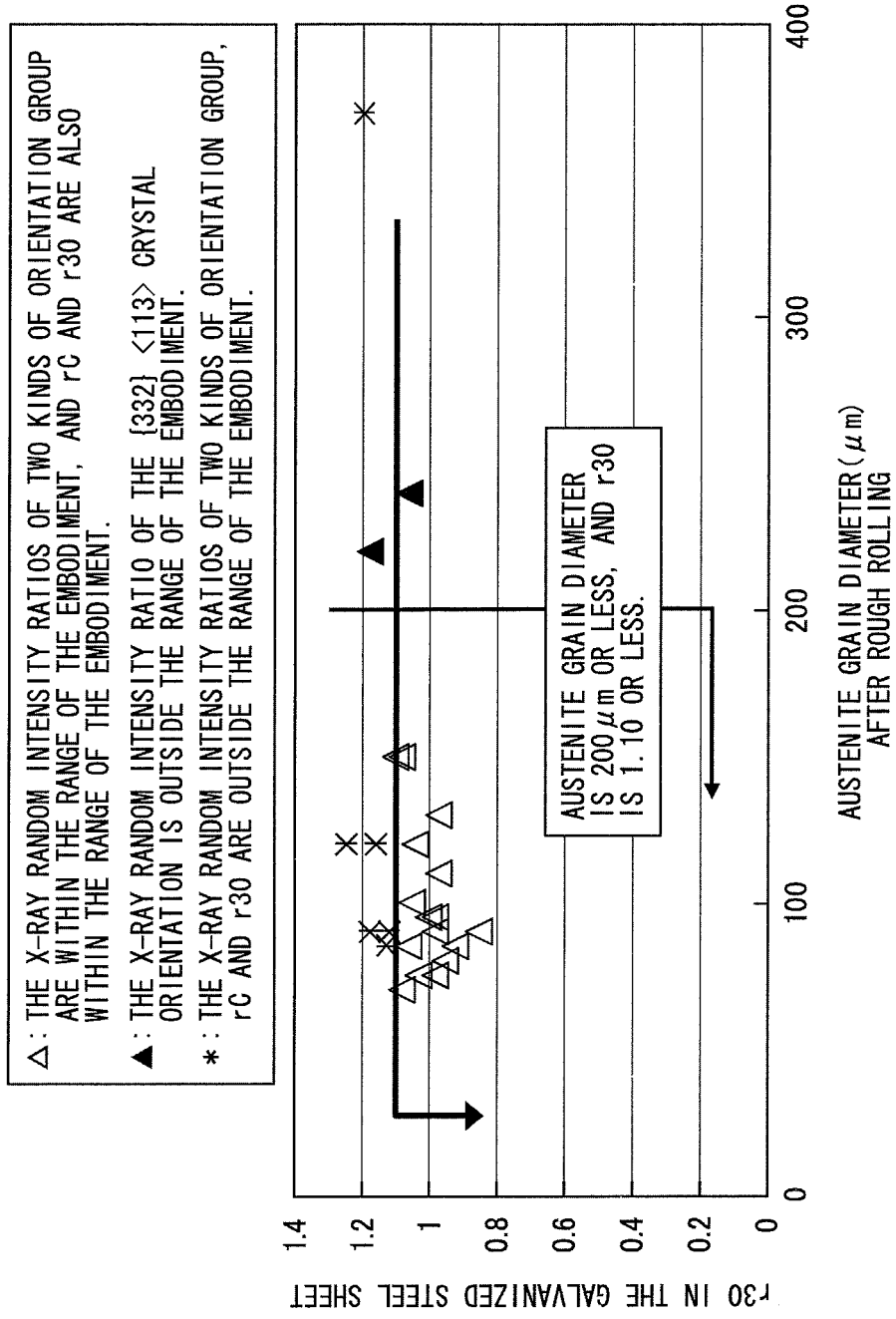
FIG. 33 is a view showing the relationship between the austenite grain diameter after the rough rolling and r30 which is the r value in the direction that forms an angle of 30° with respect to the rolling direction in the galvanized steel sheet.

Firstly, in order for rC and r30 to satisfy the above predetermined values, the austenite grain diameter after rough rolling, that is, before finishing rolling is important. As shown in FIGS. 32 and 33, the austenite grain diameter before finishing rolling is desirably small, and the above values are satisfied when the austenite grain diameter is 200 μm or less.

In order to obtain an austenite grain diameter before finishing rolling of 200 μm or less, as shown in FIG. 21, it is necessary to carry out the rough rolling in a temperature range of 1000° C. to 1200° C. and carry out rolling once or more at a rolling reduction ratio of at least 20% or more. However, in order to further enhance homogeneity and enhance elongation and local deformability, it is desirable to carry out rolling once or more at a rolling reduction ratio of at least 40% in terms of a rough rolling reduction ratio in a temperature range of 1000° C. to 1200° C.

In order to obtain austenite grains of 100 μm or less which are more preferable, one or more times of rolling, a total of two or more times of rolling at a rolling reduction ratio of 20% or more is further carried out. Desirably, rolling is carried out twice or more at 40% or more. As the rolling reduction ratio and the number of times of rolling increase, smaller grains can be obtained, but there is a concern that the temperature may decrease or scales may be excessively generated when the rolling exceeds 70% or the number of times of the rough rolling exceeds 10 times. As such, a decrease in the austenite grain diameter before finishing rolling is effective to improve local deformability through acceleration of recrystallization of austenite during subsequent finishing rolling, particularly through control of rL or r30.

The reason why refinement of the austenite grain diameter has an influence on local deformability is assumed to be that austenite grain boundaries after the rough rolling, that is, austenite grain boundaries before the finishing rolling function as one of recrystallization nuclei during the finishing rolling.

In order to confirm the austenite grain diameter after the rough rolling, it is desirable to cool a sheet piece that is about to be finishing-rolled as rapidly as possible. The sheet piece is cooled at a cooling rate of 10° C./s or more, the structure on the cross section of the sheet piece is etched, austenite grain boundaries are made to appear, and the austenite grain diameter is measured using an optical microscope. At this time, the austenite grain diameter is measured at a magnification of 50 times or more at 20 sites or more through an image analysis or a point counter method. Furthermore, the austenite grain diameter is desirably 100 μm or less in order to enhance local deformability.

In addition, in order to achieve an average value of the X-ray random intensity ratio of the {100} <011> to {223} <110> orientation group in a thickness central portion that is in a sheet thickness range of ⅝ to ⅜ from the steel sheet surface and an X-ray random intensity ratio of the {332} <113> crystal orientation in the above value ranges, based on the T1 temperature determined by the steel sheet components specified in the formula 1 in the finishing rolling after the rough rolling, working is carried out at a large rolling reduction ratio in a temperature range of T1+30° C. to T1+200° C., desirably in a temperature range of T1+50° C. to T1+100° C., and working is carried out at a small rolling reduction ratio in a temperature range of T1° C. to lower than T1+30° C. According to the above, the local deformability and shape of a final hot-rolled product can be secured.

FIGS. 34 to 37 show the relationships between the rolling reduction ratios in the respective temperature ranges and the X-ray random intensity ratios of the respective orientations.

Figure 34:
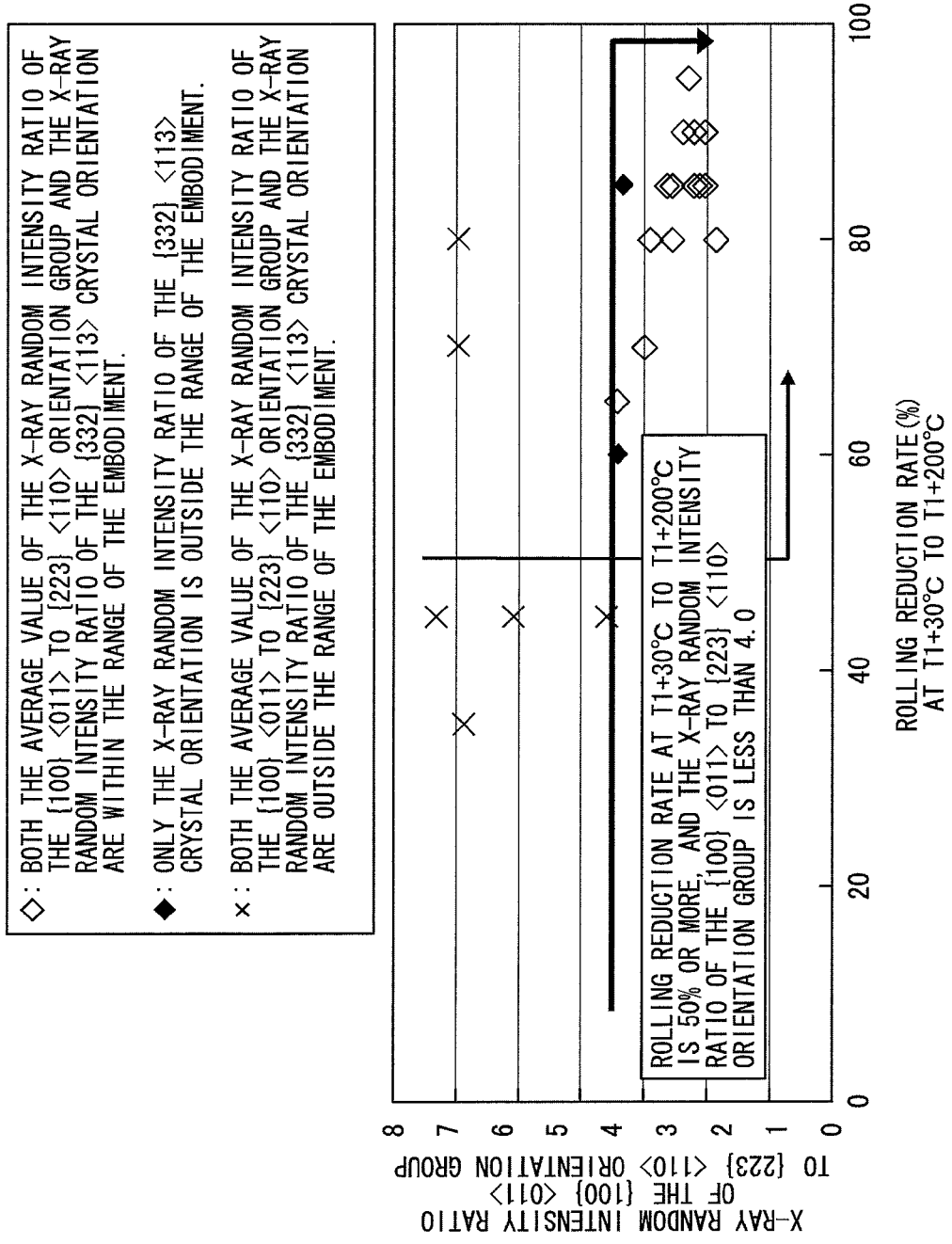
FIG. 34 is a view showing the relationship between the total rolling reduction ratio in a temperature range of T1+30° C. to T1+200° C. and the average value of the X-ray random intensity ratio of the {100} <011> to {223} <110> orientation group in the galvanized steel sheet.
Figure 35:
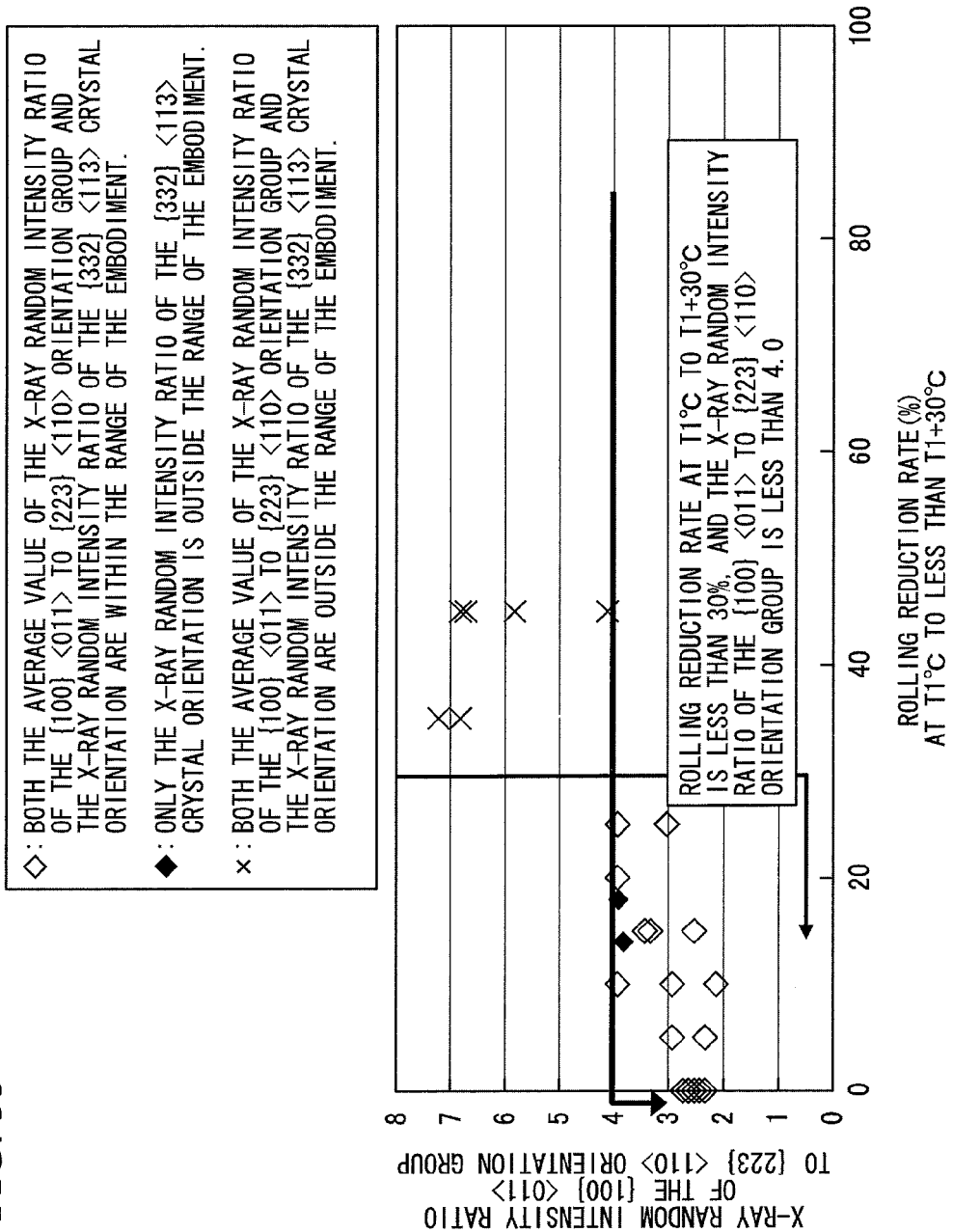
FIG. 35 is a view showing the relationship between the total rolling reduction ratio in a temperature range of T1° C. to lower than T1+30° C. and the average value of the X-ray random intensity ratio of the {100} <011> to {223} <110> orientation group in the galvanized steel sheet.
Figure 36:
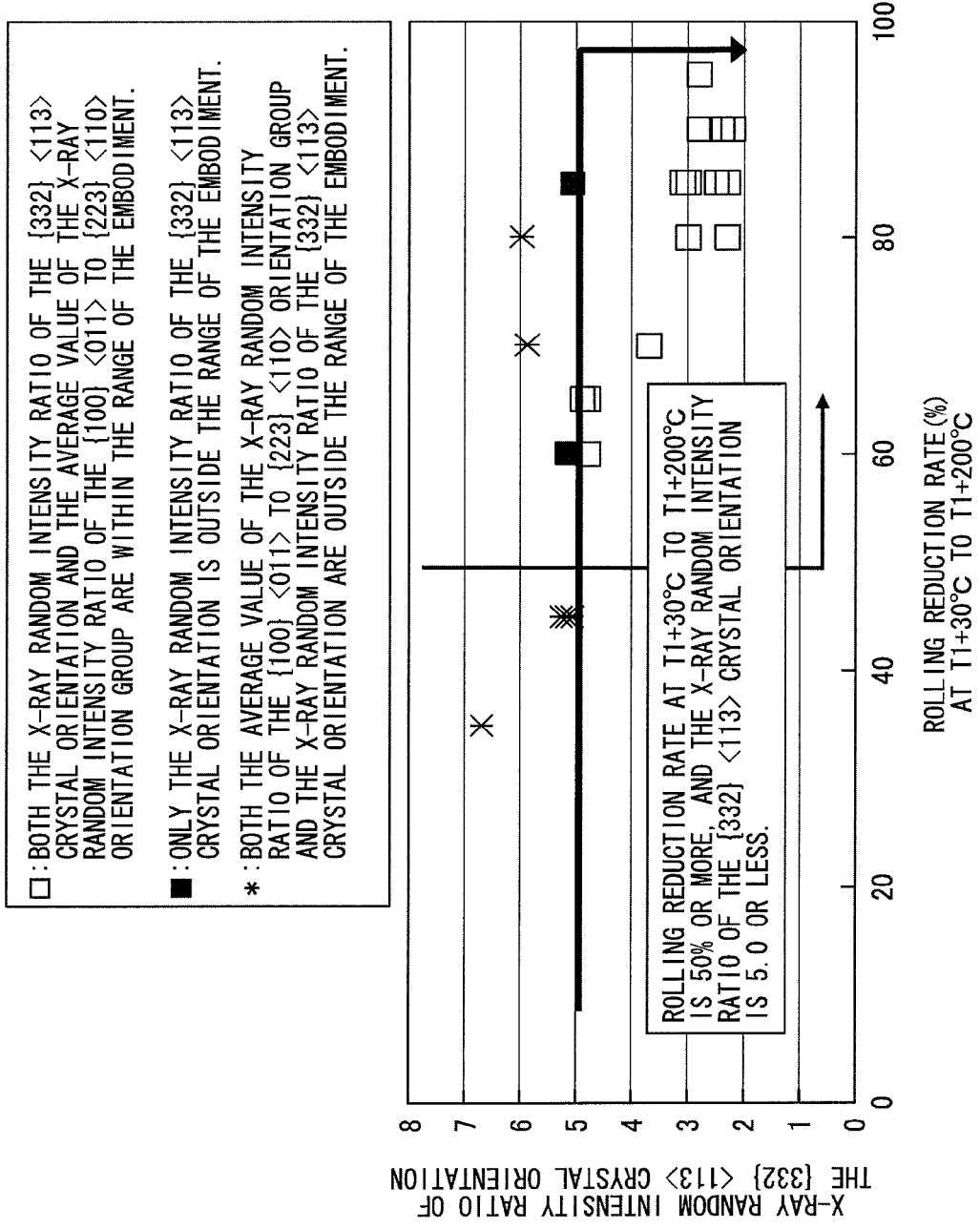
FIG. 36 is a view showing the relationship between the total rolling reduction ratio in a temperature range of T1+30° C. to T1+200° C. and the X-ray random intensity ratio of the {332} <113> crystal orientation in the galvanized steel sheet.
Figure 37:
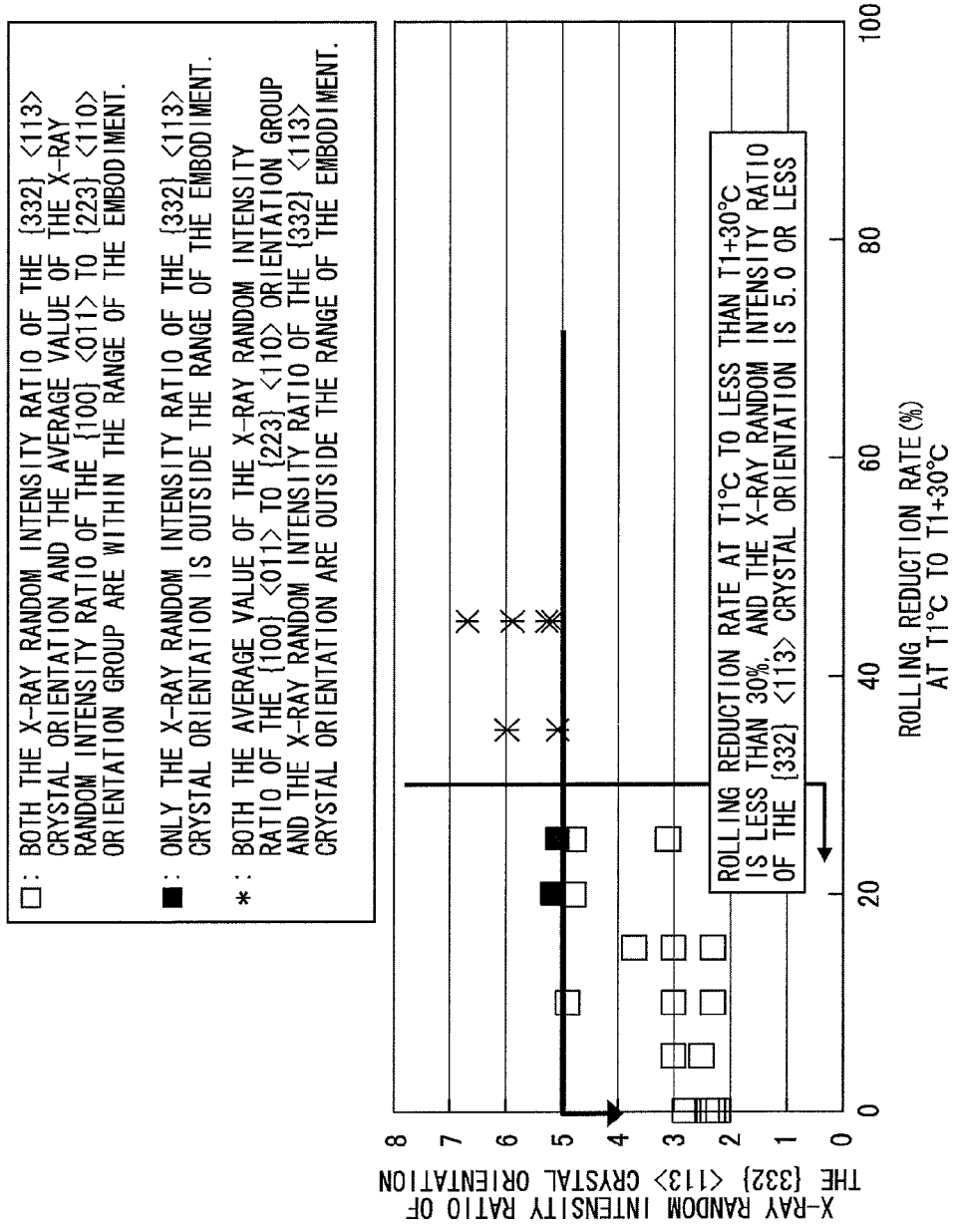
FIG. 37 is a view showing the relationship between the total rolling reduction ratio in a temperature range of T1° C. to lower than T1+30° C. and the X-ray random intensity ratio of the {332} <113> crystal orientation in the galvanized steel sheet.

That is, large reduction at a total rolling reduction ratio of 50% or more in a temperature range of T1+30° C. to T1+200° C. as shown in FIGS. 34 and 36 and subsequent light rolling at a total rolling reduction ratio of less than 30% or more at T1° C. to lower than T1+30° C. as shown in FIGS. 35 and 37 control the average value of the X-ray random intensity ratio of the {100} <011> to {22} <110> orientation group in a thickness central portion that is in a sheet thickness range of ⅝ to ⅜ from the steel sheet surface, and the X-ray random intensity ratio of the {332} <113> crystal orientation so as to drastically improve the local deformability of the final hot-rolled product. The T1 temperature is experimentally obtained, and the inventors and the like found from experiments that recrystallization in the austenite range of the respective steels is accelerated with the T1 temperature as a basis.

Furthermore, in order to obtain more favorable local deformability, it is important to accumulate strain through the large reduction or repeatedly recrystallize the structure every rolling. For strain accumulation, the total rolling reduction ratio needs to be 50% or more, more desirably 60% or more, and still more desirably 70% or more, and the temperature increase of the steel sheet between passes is desirably 18° C. or lower. On the other hand, achieving a rolling reduction ratio of more than 90% is not desirable from the viewpoint of temperature securement or excessive rolling load. Furthermore, in order to enhance the homogeneity of a hot-rolled sheet, and enhance the local deformability to the extreme, among the rolling passes in a temperature range of T1+30° C. to T1+200° C., in at least one pass, rolling is carried out at a rolling reduction ratio of 30% or more, and desirably at 40% or more. Meanwhile, when the rolling reduction ratio exceeds 70% in a pass, there is a concern that the shape may be impaired. In a case in which there is a demand for more favorable workability, it is more desirable to set the rolling reduction ratio to 30% or more in the final 2 passes.

Furthermore, in order to accelerate uniform recrystallization through releasing of accumulated strain, it is necessary to suppress as much as possible the working amount in a temperature range of T1° C. to lower than T1+30° C. after the large reduction at T1+30° C. to T1+200° C., and the total rolling rate at T1° C. to lower than T1+30° C. is set to less than 30%. A rolling reduction ratio of 10% or more is desirable from the viewpoint of the sheet shape, but a rolling reduction ratio of 0% is desirable in a case in which local deformability is focused. When the rolling reduction ratio at T1° C. to lower than T1+30° C. exceeds a predetermined range, recrystallized austenite grains are expanded, and, when the retention time is short, recrystallization does not sufficiently proceed, and the local deformability deteriorates. That is, in the manufacturing conditions according to the embodiment, it is important to uniformly and finely recrystallize austenite during finishing rolling so as to control the texture of a hot-rolled product in order to improve local deformability, such as hole expanding properties or bending properties.

When rolling is carried out at a lower temperature than the temperature range specified above or at a larger rolling reduction ratio than the specified rolling reduction ratio, the texture of austenite develops, and the X-ray random intensity ratios in the respective crystal orientations, such as the average value of the X-ray random intensity ratio of the {100} <011> to {22} <110> orientation group at least in a thickness central portion that is in a sheet thickness range of ⅝ to ⅜ from a steel sheet surface of less than 4.0, and the X-ray random intensity ratio of the {332} <113> crystal orientation of 5.0 or less, cannot be obtained in the finally obtained galvanized steel sheet. Meanwhile, when rolling is carried out at a higher temperature than the specified temperature range or at a smaller rolling reduction ratio than the specified rolling reduction ratio, grain coarsening or duplex grains results, and, consequently, local deformability significantly degrades. Whether or not the above-specified rolling is carried out can be determined from rolling reduction ratio, rolling load, sheet thickness measurement, or the like through actual performance or calculation. In addition, since the temperature can be also measured if a thermometer is present between stands, and calculation simulation in which working heat generation and the like are considered from line speed, rolling reduction ratio, and the like is available, whether or not the above-specified rolling is carried out can be determined using either or both of temperature and calculation simulation.

The hot rolling carried out in the above manner ends at a temperature of Ar3 or higher. When the end temperature of the hot rolling is lower than Ar3, since two-phase region rolling in an austenite area and a ferrite area is included, accumulation into the {100} <011> to {223} <110> orientation group becomes strong, and, consequently, local deformability significantly degrades.

Furthermore, as long as rL and r60 are 0.70 or more and 1.10 or less respectively, furthermore, the sheet thickness/minimum bending radius is greater than or equal to 2.0. In order to achieve the sheet thickness/minimum bending radius of greater than or equal to 2.0, in a case in which a pass in which a rolling reduction ratio is 30% or more in a temperature range of T1+30° C. to T1+200° C. is defined as a large reduction pass, it is important for the waiting time t (seconds) from completion of the final pass of the large reduction pass to initiation of cooling to satisfy the formula 6.

Figure 38:
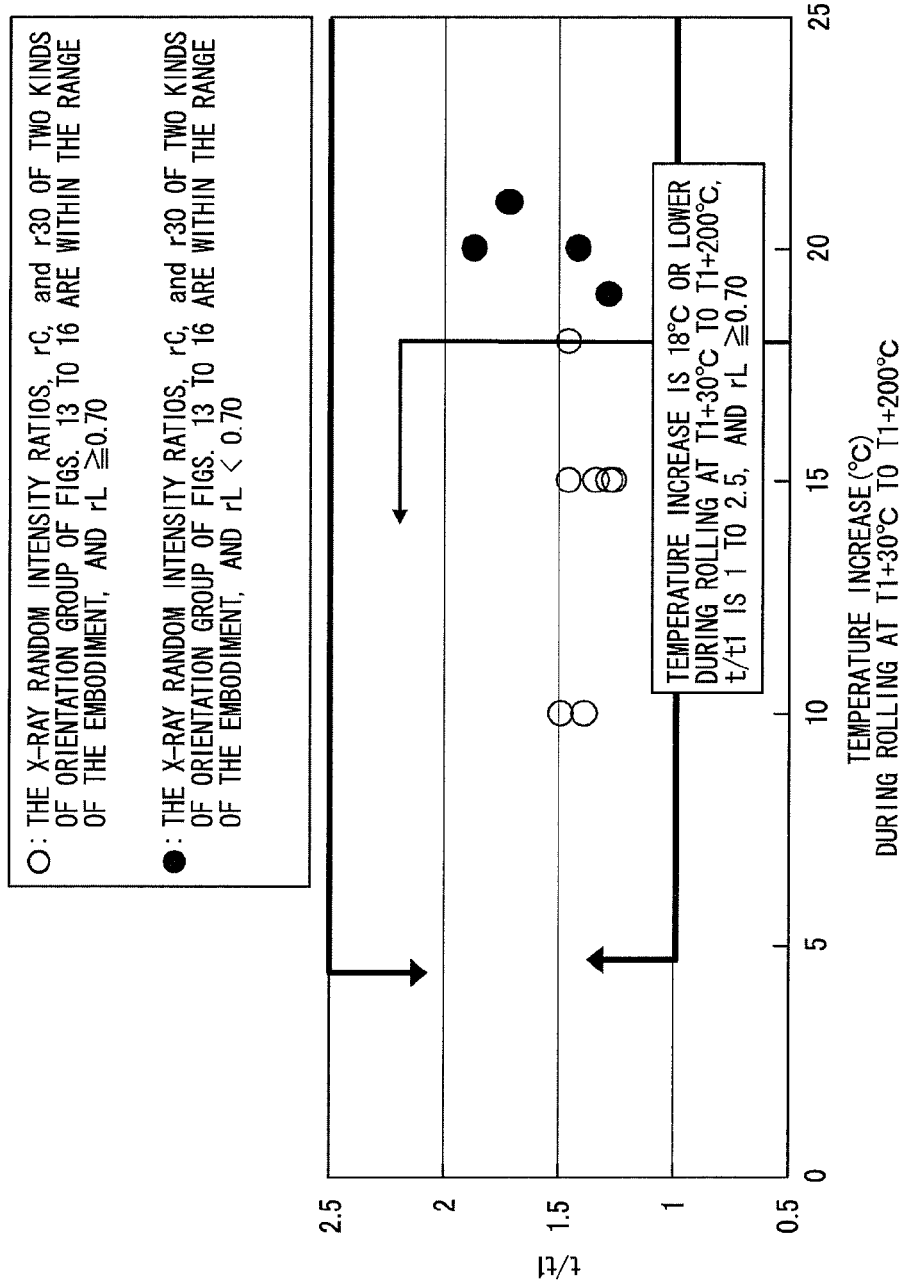
FIG. 38 is a view showing the relationship among a maximum temperature increase amount of the steel sheet between the respective passes during rolling in a temperature range of T1+30° C. to T1+200° C., the waiting time from completion of a final pass of the large reduction pass to initiation of cooling in a case in which the pass in which the rolling reduction ratio is 30% or more in the temperature range of T1+30° C. to T1+200° C. is defined as a large reduction pass, and rL which is the r value in the rolling direction in the galvanized steel sheet.
Figure 39:
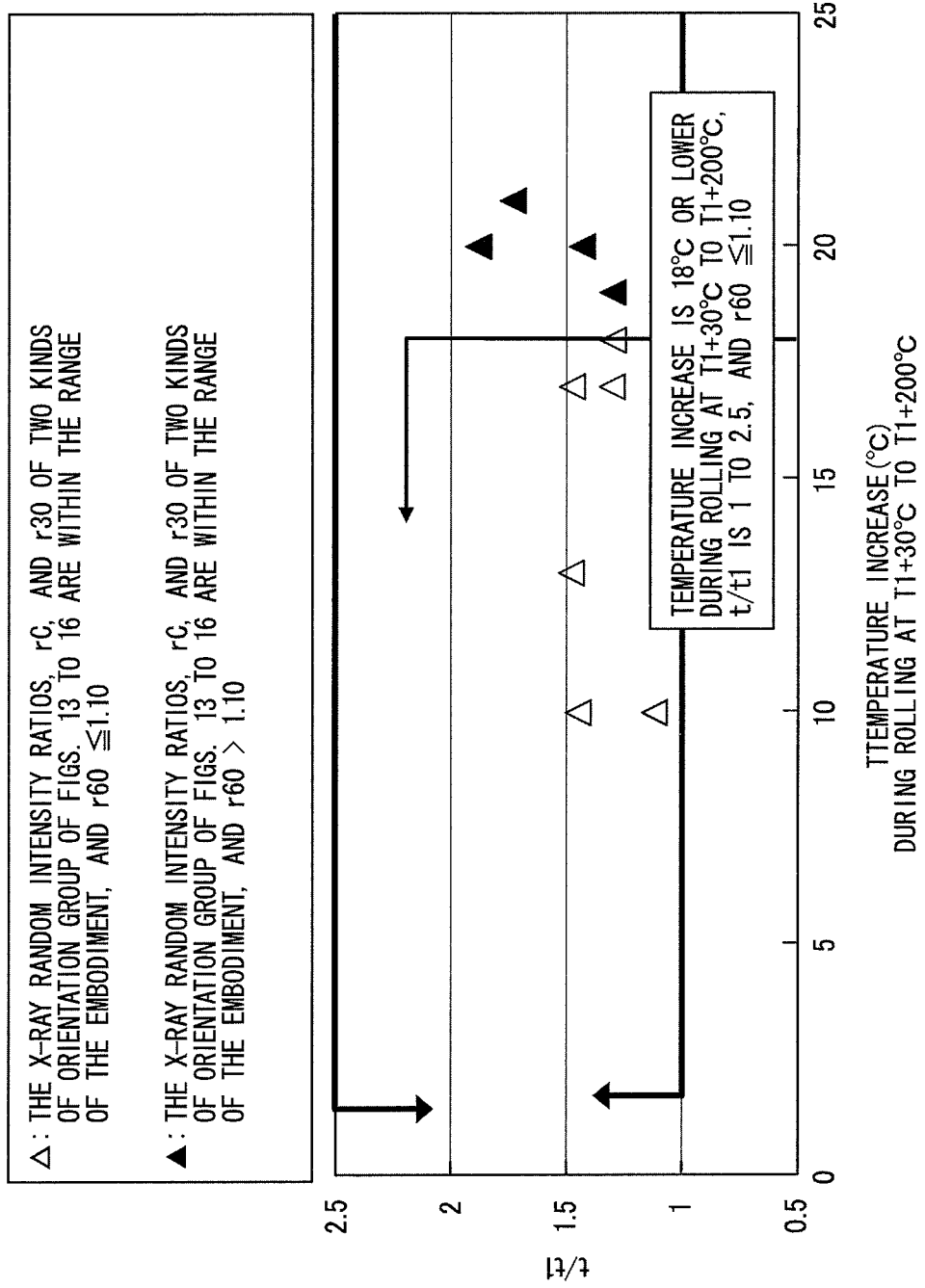
FIG. 39 is a view showing the relationship among a maximum temperature increase amount of the steel sheet between the respective passes during rolling in a temperature range of T1+30° C. to T1+200° C., a waiting time from completion of a final pass of the large reduction pass to initiation of cooling in a case in which the pass in which the rolling reduction ratio is 30% or more in the temperature range of T1+30° C. to T1+200° C. is defined as a large reduction pass, and r60 which is the r value in the direction that forms an angle of 60° with respect to the rolling direction in the galvanized steel sheet.
Figure 40:
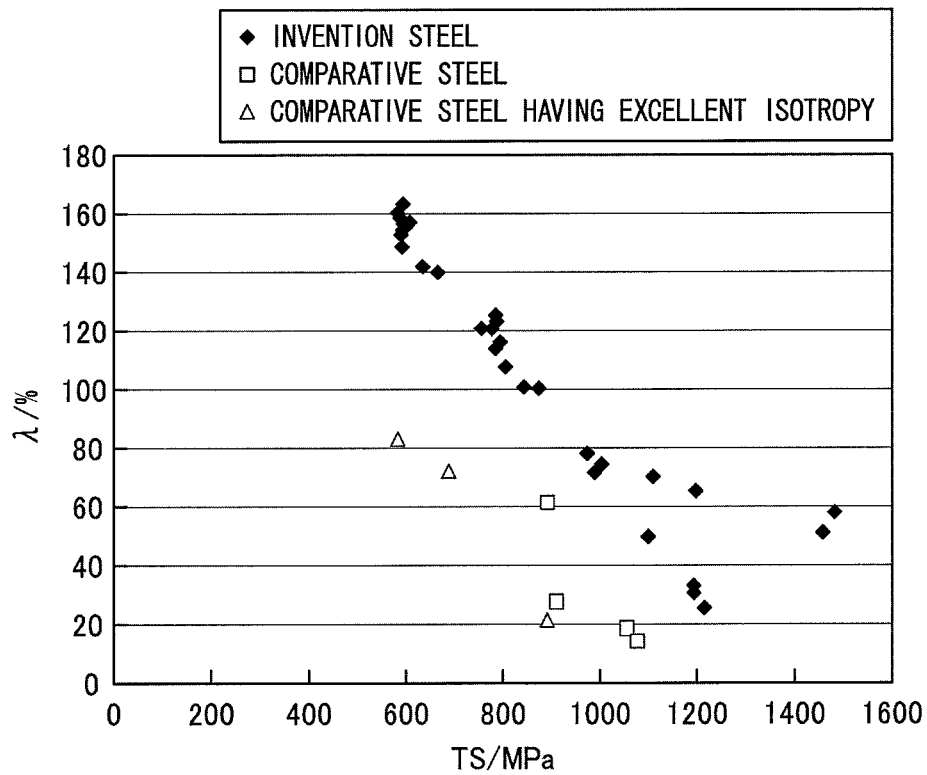
FIG. 40 is a view showing the relationship between strength and hole expanding properties of the hot-rolled steel sheet of the embodiment and a comparative steel.
Figure 41:
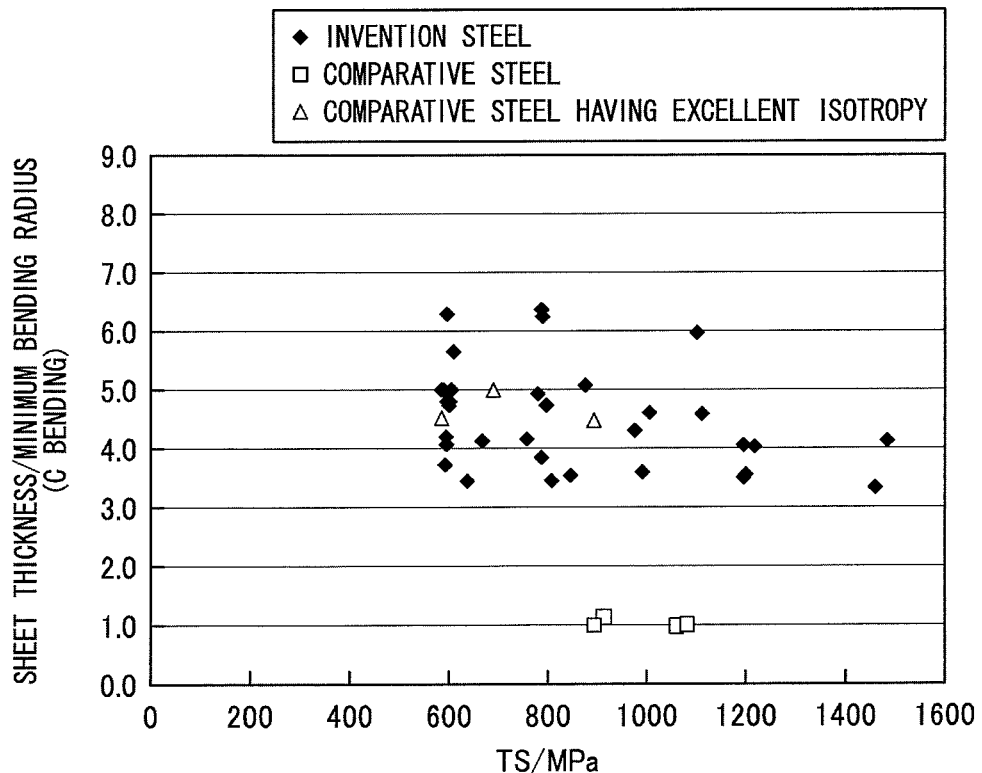
FIG. 41 is a view showing the relationship between strength and bending properties of the hot-rolled steel sheet of the embodiment and the comparative steel.
Figure 42:
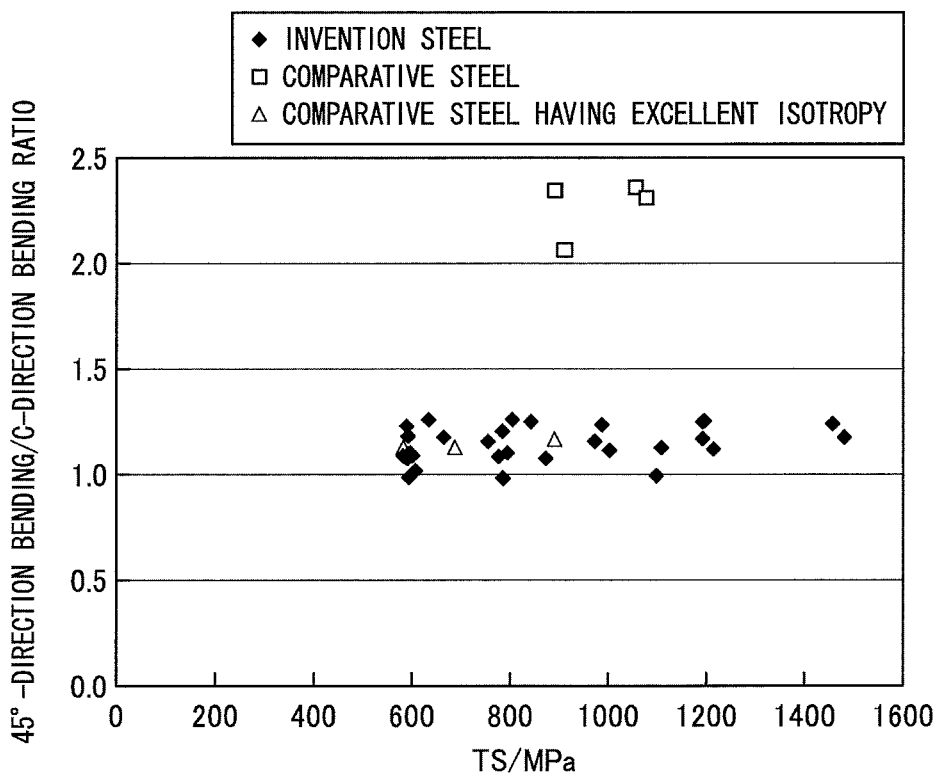
FIG. 42 is a view showing the relationship between strength and the anisotropy of formability of the hot-rolled steel sheet of the embodiment and the comparative steel.
Figure 43:
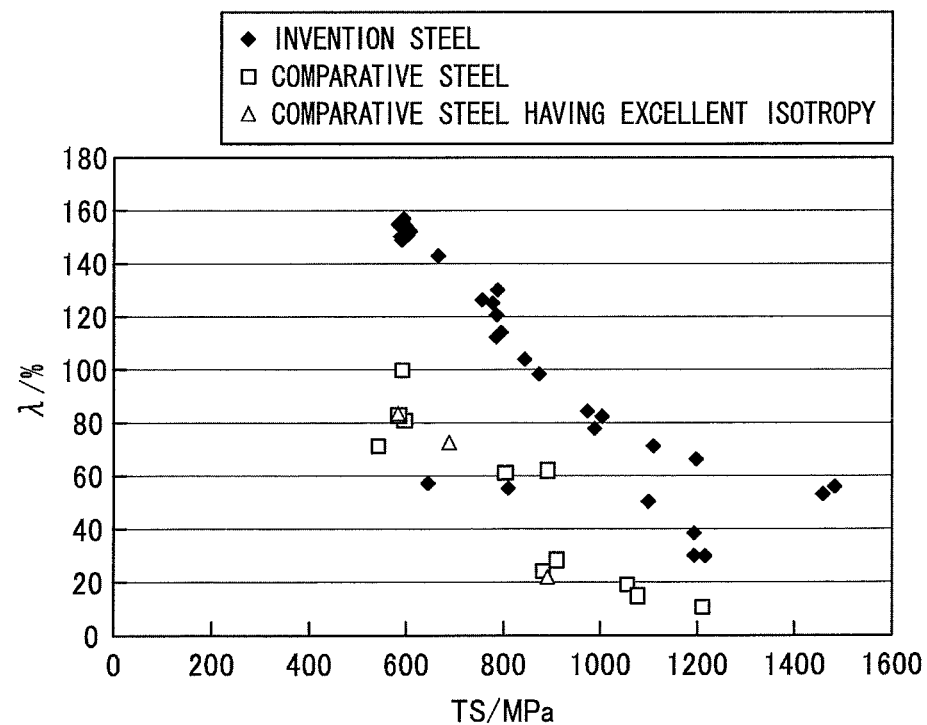
FIG. 43 is a view showing the relationship between strength and hole expanding properties of the cold-rolled steel sheet of the embodiment and the comparative steel.
Figure 44:
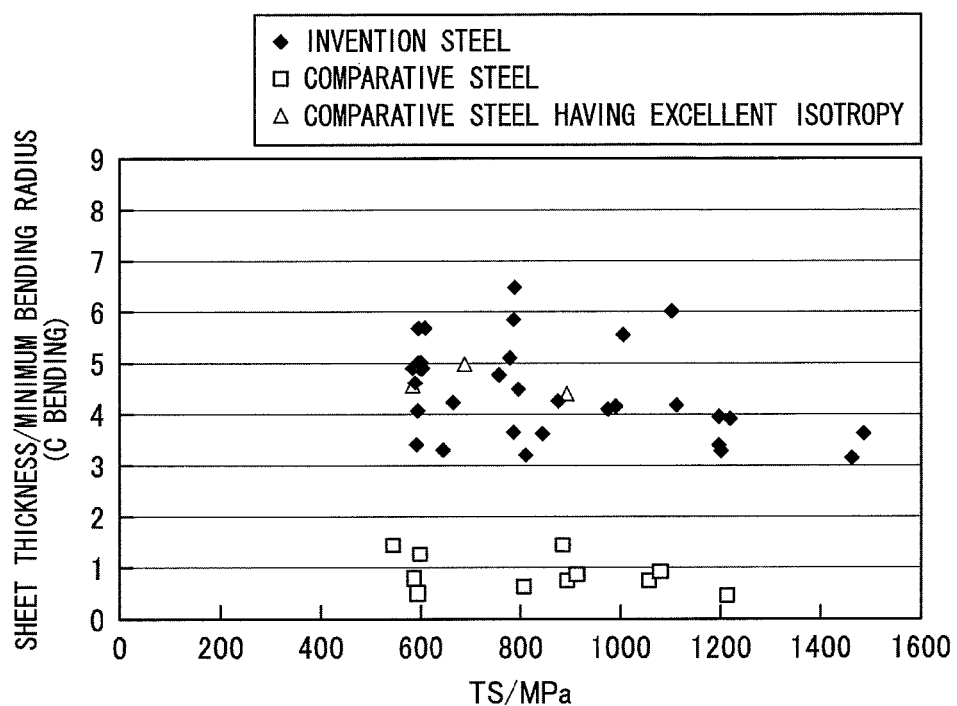
FIG. 44 is a view showing the relationship between strength and bending properties of the cold-rolled steel sheet of the embodiment and the comparative steel.
Figure 45:
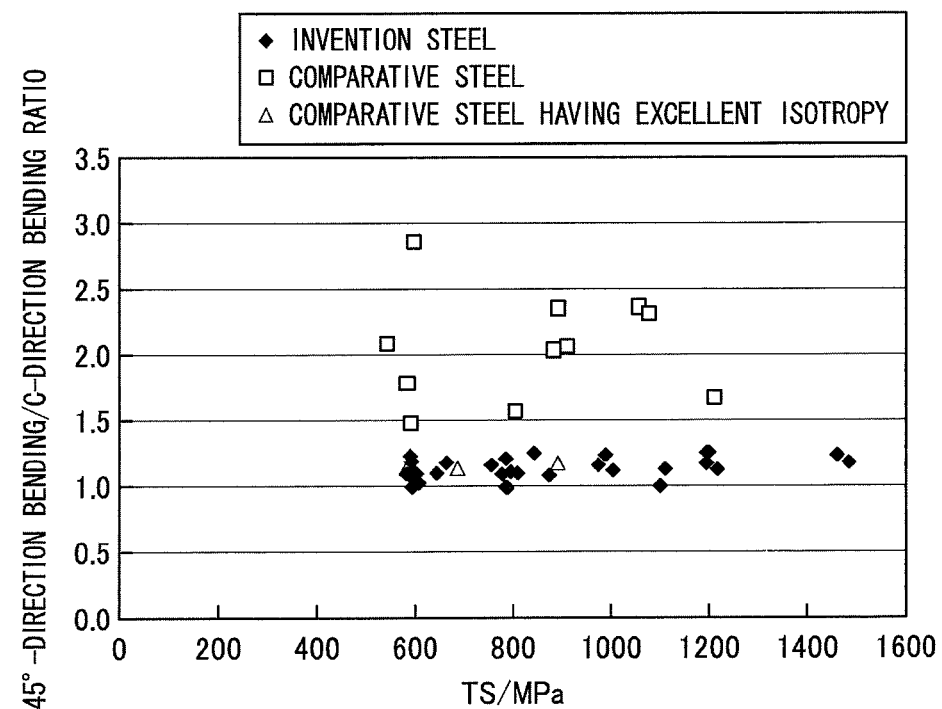
FIG. 45 is a view showing the relationship between strength and the anisotropy of formability of the cold-rolled steel sheet of the embodiment and the comparative steel.

FIGS. 38 and 39 show the relationship among the temperature increase of the steel sheet during rolling at T1+30° C. to T1+200° C., the waiting time t, rL, and r60.

The waiting time t satisfying the formula 6 and, furthermore, suppression of the temperature increase of the steel sheet at T1+30° C. to T1+200° C. to 18° C. or lower in the respective passes are effective to obtain uniformly recrystallized austenite.

Further, in a case in which the temperature increase at T1+30° C. to T1+200° C. is too low such that a predetermined rolling reduction ratio cannot be obtained in a range of T1+30° C. to T1+200° C., recrystallization is suppressed, and, in a case in which the waiting time t does not satisfy the formula 6, by the time being too long, grains are coarsened and, by the time being too short, recrystallization does not proceed and sufficient local deformability cannot be obtained.

A cooling pattern after hot rolling is not particularly specified, and the effects of the present invention can be obtained by employing a cooling pattern for controlling the structure according to the respective objects. However, when the winding temperature exceeds 680° C., since there is a concern that surface oxidation may proceed or bending properties after cold rolling or annealing may be adversely influenced, the winding temperature is set to a temperature from room temperature to 680° C.

During hot rolling, a sheet bar may be joined after rough rolling, and finishing rolling may be continuously carried out. At this time, a rough bar may be once rolled into a coil shape, stored in a cover having a heat-retention function as necessary, and again rolled back, whereby the rough bar is joined. Skin pass rolling may be carried out on the hot-rolled steel sheet as necessary. Skin pass rolling has an effect of preventing stretched strain occurring during working forming or flatness correction.

In addition, the steel sheet for which the hot rolling has been completed is subjected to pickling, and then cold rolling at a rolling reduction ratio of 20% to 90%. When the rolling reduction ratio is less than 20%, there is a concern that sufficient cold-rolled recrystallized structures may not be formed, and mixed grains may be formed. In addition, when the rolling reduction ratio exceeds 90%, there is a concern of rupture due to cracking. The effects of the present invention can be obtained even when a heat treatment pattern for controlling the structure in accordance with purposes is employed as the heat treatment pattern of annealing.

However, in order to obtain a sufficient cold-rolled recrystallized equiaxed structure and satisfy conditions in the ranges of the present application, it is necessary to heat the steel sheet to a temperature range of at least 650° C. to 900° C., anneal the steel sheet for a holding time of 1 second to 300 seconds, and then carry out primary cooling to a temperature range of 720° C. to 580° C. at a cooling rate of 0.1° C./s to 100° C./s. When the holding temperature is lower than 650° C., or the holding time is less than 1 second, a sufficient recovered recrystallized structure cannot be obtained. In addition, when the holding temperature exceeds 900° C., or the holding time exceeds 300 seconds, there is a concern of oxidation or coarsening of grains. In addition, when the cooling rate is less than 0.1° C./s, or the temperature range exceeds 720° C. in the temporary cooling, there is a concern that a sufficient amount of transformation may not be obtained. In addition, in a case in which the cooling rate exceeds 100° C./s, or the temperature range is lower than 580° C., there is a concern of coarsening of grains and the like.

After that, according to an ordinary method, a galvanizing treatment is carried out so as to obtain a galvanized steel sheet.

The structure of the galvanized steel sheet obtained in the embodiment mainly includes ferrite, but may include pearlite, bainite, martensite, austenite, and compounds such as carbonitrides, as metallic structures other than ferrite. Since the crystal structure of martensite or bainite is the same as or similar to the crystal structure of ferrite, the structure may mainly include any of ferrite, bainite, and martensite.

The galvanized steel sheet according to the present invention can be applied not only to bending working but also to combined forming composed mainly of bending, overhanging, drawing, and bending working.

Example 1

The technical content of the hot-rolled steel sheet according to the embodiment will be described using examples of the present invention.

The results of studies in which steels of AA to Bg having the component compositions shown in Table 1 were used as examples will be described.

[Table 1]

TABLE 1

| | Chemical components (mass %) | | | | | | | | | |
|---|---|---|---|---|---|---|---|---|---|---|
| | (1/4) | | | | | | | | | |
| | T1/° C. | C | Si | Mn | P | S | Al | N | O | Ti | Nb |
| AA | 851 | 0.070 | 0.08 | 1.30 | 0.015 | 0.004 | 0.040 | 0.0026 | 0.0032 | — | — |
| AB | 865 | 0.080 | 0.31 | 1.35 | 0.012 | 0.005 | 0.016 | 0.0032 | 0.0023 | — | 0.041 |
| AC | 858 | 0.060 | 0.87 | 1.20 | 0.009 | 0.004 | 0.038 | 0.0033 | 0.0026 | — | 0.021 |
| AD | 865 | 0.210 | 0.15 | 1.62 | 0.012 | 0.003 | 0.026 | 0.0033 | 0.0021 | 0.021 | — |
| AE | 861 | 0.035 | 0.67 | 1.88 | 0.015 | 0.003 | 0.045 | 0.0028 | 0.0029 | — | 0.021 |
| AF | 875 | 0.180 | 0.48 | 2.72 | 0.009 | 0.003 | 0.050 | 0.0036 | 0.0022 | — | — |
| AG | 892 | 0.060 | 0.11 | 2.12 | 0.010 | 0.005 | 0.033 | 0.0028 | 0.0035 | 0.036 | 0.089 |
| AH | 903 | 0.040 | 0.13 | 1.33 | 0.010 | 0.005 | 0.038 | 0.0032 | 0.0026 | 0.042 | 0.121 |
| AI | 855 | 0.350 | 0.52 | 1.33 | 0.260 | 0.003 | 0.045 | 0.0026 | 0.0019 | — | — |

TABLE 1-continued

| Chemical components (mass %) | | | | | | | | | | |
|---|---|---|---|---|---|---|---|---|---|---|
| AJ | 1376 | 0.072 | 0.15 | 1.42 | 0.014 | 0.004 | 0.036 | 0.0022 | 0.0025 | — | 1.5 |
| AK | 851 | 0.110 | 0.23 | 1.12 | 0.021 | 0.003 | 0.026 | 0.0025 | 0.0023 | — | — |
| AL | 1154 | 0.250 | 0.23 | 1.56 | 0.024 | 0.120 | 0.034 | 0.0022 | 0.0023 | — | — |
| BA | 864 | 0.078 | 0.82 | 2.05 | 0.012 | 0.004 | 0.032 | 0.0026 | 0.0032 | 0.02 | 0.02 |
| BB | 852 | 0.085 | 0.75 | 2.25 | 0.012 | 0.003 | 0.035 | 0.0032 | 0.0023 | — | — |
| BC | 866 | 0.110 | 0.10 | 1.55 | 0.02 | 0.004 | 0.038 | 0.0033 | 0.0026 | — | 0.04 |
| BD | 863 | 0.350 | 1.80 | 2.33 | 0.012 | 0.003 | 0.710 | 0.0033 | 0.0021 | 0.02 | |
| BE | 859 | 0.120 | 0.22 | 1.35 | 0.015 | 0.003 | 0.025 | 0.0055 | 0.0029 | — | 0.02 |
| BF | 884 | 0.068 | 0.50 | 3.20 | 0.122 | 0.002 | 0.040 | 0.0032 | 0.0038 | 0.03 | 0.07 |
| BG | 858 | 0.130 | 0.24 | 1.54 | 0.010 | 0.001 | 0.038 | 0.0025 | 0.0029 | — | 0.02 |
| BH | 899 | 0.035 | 0.05 | 2.20 | 0.010 | 0.020 | 0.021 | 0.0019 | 0.0023 | 0.15 | 0.03 |
| BI | 852 | 0.090 | 1.25 | 1.88 | 0.014 | 0.002 | 0.030 | 0.0030 | 0.0030 | — | — |
| BJ | 852 | 0.115 | 1.10 | 1.46 | 0.008 | 0.002 | 0.850 | 0.0034 | 0.0031 | — | — |
| BK | 861 | 0.144 | 0.45 | 2.52 | 0.007 | 0.001 | 0.021 | 0.0024 | 0.0031 | 0.03 | — |

(2/4)

| | B | Mg | Rem | Ca | Mo | Cr | W | As | V | Others | Note |
|---|---|---|---|---|---|---|---|---|---|---|---|
| AA | — | — | — | — | — | — | — | — | — | — | Invention steel |
| AB | — | — | — | — | — | — | — | — | — | — | Invention steel |
| AC | — | — | 0.0015 | — | — | — | — | — | — | — | Invention steel |
| AD | 0.0022 | — | — | — | 0.03 | 0.35 | — | — | — | — | Invention steel |
| AE | — | 0.002 | — | 0.0015 | — | — | — | — | 0.029 | — | Invention steel |
| AF | — | 0.002 | — | — | 0.10 | — | — | — | 0.10 | — | Invention steel |
| AG | 0.0012 | — | — | — | — | — | — | — | — | — | Invention steel |
| AH | 0.0009 | — | — | — | — | — | — | — | — | — | Invention steel |
| AI | — | — | — | — | — | — | — | — | — | — | Comparative steel |
| AJ | — | — | — | — | — | — | — | — | — | — | Comparative steel |
| AK | — | 0.150 | — | — | — | — | — | — | — | — | Comparative steel |
| AL | — | — | — | — | — | 5.0 | — | — | 2.50 | — | Comparative steel |
| BA | — | — | — | — | — | — | — | — | — | — | Invention steel |
| BB | — | — | — | — | — | — | — | — | — | Co: 0.5% Sn: 0.02% | Invention steel |
| BC | — | — | — | — | — | — | — | — | — | — | Invention steel |
| BD | 0.0020 | — | 0.0035 | — | — | — | — | — | — | — | Invention steel |
| BE | — | — | — | — | — | — | — | — | — | — | Invention steel |
| BF | — | — | 0.0044 | — | — | 0.10 | — | — | — | — | Invention steel |
| BG | — | — | — | — | — | — | — | — | — | — | Invention steel |
| BH | — | — | 0.0005 | 0.0009 | — | — | 0.05 | — | — | — | Invention steel |
| BI | — | — | — | — | — | — | — | — | — | — | Invention steel |
| BJ | — | — | — | — | — | — | — | — | — | — | Invention steel |
| BK | — | — | — | — | — | — | — | — | — | Cu: 0.5%, Ni: 0.25%, Zr: 0.02% | Invention steel |

(3/4)

| | T1/° C. | C | Si | Mn | P | S | Al | N | O | Ti | Nb |
|---|---|---|---|---|---|---|---|---|---|---|---|
| BL | 853 | 0.190 | 1.40 | 1.78 | 0.011 | 0.002 | 0.018 | 0.0032 | 0.0028 | — | — |
| BM | 866 | 0.080 | 0.10 | 1.40 | 0.007 | 0.002 | 1.700 | 0.0033 | 0.0034 | — | — |
| BN | 852 | 0.062 | 0.72 | 2.82 | 0.009 | 0.002 | 0.035 | 0.0033 | 0.0022 | — | — |
| BO | 885 | 0.120 | 0.80 | 2.20 | 0.008 | 0.002 | 0.035 | 0.0022 | 0.0035 | 0.05 | — |
| BP | 873 | 0.190 | 0.55 | 2.77 | 0.009 | 0.002 | 0.032 | 0.0033 | 0.0036 | 0.04 | — |
| BQ | 852 | 0.082 | 0.77 | 1.82 | 0.008 | 0.003 | 0.025 | 0.0032 | 0.0031 | — | — |
| BR | 875 | 0.030 | 1.00 | 2.40 | 0.005 | 0.001 | 0.033 | 0.0022 | 0.0011 | 0.05 | 0.01 |

TABLE 1-continued

Chemical components (mass %)

| | | | | | | | | | | | |
|---|---|---|---|---|---|---|---|---|---|---|---|
| BS | 852 | 0.077 | 0.45 | 2.05 | 0.009 | 0.003 | 0.025 | 0.0029 | 0.0031 | — | — |
| BT | 861 | 0.142 | 0.70 | 2.44 | 0.008 | 0.002 | 0.030 | 0.0032 | 0.0035 | 0.03 | — |
| BU | 876 | 0.009 | 0.10 | 1.40 | 0.006 | 0.001 | 0.003 | 0.0033 | 0.0024 | 0.10 | — |
| BV | 853 | 0.150 | 0.61 | 2.20 | 0.011 | 0.002 | 0.028 | 0.0021 | 0.0036 | — | — |
| BW | 1043 | 0.120 | 0.17 | 2.26 | 0.028 | 0.009 | 0.033 | 0.0027 | 0.0019 | — | — |
| Ba | 860 | 0.440 | 0.50 | 2.20 | 0.008 | 0.002 | 0.035 | 0.0021 | 0.0012 | — | — |
| Bb | 854 | 0.080 | 0.45 | 4.50 | 0.200 | 0.002 | 0.034 | 0.0041 | 0.0015 | — | — |
| Bc | 914 | 0.080 | 0.35 | 2.00 | 0.008 | 0.002 | 0.033 | 0.0042 | 0.0034 | 0.25 | — |
| Bd | 939 | 0.070 | 0.35 | 2.40 | 0.008 | 0.002 | 0.035 | 0.0035 | 0.0026 | — | 0.25 |
| Be | 851 | 0.090 | 0.10 | 1.00 | 0.008 | 0.040 | 0.036 | 0.0035 | 0.0022 | — | — |
| Bf | 952 | 0.070 | 0.21 | 2.20 | 0.008 | 0.002 | 0.033 | 0.0023 | 0.0036 | — | — |
| Bg | 853 | 0.140 | 0.11 | 1.90 | 0.008 | 0.002 | 0.032 | 0.0044 | 0.0035 | — | — |

(4/4)

| | B | Mg | Rem | Ca | Mo | Cr | W | As | V | Others | Note |
|---|---|---|---|---|---|---|---|---|---|---|---|
| BL | 0.0002 | — | — | — | — | — | — | — | — | — | Invention steel |
| BM | — | — | — | 0.0022 | — | — | — | — | 0.15 | — | Invention steel |
| BN | — | — | — | — | — | — | — | — | — | — | Invention steel |
| BO | — | — | — | — | — | — | — | 0.01 | 0.20 | — | Invention steel |
| BP | — | 0.006 | — | — | 0.022 | — | — | — | 0.05 | — | Invention steel |
| BQ | 0.0002 | — | — | — | — | — | — | — | — | — | Invention steel |
| BR | — | 0.004 | 0.004 | — | — | 0.80 | — | — | — | — | Invention steel |
| BS | — | — | — | — | — | — | — | — | — | — | Invention steel |
| BT | 0.0002 | — | — | — | — | — | — | — | — | — | Invention steel |
| BU | — | — | — | — | 0.01 | — | — | — | — | — | Invention steel |
| BV | — | 0.004 | 0.005 | — | — | — | — | — | — | — | Invention steel |
| BW | — | — | — | — | 0.90 | — | — | — | — | — | Invention steel |
| Ba | — | — | — | — | — | — | — | — | — | — | Comparative steel |
| Bb | — | — | — | — | — | — | — | — | — | — | Comparative steel |
| Bc | — | — | — | — | — | — | — | — | — | — | Comparative steel |
| Bd | — | — | — | — | — | — | — | — | — | — | Comparative steel |
| Be | — | — | — | — | — | — | — | — | — | — | Comparative steel |
| Bf | — | 0.020 | — | — | — | — | — | — | 1.10 | — | Comparative steel |
| Bg | — | — | 0.15 | — | — | — | — | — | — | — | Comparative steel |

The steels were cast, reheated as they were or after being cooled to room temperature, heated to a temperature range of 900° C. to 1300° C., and then hot-rolled under the conditions of Table 2 or 3, thereby, finally, obtaining 2.3 mm or 3.2 mm-thick hot-rolled steel sheets.

[Table 2]

TABLE 2

| | | Manufacturing conditions | | | | | |
|---|---|---|---|---|---|---|---|
| | | (1/2) | | | | | |
| | Steel type | T1/° C. | Number of times of rolling of 20% or more at 1000° C. to 1200° C. | Rolling reduction rate of 20% or more at 1000° C. to 1200° C./% | Austenite grain diameter/ μm | Total rolling reduction rate at T1 + 30° C. to T1 + 200° C./% | Temperature increase during rolling at T1 + 30° C. to T1 + 200° C./° C. |
| 1 | AA | 851 | 1 | 20 | 150 | 85 | 15 |
| 2 | AA | 851 | 2 | 45/45 | 90 | 95 | 5 |
| 3 | AB | 865 | 2 | 45/45 | 80 | 75 | 15 |

TABLE 2-continued

Manufacturing conditions

| | Steel type | | | | | | |
|---|---|---|---|---|---|---|---|
| 4 | AB | 865 | 2 | 45/45 | 80 | 85 | 18 |
| 5 | AC | 858 | 2 | 45/45 | 95 | 85 | 13 |
| 6 | AC | 858 | 2 | 45/45 | 95 | 95 | 14 |
| 7 | AD | 862 | 3 | 40/40/40 | 75 | 80 | 16 |
| 8 | AE | 858 | 2 | 45/40 | 95 | 80 | 17 |
| 9 | AE | 858 | 1 | 50 | 120 | 80 | 18 |
| 10 | AF | 875 | 3 | 40/40/40 | 70 | 95 | 18 |
| 11 | AG | 892 | 3 | 40/40/40 | 65 | 95 | 10 |
| 12 | AH | 903 | 2 | 45/45 | 70 | 90 | 13 |
| 13 | AH | 903 | 2 | 45/45 | 95 | 85 | 15 |
| 14 | AF | 875 | 3 | 40/40/40 | 70 | 65 | <u>20</u> |
| 15 | AG | 892 | 1 | 50 | 120 | 75 | <u>20</u> |
| 16 | AG | 892 | 1 | 50 | 120 | 60 | <u>21</u> |
| 17 | AH | 903 | 1 | 50 | 120 | 65 | <u>19</u> |
| 18 | AH | 903 | 1 | 50 | 120 | <u>35</u> | 12 |
| 19 | AA | 851 | 2 | 45/45 | 90 | <u>45</u> | <u>20</u> |
| 20 | AB | 865 | 2 | 45/45 | 80 | <u>45</u> | 15 |
| 21 | AV | 858 | 2 | 40/45 | 95 | 75 | 12 |
| 22 | AG | 892 | <u>0</u> | — | 350 | <u>45</u> | <u>30</u> |
| 23 | AE | 858 | 1 | 50 | 120 | 80 | <u>40</u> |
| 24 | AA | 851 | <u>0</u> | — | 250 | 65 | 18 |
| 25 | AC | 858 | <u>0</u> | — | 300 | 85 | 13 |
| 26 | AI | 855 | Cracked during hot rolling | | | | |
| 27 | AJ | 1376 | Cracked during hot rolling | | | | |
| 28 | AK | 851 | Cracked during hot rolling | | | | |
| 29 | AL | 1154 | Cracked during hot rolling | | | | |

(2/2)

| Steel type | Total rolling reduction rate at $T1°$ C. to lower than $T1 + 30°$ C./% | Tf: Temperature after final pass of heavy rolling pass/° C. | P1: Rolling reduction rate of final pass of heavy rolling pass/% | t1 | $2.5 \times t1$ | t: Waiting time from completion of heavy rolling pass to initiation of cooling/s | t/t1 | Winding temperature/° C. |
|---|---|---|---|---|---|---|---|---|
| 1 | 10 | 935 | 40 | 0.57 | 1.41 | 0.8 | 1.41 | 600 |
| 2 | 0 | 892 | 35 | 1.74 | 4.35 | 2 | 1.15 | 50 |
| 3 | 25 | 945 | 37 | 0.76 | 1.90 | 1 | 1.32 | 600 |
| 4 | 5 | 920 | 31 | 1.54 | 3.86 | 2.3 | 1.49 | 50 |
| 5 | 15 | 955 | 31 | 0.73 | 1.82 | 1 | 1.38 | 600 |
| 6 | 0 | 934 | 40 | 0.71 | 1.78 | 1 | 1.41 | 500 |
| 7 | 25 | 970 | 30 | 0.62 | 1.56 | 0.9 | 1.45 | 600 |
| 8 | 5 | 960 | 30 | 0.70 | 1.75 | 1 | 1.42 | 300 |
| 9 | 15 | 921 | 30 | 1.40 | 3.50 | 2 | 1.43 | 200 |
| 10 | 0 | 990 | 30 | 0.53 | 1.32 | 0.7 | 1.32 | 500 |
| 11 | 0 | 943 | 35 | 1.46 | 3.65 | 2.1 | 1.44 | 600 |
| 12 | 0 | 1012 | 40 | 0.25 | 0.63 | 0.3 | 1.19 | 500 |
| 13 | 10 | 985 | 40 | 0.61 | 1.52 | 0.9 | 1.48 | 600 |
| 14 | 25 | 965 | 34 | 0.70 | 1.75 | 0.9 | 1.28 | 500 |
| 15 | 15 | 993 | 30 | 0.71 | 1.77 | 0.8 | 1.13 | 500 |
| 16 | 20 | 945 | 45 | 1.06 | 2.64 | 1.1 | 1.04 | 600 |
| 17 | 15 | 967 | 38 | 1.05 | 2.63 | 1.5 | 1.43 | 500 |
| 18 | <u>45</u> | 880 | 30 | 3.92 | 9.79 | 5 | 1.28 | 100 |
| 19 | <u>45</u> | 930 | 30 | 1.08 | 2.69 | <u>5</u> | 4.64 | 600 |
| 20 | <u>45</u> | 1075 | 30 | 0.20 | 0.50 | <u>0.1</u> | 0.50 | 600 |
| 21 | <u>45</u> | 890 | 30 | 2.15 | 5.36 | <u>1.3</u> | 0.61 | 600 |
| 22 | <u>35</u> | 910 | 35 | 2.44 | 6.09 | <u>0.5</u> | 0.21 | 400 |
| 23 | <u>35</u> | 860 | 40 | 3.02 | 7.54 | <u>9</u> | 2.98 | 600 |
| 24 | 20 | 850 | 30 | 3.13 | 7.83 | <u>0.3</u> | 0.10 | 800 |
| 25 | 25 | 890 | 30 | 2.15 | 5.36 | 2.2 | 1.03 | 600 |
| 26 | Cracked during hot rolling | | | | | | | |
| 27 | Cracked during hot rolling | | | | | | | |
| 28 | Cracked during hot rolling | | | | | | | |
| 29 | Cracked during hot rolling | | | | | | | |

[Table 3]

TABLE 3

Manufacturing conditions (1/2)

| Steel type | | T1/° C. | Number of times of rolling of 20% or more at 1000° C. to 1200° C. | Rolling reduction rate of 20% or more at 1000° C. to 1200° C./% | Austenite grain diameter/ μm | Total rolling reduction rate at T1 + 30° C. to T1 + 200° C./% | Temperature increase during rolling at T1 + 30° C. to T1 + 200° C./° C. |
|---|---|---|---|---|---|---|---|
| BA1 | BA | 864 | 2 | 45/45 | 80 | 85 | 17 |
| BB1 | BB | 852 | 2 | 45/45 | 85 | 80 | 13 |
| BB2 | BB | 852 | 2 | 45/45 | 80 | 85 | 16 |
| BC1 | BC | 866 | 2 | 45/45 | 80 | 85 | 16 |
| BD1 | BD | 863 | 1 | 50 | 120 | 85 | 14 |
| BE2 | BE | 859 | 2 | 45/45 | 80 | 80 | 16 |
| BF1 | BF | 884 | 2 | 45/45 | 75 | 85 | 15 |
| BF2 | BF | 884 | 1 | 50 | 110 | 80 | 13 |
| BG1 | BG | 858 | 3 | 40/40/40 | 80 | 80 | 15 |
| BH1 | BH | 899 | 2 | 45/45 | 80 | 80 | 12 |
| BI1 | BI | 852 | 2 | 45/45 | 75 | 90 | 12 |
| BI2 | BI | 852 | 2 | 45/45 | 75 | 80 | 16 |
| BJ1 | BJ | 852 | 3 | 40/40/40 | 85 | 85 | 15 |
| BJ2 | BJ | 852 | 2 | 45/45 | 75 | 80 | 13 |
| BK1 | BK | 861 | 3 | 40/40/40 | 85 | 90 | 13 |
| BK2 | BK | 853 | 3 | 40/40/40 | 85 | 90 | 12 |
| BL1 | BL | 853 | 2 | 45/45 | 80 | 85 | 14 |
| BL2 | BL | 853 | 2 | 45/45 | 80 | 80 | 17 |
| BM1 | BM | 866 | 1 | 30 | 140 | 65 | 12 |
| BN1 | BN | 852 | 2 | 45/45 | 75 | 70 | 12 |
| BO1 | BO | 885 | 2 | 45/45 | 80 | 60 | 15 |
| BP1 | BP | 873 | 2 | 45/45 | 75 | 85 | 13 |
| BQ1 | BQ | 852 | 2 | 45/45 | 80 | 80 | 16 |
| BR1 | BR | 875 | 2 | 45/45 | 75 | 85 | 12 |
| BS1 | BS | 852 | 2 | 45/45 | 80 | 85 | 12 |
| BS2 | BS | 852 | 2 | 45/45 | 75 | 80 | 15 |
| BT1 | BT | 861 | 2 | 45/45 | 80 | 95 | 16 |
| BT2 | BT | 861 | 2 | 45/45 | 85 | 80 | 12 |
| BU1 | BU | 876 | 2 | 45/45 | 75 | 85 | 12 |
| BV1 | BV | 853 | 2 | 45/45 | 85 | 80 | 11 |
| BW1 | BW | 1043 | 1 | 50 | 120 | 80 | 16 |
| Ba1 | Ba | 860 | 2 | 45/45 | 75 | 90 | 16 |
| Bb1 | Bb | 854 | 1 | 50 | 120 | 85 | 12 |
| Bc1 | Bc | 914 | 2 | 45/45 | 75 | 90 | 13 |
| Bd1 | Bd | 939 | 2 | 45/45 | 75 | 85 | 12 |
| Be1 | Be | 851 | 2 | 45/45 | 80 | 65 | 11 |
| Bf1 | Bf | 952 | 2 | 45/45 | 80 | 70 | 12 |
| Bg1 | Bg | 853 | 2 | 45/45 | 75 | 60 | 12 |

(2/2)

| Steel type | Total rolling reduction rate at T1° C. to lower than T1 + 30° C./% | Tf: Temperature after final pass of heavy rolling pass/° C. | P1: Rolling reduction rate of final pass of heavy rolling pass/% | t1 | 2.5 × t1 | t: Waiting time from completion of heavy rolling pass to initiation of cooling/s | t/t1 | Winding temperature/° C. |
|---|---|---|---|---|---|---|---|---|
| BA1 | 0 | 984 | 45 | 0.13 | 0.33 | 0.28 | 2.15 | 500 |
| BB1 | 0 | 982 | 40 | 0.14 | 0.34 | 0.29 | 2.10 | 500 |
| BB2 | 0 | 922 | 45 | 0.66 | 1.65 | 1.15 | 1.75 | 500 |
| BC1 | 0 | 966 | 45 | 0.22 | 0.55 | 0.37 | 1.68 | 600 |
| BD1 | 0 | 963 | 40 | 0.34 | 0.85 | 0.49 | 1.44 | 600 |
| BE2 | 0 | 929 | 45 | 0.66 | 1.65 | 1.15 | 1.75 | 600 |
| BF1 | 15 | 944 | 45 | 0.89 | 2.22 | 1.04 | 1.17 | 500 |
| BF2 | 0 | 954 | 40 | 0.83 | 2.08 | 6.00 | 7.21 | 500 |
| BG2 | 0 | 958 | 45 | 0.22 | 0.55 | 0.37 | 1.68 | 600 |
| BH1 | 20 | 959 | 40 | 1.06 | 2.65 | 1.21 | 1.14 | 500 |
| BI1 | 0 | 952 | 40 | 0.34 | 0.85 | 0.49 | 1.44 | 600 |
| BI2 | 0 | 922 | 45 | 0.66 | 1.65 | 1.15 | 1.75 | 600 |
| BJ1 | 0 | 962 | 45 | 0.15 | 0.39 | 0.30 | 1.97 | 600 |
| BJ2 | 0 | 922 | 40 | 0.83 | 2.08 | 1.46 | 1.75 | 600 |
| BK1 | 0 | 961 | 40 | 0.34 | 0.85 | 0.49 | 1.44 | 550 |
| BK2 | 0 | 923 | 40 | 0.83 | 2.08 | 0.98 | 1.18 | 600 |
| BL1 | 0 | 953 | 45 | 0.22 | 0.55 | 0.37 | 1.68 | 600 |
| BL2 | 0 | 923 | 50 | 0.51 | 1.28 | 0.66 | 1.29 | 600 |
| BM1 | 10 | 966 | 40 | 0.34 | 0.85 | 0.49 | 1.44 | 500 |
| BN1 | 0 | 952 | 40 | 0.34 | 0.85 | 0.49 | 1.44 | 550 |

TABLE 3-continued

Manufacturing conditions

| | | | | | | | | |
|---|---|---|---|---|---|---|---|---|
| BO1 | 0 | 985 | 45 | 0.22 | 0.55 | 0.37 | 1.68 | 600 |
| BP1 | 0 | 973 | 40 | 0.34 | 0.85 | 0.49 | 1.44 | 600 |
| BQ1 | 0 | 952 | 45 | 0.22 | 0.55 | 0.37 | 1.68 | 600 |
| BR1 | 0 | 985 | 40 | 0.24 | 0.60 | 0.39 | 1.63 | 500 |
| BS1 | 0 | 992 | 40 | 0.13 | 0.33 | 0.28 | 2.14 | 550 |
| BS2 | 0 | 922 | 45 | 0.66 | 1.65 | 0.81 | 1.23 | 550 |
| BT1 | 15 | 961 | 45 | 0.22 | 0.55 | 0.37 | 1.68 | 500 |
| BT2 | 0 | 931 | 40 | 0.83 | 2.08 | 0.98 | 1.18 | 500 |
| BU1 | 10 | 976 | 40 | 0.34 | 0.85 | 0.49 | 1.44 | 500 |
| BV1 | 0 | 953 | 40 | 0.34 | 0.85 | 0.49 | 1.44 | 600 |
| BW1 | 10 | 1083 | 45 | 1.46 | 3.66 | 1.61 | 1.10 | 550 |
| Ba1 | 0 | 960 | 45 | 0.22 | 0.55 | 0.37 | 1.68 | 600 |
| Bb1 | 0 | 954 | 40 | 0.34 | 0.85 | 0.49 | 1.44 | 600 |
| Bc1 | 0 | 994 | 40 | 0.64 | 1.59 | 0.79 | 1.24 | 600 |
| Bd1 | 0 | 999 | 40 | 1.06 | 2.65 | 1.21 | 1.14 | 600 |
| Be1 | 0 | 951 | 40 | 0.34 | 0.85 | 0.49 | 1.44 | 600 |
| Bf1 | 0 | 1012 | 40 | 1.06 | 2.65 | 1.21 | 1.14 | 600 |
| Bg1 | 0 | 953 | 40 | 0.34 | 0.85 | 0.49 | 1.44 | 600 |

Table 1 shows the chemical components of the respective steels, Tables 2 and 3 show the respective manufacturing conditions, and Tables 4 and 5 show structures and mechanical characteristics.

As an index of local deformability, the hole expanding rate and the limit bending radius through 90° V-shape bending were used. In bending tests, C-direction bending and 45°-direction bending were carried out, and the rates were used as the index of the orientation dependency of formability. Tensile tests and the bending tests were based on JIS Z2241 and the V block 90° bending tests of JIS Z2248, and hole expanding tests were based on the Japan Iron and Steel Federation standard JFS T1001, respectively. The X-ray random intensity ratio was measured using the EBSD at a 0.5 μm pitch with respect to a ¼ location from the end portion in the width direction in a sheet thickness central portion in a ⅝ to ⅜ area of a cross section parallel to the rolling direction. In addition, the r values in the respective directions were measured through the above methods.

[Table 4]

TABLE 4

The structure and mechanical characteristics of the respective steels in the respective manufacturing conditions (1/2)

| Steel type | X-ray random intensity ratio of {100}<011> to {223}<110> orientation group | X-ray random intensity ratio of {332}<113> | rL | rC | r30 | r60 | coarsened grain area ratio/% |
|---|---|---|---|---|---|---|---|
| 1 | 2.6 | 2.2 | 0.88 | 0.87 | 1.04 | 1.05 | 5 |
| 2 | 2.2 | 2.1 | 0.92 | 0.90 | 0.96 | 0.98 | 1 |
| 3 | 2.9 | 2.8 | 0.87 | 0.79 | 1.05 | 1.05 | 5 |
| 4 | 2.7 | 2.7 | 0.90 | 0.85 | 1.02 | 1.03 | 4 |
| 5 | 3.5 | 3.2 | 0.78 | 0.75 | 0.98 | 1.00 | 6 |
| 6 | 3.0 | 2.8 | 0.83 | 0.85 | 0.95 | 0.98 | 4 |
| 7 | 5.2 | 4.1 | 0.70 | 0.70 | 1.08 | 1.09 | 7 |
| 8 | 2.9 | 2.7 | 0.85 | 0.90 | 1.06 | 1.05 | 5 |
| 9 | 3.5 | 2.9 | 0.75 | 0.95 | 1.02 | 1.10 | 5 |
| 10 | 3.0 | 3.0 | 0.72 | 0.75 | 1.05 | 1.08 | 6 |
| 11 | 2.9 | 3.0 | 0.72 | 0.74 | 1.07 | 1.09 | 6 |
| 12 | 2.9 | 2.6 | 0.71 | 0.72 | 1.06 | 1.08 | 3 |
| 13 | 3.0 | 2.9 | 0.73 | 0.72 | 1.10 | 1.08 | 5 |
| 14 | 5.4 | 4.6 | 0.66 | 0.73 | 1.10 | 1.20 | 5 |
| 15 | 3.7 | 3.5 | 0.65 | 0.75 | 1.05 | 1.19 | 4 |
| 16 | 5.4 | 4.5 | 0.58 | 0.70 | 1.10 | 1.26 | 1 |
| 17 | 5.4 | 3.0 | 0.64 | 0.75 | 1.02 | 1.15 | 5 |
| 18 | 7.2 | 6.4 | 0.54 | 0.67 | 1.24 | 1.31 | 3 |
| 19 | 6.6 | 5.1 | 0.69 | 0.79 | 1.15 | 1.15 | 29 |
| 20 | 6.9 | 5.2 | 0.56 | 0.65 | 1.25 | 1.19 | 1 |
| 21 | 7.2 | 5.8 | 0.65 | 0.68 | 1.18 | 1.15 | 1 |
| 22 | 7.6 | 5.4 | 0.52 | 0.65 | 1.22 | 1.30 | 1 |
| 23 | 7.1 | 6.4 | 0.63 | 0.65 | 1.15 | 1.23 | 16 |
| 24 | 5.4 | 5.6 | 0.59 | 0.75 | 1.05 | 1.21 | 1 |
| 25 | 5.2 | 5.4 | 0.68 | 0.72 | 1.15 | 1.10 | 4 |
| 26 | | | Cracked during hot rolling | | | | |
| 27 | | | Cracked during hot rolling | | | | |
| 28 | | | Cracked during hot rolling | | | | |
| 29 | | | Cracked during hot rolling | | | | |

TABLE 4-continued

The structure and mechanical characteristics of the respective steels in the respective manufacturing conditions (2/2)

| Steel type | equiaxed grain rate/% | TS/MPa | El./% | λ/% | Ts × λ/ MPa-% | Sheet thickness/minimum bending radius | 45°-direction bending/ C-direction bending ratio | Note |
|---|---|---|---|---|---|---|---|---|
| 1 | 74 | 445 | 34 | 145 | 64525 | 3.2 | 1.1 | Invention steel |
| 2 | 80 | 450 | 38 | 180 | 81000 | 3.3 | 1.0 | Invention steel |
| 3 | 72 | 605 | 25 | 95 | 57475 | 3.2 | 1.2 | Invention steel |
| 4 | 73 | 595 | 24 | 115 | 68425 | 2.3 | 1.1 | Invention steel |
| 5 | 75 | 595 | 29 | 85 | 50575 | 2.7 | 1.2 | Invention steel |
| 6 | 78 | 600 | 28 | 90 | 54000 | 2.3 | 1.1 | Invention steel |
| 7 | 72 | 650 | 19 | 75 | 48750 | 2.1 | 1.5 | Invention steel |
| 8 | 72 | 625 | 21 | 135 | 84375 | 3.3 | 1.1 | Invention steel |
| 9 | 72 | 635 | 19 | 118 | 74930 | 3.2 | 1.2 | Invention steel |
| 10 | 78 | 735 | 15 | 75 | 55125 | 2.5 | 1.4 | Invention steel |
| 11 | 77 | 810 | 19 | 85 | 68850 | 2.3 | 1.4 | Invention steel |
| 12 | 78 | 790 | 21 | 140 | 110600 | 2.7 | 1.4 | Invention steel |
| 13 | 74 | 795 | 20 | 140 | 111300 | 2.3 | 1.4 | Invention steel |
| 14 | 69 | 765 | 14 | 60 | 45900 | _1.5_ | 1.6 | Invention steel |
| 15 | 74 | 825 | 18 | 70 | 57750 | _1.6_ | 1.5 | Invention steel |
| 16 | 70 | 835 | 17 | 65 | 54275 | 1.5 | 1.8 | Invention steel |
| 17 | 67 | 830 | 17 | 125 | 103750 | 1.5 | 1.5 | Invention steel |
| 18 | 59 | 805 | 19 | 60 | 48300 | 1.1 | 2.0 | Invention steel |
| 19 | _29_ | 465 | 34 | 85 | 39525 | _1.2_ | 1.5 | Comparative steel |
| 20 | 70 | 635 | 24 | 65 | 41275 | _1.2_ | 1.9 | Comparative steel |
| 21 | 79 | 640 | 26 | 45 | 28800 | _1.2_ | 1.7 | Comparative steel |
| 22 | 73 | 845 | 16 | 45 | 38025 | _1.1_ | 2.0 | Comparative steel |
| 23 | 57 | 670 | 16 | 75 | 50250 | _1.2_ | 1.8 | Comparative steel |
| 24 | 81 | 405 | 30 | 70 | 28350 | _1.1_ | 1.6 | Comparative steel |
| 25 | 78 | 650 | 27 | 50 | 32500 | _1.1_ | 1.5 | Comparative steel |
| 26 | Cracked during hot rolling | | | | | | | Comparative steel |
| 27 | Cracked during hot rolling | | | | | | | Comparative steel |
| 28 | Cracked during hot rolling | | | | | | | Comparative Steel |
| 29 | Cracked during hot rolling | | | | | | | Comparative steel |

TABLE 5

The structure and mechanical characteristics of the respective steels in the respective manufacturing conditions (1/4)

| Steel type | X-ray random intensity ratio of {100}<011> to {223}<110> orientation group | X-ray random intensity ratio of {332}<113> | rL | rC | r30 | r60 | coarsened grain area ratio/% |
|---|---|---|---|---|---|---|---|
| BA1 | 2.3 | 2.4 | 0.83 | 0.84 | 0.85 | 0.88 | 9 |
| BB1 | 2.4 | 2.4 | 0.84 | 0.85 | 0.86 | 0.89 | 9 |
| BB2 | 2.8 | 2.8 | 0.79 | 0.81 | 0.90 | 0.92 | 6 |
| BC1 | 2.8 | 2.9 | 0.78 | 0.80 | 0.91 | 0.93 | 6 |
| BD1 | 3.5 | 3.1 | 0.83 | 0.84 | 0.99 | 0.99 | 5 |
| BE2 | 2.8 | 2.8 | 0.79 | 0.81 | 0.90 | 0.92 | 6 |
| BF1 | 3.3 | 3.4 | 0.72 | 0.75 | 0.97 | 0.98 | 2 |
| BF2 | 1.1 | 1.2 | 0.95 | 0.95 | 0.99 | 1.01 | 30 |
| BG1 | 2.8 | 2.8 | 0.78 | 0.80 | 0.91 | 0.93 | 6 |
| BH1 | 3.4 | 3.4 | 0.72 | 0.76 | 0.97 | 0.98 | 2 |
| BI1 | 3.0 | 3.2 | 0.74 | 0.77 | 0.94 | 0.95 | 5 |
| BI2 | 2.7 | 2.8 | 0.78 | 0.80 | 0.90 | 0.92 | 6 |
| BJ1 | 2.6 | 2.6 | 0.82 | 0.83 | 0.88 | 0.91 | 8 |
| BJ2 | 2.7 | 2.8 | 0.78 | 0.80 | 0.90 | 0.92 | 7 |
| BK1 | 3.1 | 3.2 | 0.76 | 0.79 | 0.95 | 0.96 | 5 |
| BK2 | 3.4 | 3.4 | 0.73 | 0.76 | 0.99 | 0.99 | 3 |
| BL1 | 2.8 | 2.9 | 0.78 | 0.80 | 0.91 | 0.93 | 6 |
| BL2 | 3.2 | 3.2 | 0.74 | 0.77 | 0.95 | 0.96 | 2 |
| BM1 | 3.7 | 2.9 | 0.87 | 0.87 | 0.99 | 0.99 | 5 |
| BN1 | 3.0 | 3.0 | 0.74 | 0.77 | 0.92 | 0.94 | 5 |
| BO1 | 2.8 | 2.6 | 0.78 | 0.80 | 0.89 | 0.91 | 6 |
| BP1 | 3.0 | 3.1 | 0.74 | 0.77 | 0.94 | 0.95 | 5 |

(2/4)

| Steel type | equiaxed grain rate/% | TS/MPa | El./% | λ/% | Ts × λ/ MPa-% | Sheet thickness/minimum bending radius | 45°-direction bending/ C-direction bending ratio | Note |
|---|---|---|---|---|---|---|---|---|
| BA1 | 67 | 785 | 24 | 125 | 98125 | 6.4 | 1.0 | Invention steel |
| BB1 | 66 | 787 | 24 | 123 | 96801 | 6.3 | 1.0 | Invention steel |
| BB2 | 71 | 777 | 24 | 120 | 93240 | 5.0 | 1.1 | Invention steel |
| BC1 | 72 | 598 | 28 | 155 | 92690 | 4.8 | 1.1 | Invention steel |
| BD1 | 74 | 1216 | 14 | 25 | 30400 | 4.1 | 1.1 | Invention steel |
| BE2 | 69 | 588 | 29 | 158 | 92904 | 5.0 | 1.1 | Invention steel |
| BF1 | 77 | 1198 | 14 | 65 | 77870 | 3.6 | 1.3 | Invention steel |
| BF2 | 30 | 1100 | 5 | 50 | 55000 | 6.0 | 1.0 | Invention steel |
| BG1 | 70 | 594 | 29 | 156 | 92664 | 4.8 | 1.1 | Invention steel |
| BH1 | 75 | 843 | 20 | 101 | 85143 | 3.6 | 1.3 | Invention steel |
| BI1 | 76 | 593 | 37 | 154 | 91322 | 4.1 | 1.2 | Invention steel |
| BI2 | 69 | 583 | 38 | 160 | 93280 | 5.0 | 1.1 | Invention steel |
| BJ1 | 69 | 607 | 36 | 157 | 95299 | 5.7 | 1.0 | Invention steel |
| BJ2 | 69 | 602 | 36 | 156 | 93912 | 5.0 | 1.1 | Invention steel |
| BK1 | 76 | 1194 | 16 | 33 | 39402 | 4.1 | 1.2 | Invention steel |
| BK2 | 78 | 1194 | 16 | 30 | 35820 | 3.5 | 1.3 | Invention steel |
| BL1 | 72 | 795 | 28 | 116 | 92220 | 4.8 | 1.1 | Invention steel |

TABLE 5-continued

The structure and mechanical characteristics of the respective steels in the respective manufacturing conditions

| | | | | | | | | |
|---|---|---|---|---|---|---|---|---|
| BL2 | 74 | 785 | 28 | 114 | 89490 | 3.9 | 1.2 | Invention steel |
| BM1 | 67 | 592 | 29 | 148 | 87616 | 4.2 | 1.1 | Invention steel |
| BN1 | 69 | 974 | 17 | 78 | 75972 | 4.3 | 1.2 | Invention steel |
| BO1 | 63 | 874 | 19 | 100 | 87400 | 5.1 | 1.1 | Invention steel |
| BP1 | 74 | 1483 | 11 | 58 | 86014 | 4.1 | 1.2 | Invention steel |

(3/4)

| Steel type | X-ray random intensity ratio of {100}<011> to {223}<110> orientation group | X-ray random intensity ratio of {332}<113> | rL | rC | r30 | r60 | coarsened grain area ratio/% |
|---|---|---|---|---|---|---|---|
| BQ1 | 2.8 | 2.8 | 0.78 | 0.80 | 0.91 | 0.93 | 6 |
| BR1 | 2.8 | 2.9 | 0.76 | 0.79 | 0.92 | 0.93 | 6 |
| BS1 | 2.4 | 2.4 | 0.83 | 0.84 | 0.86 | 0.89 | 7 |
| BS2 | 3.2 | 3.3 | 0.72 | 0.76 | 0.96 | 0.96 | 2 |
| BT1 | 2.8 | 3.0 | 0.78 | 0.80 | 0.92 | 0.94 | 5 |
| BT2 | 3.4 | 3.3 | 0.73 | 0.76 | 0.98 | 0.98 | 3 |
| BU1 | 3.0 | 3.1 | 0.74 | 0.77 | 0.94 | 0.95 | 5 |
| BV1 | 3.1 | 3.1 | 0.76 | 0.79 | 0.94 | 0.95 | 5 |
| BW1 | 3.8 | 3.4 | 0.78 | 0.80 | 1.03 | 1.03 | 1 |
| Ba1 | 2.8 | 2.9 | 0.77 | 0.79 | 0.96 | 0.97 | 6 |
| Bb1 | 6.5 | 6.1 | 0.53 | 0.64 | 1.27 | 1.28 | 5 |
| Bc1 | 6.2 | 6.4 | 0.42 | 0.56 | 1.20 | 1.22 | 4 |
| Bd1 | 6.3 | 6.4 | 0.41 | 0.55 | 1.19 | 1.21 | 3 |
| Be1 | 3.1 | 2.8 | 0.75 | 0.78 | 0.91 | 0.93 | 5 |
| Bf1 | 6.4 | 6.3 | 0.42 | 0.56 | 1.18 | 1.20 | 3 |
| Bg1 | 3.0 | 2.3 | 0.74 | 0.77 | 0.90 | 0.92 | 5 |

(4/4)

| Steel type | equiaxed grain rate/% | TS/MPa | El./% | λ/% | Ts × λ/ MPa-% | Sheet thickness/minimum bending radius | 45°-direction bending/ C-direction bending ratio | Note |
|---|---|---|---|---|---|---|---|---|
| BQ1 | 70 | 599 | 32 | 155 | 92845 | 4.8 | 1.1 | Invention steel |
| BR1 | 72 | 1110 | 15 | 70 | 77700 | 4.6 | 1.1 | Invention steel |
| BS1 | 67 | 594 | 32 | 163 | 96822 | 6.3 | 1.0 | Invention steel |
| BS2 | 74 | 590 | 32 | 152 | 89680 | 3.7 | 1.2 | Invention steel |
| BT1 | 75 | 1004 | 19 | 74 | 74296 | 4.6 | 1.1 | Invention steel |
| BT2 | 75 | 989 | 19 | 71 | 70219 | 3.6 | 1.2 | Invention steel |
| BU1 | 74 | 665 | 26 | 140 | 93100 | 4.1 | 1.2 | Invention steel |
| BV1 | 72 | 755 | 22 | 121 | 91355 | 4.2 | 1.2 | Invention steel |
| BW1 | 76 | 1459 | 12 | 51 | 74409 | 3.4 | 1.2 | Invention steel |
| Ba1 | 73 | 892 | 14 | 21 | 18732 | 4.5 | 1.2 | Comparative steel |
| Bb1 | 34 | 912 | 12 | 27 | 24624 | 1.2 | 2.1 | Comparative steel |
| Bc1 | 38 | 892 | 15 | 61 | 54412 | 1.0 | 2.4 | Comparative steel |
| Bd1 | 27 | 1057 | 8 | 18 | 19026 | 1.0 | 2.4 | Comparative steel |
| Be1 | 67 | 583 | 26 | 83 | 48389 | 4.5 | 1.1 | Comparative steel |
| Bf1 | 72 | 1079 | 13 | 14 | 15106 | 1.0 | 2.3 | Comparative steel |
| Bg1 | 66 | 688 | 21 | 72 | 49536 | 5.0 | 1.1 | Comparative steel |

Example 2

The technical content of the cold-rolled steel sheet according to the embodiment will be described using examples of the present invention.

The results of studies in which steels of CA to CW having the component compositions shown in Table 6 which satisfied the components specified in the claims of the present invention and comparative steels of Ca to Cg were used as examples will be described.

[Table 6]

TABLE 6

| | \multicolumn{10}{c}{Chemical components (mass %)} | | | | | | | | | |
|---|---|---|---|---|---|---|---|---|---|---|---|
| | \multicolumn{10}{c}{(1/2)} | | | | | | | | | |
| | T1/° C. | C | Si | Mn | P | S | Al | N | O | Ti | Nb |
| CA | 864 | 0.078 | 0.82 | 2.05 | 0.012 | 0.004 | 0.032 | 0.0026 | 0.0032 | 0.02 | 0.02 |
| CB | 852 | 0.085 | 0.75 | 2.25 | 0.012 | 0.003 | 0.035 | 0.0032 | 0.0023 | — | — |
| CC | 866 | 0.110 | 0.10 | 1.55 | 0.020 | 0.004 | 0.038 | 0.0033 | 0.0026 | — | 0.04 |
| CD | 863 | 0.350 | 1.80 | 2.33 | 0.012 | 0.003 | 0.710 | 0.0033 | 0.0021 | 0.02 | — |
| CE | 859 | 0.120 | 0.22 | 1.35 | 0.015 | 0.003 | 0.025 | 0.0055 | 0.0029 | — | 0.02 |
| CF | 884 | 0.068 | 0.50 | 3.20 | 0.122 | 0.002 | 0.040 | 0.0032 | 0.0038 | 0.03 | 0.07 |
| CG | 858 | 0.130 | 0.24 | 1.54 | 0.010 | 0.001 | 0.038 | 0.0025 | 0.0029 | — | 0.02 |
| CH | 899 | 0.035 | 0.05 | 2.20 | 0.010 | 0.020 | 0.021 | 0.0019 | 0.0023 | 0.15 | 0.03 |
| CI | 852 | 0.090 | 1.25 | 1.88 | 0.014 | 0.002 | 0.030 | 0.0030 | 0.0030 | — | — |
| CJ | 852 | 0.115 | 1.10 | 1.46 | 0.008 | 0.002 | 0.850 | 0.0034 | 0.0031 | — | — |
| CK | 861 | 0.144 | 0.45 | 2.52 | 0.007 | 0.001 | 0.021 | 0.0024 | 0.0031 | 0.03 | — |
| CL | 853 | 0.190 | 1.40 | 1.78 | 0.011 | 0.002 | 0.018 | 0.0032 | 0.0028 | — | — |
| CM | 866 | 0.080 | 0.10 | 1.40 | 0.007 | 0.002 | 1.700 | 0.0033 | 0.0034 | — | — |
| CN | 852 | 0.062 | 0.72 | 2.82 | 0.009 | 0.002 | 0.035 | 0.0033 | 0.0022 | — | — |
| CO | 885 | 0.120 | 0.80 | 2.20 | 0.008 | 0.002 | 0.035 | 0.0022 | 0.0035 | 0.05 | — |
| CP | 873 | 0.190 | 0.55 | 2.77 | 0.009 | 0.002 | 0.032 | 0.0033 | 0.0036 | 0.04 | — |
| CQ | 852 | 0.082 | 0.77 | 1.82 | 0.008 | 0.003 | 0.025 | 0.0032 | 0.0031 | — | — |
| CR | 875 | 0.030 | 1.00 | 2.40 | 0.005 | 0.001 | 0.033 | 0.0022 | 0.0011 | 0.05 | 0.01 |
| CS | 852 | 0.077 | 0.45 | 2.05 | 0.009 | 0.003 | 0.025 | 0.0029 | 0.0031 | — | — |
| CT | 861 | 0.142 | 0.70 | 2.44 | 0.008 | 0.002 | 0.030 | 0.0032 | 0.0035 | 0.03 | — |
| CU | 876 | 0.009 | 0.10 | 1.40 | 0.006 | 0.001 | 0.003 | 0.0033 | 0.0024 | 0.10 | — |
| CV | 853 | 0.150 | 0.61 | 2.20 | 0.011 | 0.002 | 0.028 | 0.0021 | 0.0036 | — | — |
| CW | 1043 | 0.120 | 0.17 | 2.26 | 0.028 | 0.009 | 0.033 | 0.0027 | 0.0019 | — | — |
| Ca | 860 | <u>0.440</u> | 0.50 | 2.20 | 0.008 | 0.002 | 0.035 | 0.0021 | 0.0012 | — | — |
| Cb | 854 | 0.080 | 0.45 | <u>4.50</u> | <u>0.200</u> | 0.002 | 0.034 | 0.0041 | 0.0015 | — | — |
| Cc | 914 | 0.080 | 0.35 | 2.00 | 0.008 | 0.002 | 0.033 | 0.0042 | 0.0034 | <u>0.25</u> | — |
| Cd | 939 | 0.070 | 0.35 | 2.40 | 0.008 | 0.002 | 0.035 | 0.0035 | 0.0026 | — | <u>0.25</u> |
| Ce | 851 | 0.090 | 0.10 | 1.00 | 0.008 | <u>0.040</u> | 0.036 | 0.0035 | 0.0022 | — | — |
| Cf | 952 | 0.070 | 0.21 | 2.20 | 0.008 | 0.002 | 0.033 | 0.0023 | 0.0036 | — | — |
| Cg | 853 | 0.140 | 0.11 | 1.90 | 0.008 | 0.002 | 0.032 | 0.0044 | 0.0035 | — | — |

| | \multicolumn{10}{c}{(2/2)} | | | | | | | | | |
|---|---|---|---|---|---|---|---|---|---|---|
| | B | Mg | Rem | Ca | Mo | Cr | W | As | V | Others | Note |
| CA | — | — | — | — | — | — | — | — | — | — | Invention steel |
| CB | — | — | — | — | — | — | — | — | — | Co: 0.5%, Sn: 0.02 | Invention steel |
| CC | — | — | — | — | — | — | — | — | — | — | Invention steel |
| CD | 0.0020 | — | 0.0035 | — | — | — | — | — | — | — | Invention steel |
| CE | — | — | — | — | — | — | — | — | — | — | Invention steel |
| CF | — | — | 0.0044 | — | — | 0.1 | — | — | — | — | Invention steel |
| CG | — | — | — | — | — | — | — | — | — | — | Invention steel |
| CH | — | — | 0.0005 | 0.0009 | — | — | 0.05 | — | — | — | Invention steel |
| CI | — | — | — | — | — | — | — | — | — | — | Invention steel |
| CJ | — | — | — | — | — | — | — | — | — | — | Invention steel |
| CK | — | — | — | — | — | — | — | — | — | Cu: 0.5%, Ni: 0.25 Zr: 0.02% | Invention steel |
| CL | 0.0002 | — | — | — | — | — | — | — | — | — | Invention steel |
| CM | — | — | — | 0.0022 | — | — | — | — | 0.15 | — | Invention steel |
| CN | — | — | — | — | — | — | — | — | — | — | Invention steel |

TABLE 6-continued

| | | | | | | | | | | | |
|---|---|---|---|---|---|---|---|---|---|---|---|
| Chemical components (mass %) | | | | | | | | | | | |
| CO | — | — | — | — | — | — | — | 0.01 | 0.20 | — | Invention steel |
| CP | — | 0.0055 | — | — | 0.022 | — | — | — | 0.05 | — | Invention steel |
| CQ | 0.0002 | — | — | — | — | — | — | — | — | — | Invention steel |
| CR | — | 0.0040 | 0.004 | — | — | 0.8 | — | — | — | — | Invention steel |
| CS | — | — | — | — | — | — | — | — | — | — | Invention steel |
| CT | 0.0002 | — | — | — | — | — | — | — | — | — | Invention steel |
| CU | — | — | — | — | 0.010 | — | — | — | — | — | Invention steel |
| CV | — | 0.0040 | 0.005 | — | — | — | — | — | — | — | Invention steel |
| CW | — | — | — | — | 0.90 | — | — | — | — | — | Invention steel |
| Ca | — | — | — | — | — | — | — | — | — | — | Comparative steel |
| Cb | — | — | — | — | — | — | — | — | — | — | Comparative steel |
| Cc | — | — | — | — | — | — | — | — | — | — | Comparative steel |
| Cd | — | — | — | — | — | — | — | — | — | — | Comparative steel |
| Ce | — | — | — | — | — | — | — | — | — | — | Comparative steel |
| Cf | — | 0.020 | — | — | — | — | — | — | 1.10 | — | Comparative steel |
| Cg | — | — | 0.15 | — | — | — | — | — | — | — | Comparative steel |

The steels were cast, reheated as they were or after being cooled to room temperature, heated to a temperature range of 900° C. to 1300° C., then, hot-rolled under the conditions of Table 7, thereby obtaining 2 mm to 5 mm-thick hot-rolled steel sheets. The steel sheets were pickled, cold-rolled into a thickness of 1.2 mm to 2.3 mm, and annealed under the annealing conditions shown in Table 7. After that, 0.5% scan pass rolling was carried out, and the steel sheets were provided for material quality evaluation.

[Table 7]

TABLE 7

| | | | | | | | | | |
|---|---|---|---|---|---|---|---|---|---|
| Manufacturing conditions | | | | | | | | | |
| (1/2) | | | | | | | | | |
| Steel type | T1/° C. | Number of times of rolling of 20% or more at 1000° C. to 1200° C. | Rolling reduction rate of 20% or more at 1000° C. to 1200° C./% | Austenite grain diameter/ μm | Total rolling reduction rate at T1 + 30° C. to T1 + 200° C./% | Temperature increase during rolling at T1 + 30° C. to T1 + 200° C./° C. | Total rolling reduction rate at T1° C. to lower than T1 + 30° C./% | Tf: Temperature after final pass of heavy rolling pass/° C. | P1: Rolling reduction rate of final pass of heavy rolling pass/% |
| CA1 | CA | 864 | 2 | 45/45 | 80 | 85 | 16 | 0 | 984 | 45 |
| CA2 | CA | 864 | 2 | 45/45 | 85 | 80 | 15 | 10 | 934 | 45 |
| CB1 | CB | 852 | 2 | 45/45 | 85 | 80 | 12 | 0 | 982 | 40 |
| CB2 | CB | 852 | 2 | 45/45 | 80 | 85 | 15 | 0 | 922 | 45 |
| CC1 | CC | 866 | 2 | 45/45 | 80 | 85 | 15 | 0 | 966 | 45 |
| CC2 | CC | 866 | 0 | — | 250 | 80 | 16 | 0 | 936 | 45 |
| CD1 | CD | 863 | 1 | 50 | 120 | 85 | 12 | 0 | 963 | 40 |
| CD2 | CD | 863 | 2 | 50 | 130 | 35 | 19 | 0 | 963 | 35 |
| CE1 | CE | 859 | 2 | 45/45 | 90 | 95 | 12 | 40 | 909 | 40 |
| CE2 | CE | 859 | 2 | 45/45 | 80 | 80 | 17 | 0 | 929 | 45 |
| CF1 | CF | 884 | 2 | 45/45 | 75 | 85 | 15 | 15 | 944 | 45 |
| CF2 | CF | 884 | 1 | 50 | 110 | 80 | 11 | 0 | 954 | 40 |
| CG1 | CG | 858 | 3 | 40/40/40 | 80 | 80 | 15 | 0 | 958 | 45 |
| CG2 | CG | 858 | 2 | 40/40/40 | 80 | 80 | 12 | 10 | 928 | 40 |
| CH1 | CH | 899 | 2 | 45/45 | 80 | 80 | 12 | 20 | 959 | 40 |
| CI1 | CI | 852 | 2 | 45/45 | 75 | 90 | 14 | 0 | 952 | 40 |
| CI2 | CI | 852 | 2 | 45/45 | 75 | 80 | 15 | 0 | 922 | 45 |
| CJ1 | CJ | 852 | 3 | 40/40/40 | 85 | 85 | 11 | 0 | 962 | 45 |
| CJ2 | CJ | 852 | 2 | 45/45 | 75 | 80 | 12 | 0 | 922 | 40 |
| CK1 | CK | 861 | 3 | 40/40/40 | 85 | 90 | 12 | 0 | 961 | 40 |

TABLE 7-continued

Manufacturing conditions

| | | | | | | | | | | | |
|---|---|---|---|---|---|---|---|---|---|---|---|
| CK2 | CK | 853 | 3 | 40/40/40 | 85 | 90 | 14 | 0 | 923 | 40 |
| CL1 | CL | 853 | 2 | 45/45 | 80 | 85 | 17 | 0 | 953 | 45 |
| CL2 | CL | 853 | 2 | 45/45 | 80 | 80 | 13 | 0 | 923 | 50 |
| CM1 | CM | 866 | 1 | 20 | 150 | 65 | 17 | 10 | 966 | 40 |
| CM2 | CM | 866 | 1 | 50 | 150 | 60 | 11 | 0 | 966 | 50 |
| CN1 | CN | 852 | 2 | 45/45 | 75 | 70 | 15 | 0 | 952 | 40 |
| CO1 | CO | 885 | 2 | 45/45 | 80 | 60 | 14 | 0 | 985 | 45 |
| CO2 | CO | 885 | 1 | 50 | 120 | <u>20</u> | 15 | 10 | 1100 | 45 |
| CP1 | CP | 873 | 2 | 45/45 | 75 | 85 | 12 | 0 | 973 | 40 |
| CQ1 | CQ | 852 | 2 | 45/45 | 80 | 80 | 16 | 0 | 952 | 45 |
| CR1 | CR | 875 | 2 | 45/45 | 75 | 85 | 11 | 0 | 985 | 40 |
| CS1 | CS | 852 | 2 | 45/45 | 80 | 85 | 12 | 0 | 992 | 40 |
| CS2 | CS | 852 | 2 | 45/45 | 75 | 80 | 15 | 0 | 922 | 45 |
| CT1 | CT | 861 | 2 | 45/45 | 80 | 95 | 14 | 15 | 961 | 45 |
| CT2 | CT | 861 | 2 | 45/45 | 85 | 80 | 13 | 0 | 931 | 40 |
| CU1 | CU | 876 | 2 | 45/45 | 75 | 85 | 13 | 10 | 976 | 40 |
| CV1 | CV | 853 | 2 | 45/45 | 85 | 80 | 12 | 0 | 953 | 40 |
| CW1 | CW | 1043 | 1 | 50 | 130 | 80 | 16 | 10 | 1083 | 45 |
| Ca1 | Ca | 860 | 2 | 45/45 | 75 | 90 | 15 | 0 | 960 | 45 |
| Cb1 | Cb | 854 | 1 | 50 | 120 | 85 | 12 | 0 | 954 | 40 |
| Cc1 | Cc | 914 | 2 | 45/45 | 75 | 90 | 12 | 0 | 994 | 40 |
| Cd1 | Cd | 939 | 2 | 45/45 | 75 | 85 | 13 | 0 | 999 | 40 |
| Ce1 | Ce | 851 | 2 | 45/45 | 80 | 65 | 11 | 0 | 951 | 40 |
| Cf1 | Cf | 952 | 2 | 45/45 | 80 | 70 | 13 | 0 | 1012 | 40 |
| Cg1 | Cg | 853 | 2 | 45/45 | 75 | 60 | 12 | 0 | 953 | 40 |

(2/2)

| Steel type | t1 | 2.5 × t1 | t: Waiting time from completion of heavy rolling pass to initiation of cooling/s | t/t1 | Winding temperature/ °C. | Cold rolling reduction rate/% | Annealing temperature/ °C. | Annealing holding time/s | Primary cooling rate/° C./s | Primary cooling stop temperature/° C. |
|---|---|---|---|---|---|---|---|---|---|---|
| CA1 | 0.13 | 0.33 | 0.28 | 2.15 | 500 | 45 | 790 | 60 | 30 | 280 |
| CA2 | 0.66 | 1.65 | 1.15 | 1.75 | 500 | 45 | <u>660</u> | 60 | 30 | 280 |
| CB1 | 0.14 | 0.34 | 0.29 | 2.10 | 500 | 45 | 850 | 30 | 30 | 270 |
| CB2 | 0.66 | 1.65 | 1.15 | 1.75 | 500 | 45 | 850 | 90 | 100 | 270 |
| CC1 | 0.22 | 0.55 | 0.37 | 1.68 | 600 | 50 | 800 | 30 | 120 | 350 |
| CC2 | 0.66 | 1.65 | 1.15 | 1.75 | 600 | 50 | 800 | 30 | 120 | 350 |
| CD1 | 0.34 | 0.85 | 0.49 | 1.44 | 600 | 40 | 820 | 40 | 100 | 290 |
| CD2 | 0.51 | 1.28 | 0.70 | 1.37 | 600 | 40 | 820 | 40 | 30 | 290 |
| CE1 | 1.32 | 3.30 | 1.47 | 1.11 | 600 | 50 | 740 | 40 | 120 | 350 |
| CE2 | 0.66 | 1.65 | 1.15 | 1.75 | 600 | 50 | 740 | 40 | 30 | 350 |
| CF1 | 0.89 | 2.22 | 1.04 | 1.17 | 500 | 40 | 830 | 90 | 100 | 300 |
| CF2 | 0.83 | 2.08 | <u>6.00</u> | <u>7.21</u> | 500 | 40 | 830 | 90 | 100 | 300 |
| CG1 | 0.22 | 0.55 | <u>0.37</u> | <u>1.68</u> | 600 | 55 | 760 | 30 | 30 | 330 |
| CG2 | 0.83 | 2.08 | <u>0.04</u> | <u>0.05</u> | 600 | 40 | 760 | 30 | 100 | 330 |
| CH1 | 1.06 | 2.65 | <u>1.21</u> | <u>1.14</u> | 500 | 45 | 850 | 90 | 120 | 320 |
| CI1 | 0.34 | 0.85 | 0.49 | 1.44 | 600 | 50 | 780 | 30 | 100 | 400 |
| CI2 | 0.66 | 1.65 | 1.15 | 1.75 | 600 | 50 | 780 | 90 | 30 | 400 |
| CJ1 | 0.15 | 0.39 | 0.30 | 1.97 | 600 | 50 | 780 | 30 | 30 | 410 |
| CJ2 | 0.83 | 2.08 | 1.46 | 1.75 | 600 | 50 | 780 | 90 | 100 | 410 |
| CK1 | 0.34 | 0.85 | 0.49 | 1.44 | 550 | 40 | 855 | 30 | 30 | 270 |
| CK2 | 0.83 | 2.08 | 0.98 | 1.18 | 600 | 45 | 800 | 90 | 30 | 400 |
| CL1 | 0.22 | 0.55 | 0.37 | 1.68 | 600 | 45 | 800 | 30 | 30 | 400 |
| CL2 | 0.51 | 1.28 | 0.66 | 1.29 | 600 | 45 | 800 | 30 | 100 | 400 |
| CM1 | 0.34 | 0.85 | 0.49 | 1.44 | 500 | 50 | 840 | 60 | 100 | 300 |
| CM2 | 0.15 | 0.38 | 0.25 | 1.67 | 500 | 20 | 840 | 60 | 100 | 300 |
| CN1 | 0.34 | 0.85 | 0.49 | 1.44 | 550 | 40 | 870 | 30 | 120 | 325 |
| CO1 | 0.22 | 0.55 | 0.37 | 1.68 | 600 | 40 | 800 | 30 | 100 | 270 |
| CO2 | 0.66 | 1.65 | 1.15 | 1.75 | 600 | 40 | 800 | 30 | 100 | 270 |
| CP1 | 0.34 | 0.85 | 0.49 | 1.44 | 600 | 40 | 800 | 40 | 30 | 250 |
| CQ1 | 0.22 | 0.55 | 0.37 | 1.68 | 600 | 50 | 810 | 40 | 110 | 350 |
| CR1 | 0.24 | 0.60 | 0.39 | 1.63 | 500 | 40 | 830 | 90 | 100 | 350 |
| CS1 | 0.13 | 0.33 | 0.28 | 2.14 | 550 | 55 | 780 | 60 | 30 | 320 |
| CS2 | 0.66 | 1.65 | 0.81 | 1.23 | 550 | 45 | 780 | 60 | 100 | 320 |
| CT1 | 0.22 | 0.55 | 0.37 | 1.68 | 500 | 50 | 870 | 30 | 100 | 350 |
| CT2 | 0.83 | 2.08 | 0.98 | 1.18 | 500 | 50 | 870 | 30 | 30 | 350 |
| CU1 | 0.34 | 0.85 | 0.49 | 1.44 | 500 | 45 | 850 | 30 | 120 | 350 |
| CV1 | 0.34 | 0.85 | 0.49 | 1.44 | 600 | 50 | 860 | 40 | 100 | 320 |
| CW1 | 1.46 | 3.66 | 1.61 | 1.10 | 550 | 40 | 800 | 40 | 120 | 350 |
| Ca1 | 0.22 | 0.55 | 0.37 | 1.68 | 600 | 45 | 820 | 30 | 100 | 350 |
| Cb1 | 0.34 | 0.85 | 0.49 | 1.44 | 600 | 45 | 820 | 30 | 100 | 350 |
| Cc1 | 0.64 | 1.59 | 0.79 | 1.24 | 600 | 45 | 820 | 30 | 100 | 350 |
| Cd1 | 1.06 | 2.65 | 1.21 | 1.14 | 600 | 45 | 820 | 30 | 100 | 350 |

TABLE 7-continued

| | | | Manufacturing conditions | | | | | | | |
|---|---|---|---|---|---|---|---|---|---|---|
| Ce1 | 0.34 | 0.85 | 0.49 | 1.44 | 600 | 50 | 820 | 30 | 100 | 350 |
| Cf1 | 1.06 | 2.65 | 1.21 | 1.14 | 600 | 40 | 820 | 30 | 100 | 350 |
| Cg1 | 0.34 | 0.85 | 0.49 | 1.44 | 600 | 55 | 820 | 30 | 100 | 350 |

Table 6 shows the chemical components of the respective steels, and Table 7 shows the respective manufacturing conditions. In addition, Table 8 shows the structures and mechanical characteristics of the steel sheets. As an index of local deformability, the hole expanding rate and the limit bending radius through V-shape bending were used. In bending tests, C-direction bending and 45°-direction bending were carried out, and the rates were used as the index of the orientation dependency of formability. Tensile tests and the bending tests were based on JIS Z2241 and the V block 90° bending tests of JIS Z2248, and hole expanding tests were based on the Japan Iron and Steel Federation standard JFS T1001, respectively. The X-ray random intensity ratio was measured using the EBSD at a 0.5 μm pitch with respect to a ¼ location from the end portion in the width direction in a sheet thickness central portion in a ⅝ to ⅜ area of a cross section parallel to the rolling direction. In addition, the r values in the respective directions were measured through the above methods.

[Table 8]

TABLE 8

The structure and mechanical characteristics of the respective steels in the respective manufacturing conditions (1/4)

| Steel type | | X-ray random intensity ratio of {100} <011> to {223} <110> orientation group | X-ray random intensity ratio of {332} <113> | rL | rC | r30 | r60 | coarsened grain area ratio/% |
|---|---|---|---|---|---|---|---|---|
| CA1 | CA | 2.6 | 2.5 | 0.83 | 0.84 | 0.85 | 0.88 | 9 |
| CA2 | CA | 4.4 | 3.0 | 0.80 | 0.81 | 0.90 | 0.92 | 15 |
| CB1 | CB | 2.1 | 2.6 | 0.84 | 0.85 | 0.86 | 0.89 | 8 |
| CB2 | CB | 2.5 | 3.0 | 0.79 | 0.81 | 0.90 | 0.92 | 6 |
| CC1 | CC | 3.0 | 2.5 | 0.78 | 0.80 | 0.91 | 0.93 | 5 |
| CC2 | CC | 5.0 | 3.5 | 0.40 | 0.40 | 1.26 | 1.15 | 15 |
| CD1 | CD | 3.1 | 3.8 | 0.83 | 0.84 | 0.99 | 0.99 | 5 |
| CD2 | CD | 5.1 | 5.8 | 0.84 | 0.85 | 0.95 | 0.96 | 12 |
| CE1 | CE | 5.2 | 7.1 | 0.73 | 0.75 | 1.01 | 1.01 | 8 |
| CE2 | CE | 3.6 | 2.5 | 0.79 | 0.81 | 0.90 | 0.92 | 5 |
| CF1 | CF | 3.2 | 4.0 | 0.72 | 0.75 | 0.97 | 0.98 | 3 |
| CF2 | CF | 1.1 | 1.2 | 0.95 | 0.95 | 0.99 | 1.01 | 30 |
| CG1 | CG | 3.4 | 2.0 | 0.78 | 0.80 | 0.91 | 0.93 | 4 |
| CG2 | CG | 5.1 | 5.2 | 0.61 | 0.66 | 1.40 | 1.38 | 30 |
| CH1 | CH | 3.1 | 3.6 | 0.72 | 0.76 | 0.97 | 0.98 | 1 |
| CI1 | CI | 3.5 | 2.8 | 0.74 | 0.77 | 0.94 | 0.95 | 3 |
| CI2 | CI | 3.2 | 2.5 | 0.78 | 0.80 | 0.90 | 0.92 | 5 |
| CJ1 | CJ | 2.9 | 2.2 | 0.82 | 0.83 | 0.88 | 0.91 | 7 |
| CJ2 | CJ | 3.2 | 2.5 | 0.78 | 0.80 | 0.90 | 0.92 | 5 |
| CK1 | CK | 2.7 | 3.8 | 0.76 | 0.79 | 0.95 | 0.96 | 5 |
| CK2 | CK | 3.5 | 3.5 | 0.73 | 0.76 | 0.99 | 0.99 | 2 |
| CL1 | CL | 3.0 | 3.0 | 0.78 | 0.80 | 0.91 | 0.93 | 6 |
| CL2 | CL | 3.4 | 3.4 | 0.74 | 0.77 | 0.95 | 0.96 | 3 |

(2/4)

| Steel type | equiaxed grain rate/% | TS/MPa | El./% | λ/% | Sheet thickness/minimum bending radius (C bending) | 45°-direction bending/ C-direction bending ratio | Note |
|---|---|---|---|---|---|---|---|
| CA1 | 67 | 785 | 24 | 121 | 5.8 | 1.0 | Invention steel |
| CA2 | 29 | 805 | 15 | 61 | 0.6 | 1.6 | Comparative steel |
| CB1 | 66 | 788 | 24 | 130 | 6.5 | 1.0 | Invention steel |
| CB2 | 71 | 778 | 24 | 125 | 5.1 | 1.1 | Invention steel |
| CC1 | 72 | 598 | 28 | 154 | 4.9 | 1.1 | Invention steel |
| CC2 | 39 | 598 | 22 | 81 | 1.2 | 2.9 | Comparative steel |
| CD1 | 74 | 1216 | 14 | 29 | 3.9 | 1.1 | Invention steel |

TABLE 8-continued

The structure and mechanical characteristics of the respective steels in the respective manufacturing conditions

| | | | | | | | |
|---|---|---|---|---|---|---|---|
| CD2 | 58 | 1211 | 8 | <u>10</u> | <u>0.4</u> | <u>1.7</u> | Comparative steel |
| CE1 | 81 | 585 | 29 | <u>82</u> | <u>0.8</u> | <u>1.8</u> | Comparative steel |
| CE2 | 69 | 588 | 29 | 151 | 4.6 | 1.1 | Invention steel |
| CF1 | 77 | 1198 | 14 | 66 | 3.3 | 1.3 | Invention steel |
| CF2 | <u>30</u> | 1100 | 5 | <u>50</u> | 6.0 | 1.0 | Invention steel |
| CG1 | 70 | 594 | 29 | 150 | 5.0 | 1.1 | Invention steel |
| CG2 | <u>30</u> | 544 | 26 | <u>71</u> | <u>1.4</u> | <u>2.1</u> | Comparative steel |
| CH1 | 75 | 844 | 20 | 104 | 3.6 | 1.3 | Invention steel |
| CI1 | 76 | 593 | 37 | 150 | 4.1 | 1.2 | Invention steel |
| CI2 | 69 | 583 | 38 | 155 | 4.9 | 1.1 | Invention steel |
| CJ1 | 69 | 608 | 36 | 153 | 5.7 | 1.0 | Invention steel |
| CJ2 | 69 | 603 | 36 | 151 | 4.9 | 1.1 | Invention steel |
| CK1 | 76 | 1194 | 16 | 38 | 3.9 | 1.2 | Invention steel |
| CK2 | 78 | 1194 | 16 | 30 | 3.4 | 1.3 | Invention steel |
| CL1 | 72 | 795 | 28 | 114 | 4.5 | 1.1 | Invention steel |
| CL2 | 74 | 785 | 28 | 112 | 3.6 | 1.2 | Invention steel |

(3/4)

| Steel type | | intensity ratio of {100}<011> to {223}<110> orientation group | intensity ratio of {332}<113> | | | | | grain area ratio/% |
|---|---|---|---|---|---|---|---|---|
| CM1 | CM | 2.9 | 2.8 | 0.89 | 0.89 | 1.00 | 1.00 | 3 |
| CM2 | CM | 2.6 | 5.5 | 0.93 | 0.92 | 0.96 | 0.97 | 15 |
| CN1 | CN | 2.6 | 3.8 | 0.74 | 0.77 | 0.92 | 0.94 | 5 |
| CO1 | CO | 3.0 | 3.5 | 0.78 | 0.80 | 0.89 | 0.91 | 7 |
| CO2 | CO | <u>5.0</u> | <u>5.5</u> | <u>0.58</u> | <u>0.58</u> | <u>1.18</u> | <u>1.31</u> | <u>17</u> |
| CP1 | CP | 3.3 | 3.8 | 0.74 | 0.77 | 0.94 | 0.95 | 5 |
| CQ1 | CQ | 2.9 | 2.5 | 0.78 | 0.80 | 0.91 | 0.93 | 5 |
| CR1 | CR | 2.8 | 3.6 | 0.76 | 0.79 | 0.92 | 0.93 | 6 |
| CS1 | CS | 2.8 | 2.6 | 0.83 | 0.84 | 0.86 | 0.89 | 7 |
| CS2 | CS | 3.7 | 3.5 | 0.72 | 0.76 | 0.96 | 0.96 | 2 |
| CT1 | CT | 2.3 | 2.5 | 0.78 | 0.80 | 0.92 | 0.94 | 4 |
| CT2 | CT | 2.8 | 3.0 | 0.73 | 0.76 | 0.98 | 0.98 | 1 |
| CU1 | CU | 2.8 | 3.3 | 0.74 | 0.77 | 0.94 | 0.95 | 4 |
| CV1 | CV | 2.7 | 2.8 | 0.76 | 0.79 | 0.94 | 0.95 | 3 |
| CW1 | CW | 3.6 | 4.1 | 0.79 | 0.81 | 1.05 | 1.04 | 2 |
| Ca1 | Ca | 2.8 | 3.0 | 0.77 | 0.79 | 0.96 | 0.97 | 6 |
| Cb1 | Cb | <u>8.1</u> | <u>9.3</u> | <u>0.53</u> | <u>0.64</u> | <u>1.27</u> | <u>1.28</u> | 4 |
| Cc1 | Cc | <u>8.3</u> | <u>9.5</u> | <u>0.42</u> | <u>0.56</u> | <u>1.20</u> | <u>1.22</u> | 3 |
| Cd1 | Cd | <u>8.4</u> | <u>9.6</u> | <u>0.41</u> | <u>0.55</u> | <u>1.19</u> | <u>1.21</u> | 2 |
| Ce1 | Ce | 3.1 | 2.8 | 0.75 | 0.78 | 0.91 | 0.93 | 3 |
| Cf1 | Cf | <u>6.4</u> | <u>8.1</u> | <u>0.42</u> | <u>0.56</u> | <u>1.18</u> | <u>1.20</u> | 3 |
| Cg1 | Cg | 3.1 | 2.3 | 0.74 | 0.77 | 0.90 | 0.92 | 2 |

(4/4)

| Steel type | equiaxed grain rate/% | TS/MPa | El./% | λ/% | Sheet thickness/minimum bending radius (C bending) | 45°-direction bending/ C-direction bending ratio | Note |
|---|---|---|---|---|---|---|---|
| CM1 | 67 | 592 | 29 | 157 | 5.0 | 1.1 | Invention steel |
| CM2 | 30 | 592 | 25 | 99 | 0.5 | 1.5 | Comparative steel |
| CN1 | 69 | 974 | 17 | 84 | 4.1 | 1.2 | Invention steel |

TABLE 8-continued

The structure and mechanical characteristics of the respective steels in the respective manufacturing conditions

| | | | | | | | | |
|---|---|---|---|---|---|---|---|---|
| CO1 | 63 | 874 | 19 | 98 | 4.2 | 1.1 | Invention steel |
| CO2 | 29 | 884 | 14 | 23 | 1.4 | 2.0 | Invention steel |
| CP1 | 74 | 1483 | 11 | 56 | 3.6 | 1.2 | Invention steel |
| CQ1 | 70 | 600 | 32 | 154 | 5.0 | 1.1 | Invention steel |
| CR1 | 72 | 1110 | 15 | 71 | 4.2 | 1.1 | Invention steel |
| CS1 | 67 | 594 | 32 | 157 | 5.7 | 1.0 | Invention steel |
| CS2 | 74 | 590 | 32 | 149 | 3.4 | 1.2 | Invention steel |
| CT1 | 75 | 1004 | 19 | 82 | 5.5 | 1.1 | Invention steel |
| CT2 | 75 | 989 | 19 | 78 | 4.1 | 1.2 | Invention steel |
| CU1 | 74 | 665 | 26 | 143 | 4.2 | 1.2 | Invention steel |
| CV1 | 72 | 756 | 22 | 126 | 4.8 | 1.2 | Invention steel |
| CW1 | 76 | 1459 | 12 | 53 | 3.1 | 1.2 | Invention steel |
| Ca1 | 73 | 893 | 14 | 21 | 4.4 | 1.2 | Comparative steel |
| Cb1 | 34 | 912 | 12 | 28 | 0.8 | 2.1 | Comparative steel |
| Cc1 | 38 | 893 | 15 | 61 | 0.7 | 2.4 | Comparative steel |
| Cd1 | 27 | 1058 | 8 | 18 | 0.7 | 2.4 | Comparative steel |
| Ce1 | 67 | 583 | 26 | 83 | 4.5 | 1.1 | Comparative steel |
| Cf1 | 72 | 1079 | 13 | 14 | 0.9 | 2.3 | Comparative steel |
| Cg1 | 66 | 688 | 21 | 72 | 5.0 | 1.1 | Comparative steel |

Example 3

The technical content of the galvanized steel sheet according to the embodiment will be described using examples of the present invention.

The results of studies in which steels of DA to DL having the component compositions shown in Table 9 were used as examples will be described.

[Table 9]

TABLE 9

Chemical components (mass %)

| | T1/° C. | C | Si | Mn | P | S | Al | N | O | Ti | Nb | B |
|---|---|---|---|---|---|---|---|---|---|---|---|---|
| DA | 857 | 0.114 | 0.05 | 2.15 | 0.012 | 0.004 | 0.590 | 0.0026 | 0.0032 | — | — | 0.0005 |
| DB | 868 | 0.087 | 0.62 | 2.03 | 0.012 | 0.003 | 0.180 | 0.0032 | 0.0023 | 0.022 | 0.017 | 0.0012 |
| DC | 852 | 0.140 | 0.87 | 1.20 | 0.009 | 0.004 | 0.038 | 0.0033 | 0.0026 | — | — | — |
| DD | 858 | 0.145 | 0.10 | 2.33 | 0.012 | 0.003 | 0.710 | 0.0033 | 0.0021 | 0.017 | — | 0.0005 |
| DE | 873 | 0.220 | 0.13 | 2.96 | 0.015 | 0.003 | 0.120 | 0.0029 | 0.0029 | 0.024 | 0.021 | — |
| DF | 882 | 0.068 | 0.50 | 2.31 | 0.009 | 0.002 | 0.040 | 0.0032 | 0.0038 | 0.03 | 0.065 | — |
| DG | 851 | 0.061 | 0.11 | 2.20 | 0.010 | 0.001 | 0.038 | 0.0025 | 0.0029 | — | — | — |
| DH | 900 | 0.035 | 0.05 | 1.80 | 0.010 | 0.001 | 0.021 | 0.0019 | 0.0023 | 0.17 | 0.02 | 0.0014 |
| DI | 861 | 0.410 | 0.08 | 2.60 | 0.190 | 0.002 | 0.041 | 0.0029 | 0.003 | — | — | — |
| DJ | 1220 | 0.051 | 0.07 | 1.67 | 0.008 | 0.002 | 0.029 | 0.0034 | 0.0031 | 0.65 | 0.59 | — |
| DK | 853 | 0.150 | 0.61 | 2.20 | 0.011 | 0.002 | 0.028 | 0.0021 | 0.0036 | — | — | — |
| DL | 1045 | 0.120 | 0.17 | 2.26 | 0.028 | 0.090 | 0.033 | 0.0027 | 0.0019 | — | — | 0.0520 |

| | Mg | Rem | Ca | Mo | Cr | V | W | As | Others |
|---|---|---|---|---|---|---|---|---|---|
| DA | — | — | — | 0.04 | — | — | — | — | — |
| DB | — | — | — | — | 0.44 | — | — | — | — |
| DC | — | — | — | — | — | — | — | — | — |
| DD | — | 0.0014 | — | — | — | — | — | — | — |
| DE | 0.0035 | — | 0.0015 | — | — | 0.029 | — | — | — |
| DF | — | 0.0021 | — | — | — | — | — | — | — |
| DG | — | — | — | — | — | — | 0.05 | 0.01 | Cu: 0.5%, Ni: 0.25%, |

TABLE 9-continued

| | Chemical components (mass %) | | | | | | | |
|---|---|---|---|---|---|---|---|---|
| | | | | | | | | Co: 0.5, Sn: 0.02%, Zr: 0.02% |
| DH | — | 0.0005 | 0.0009 | — | — | — | — | — |
| DI | — | — | — | — | — | — | — | — |
| DJ | — | — | — | — | — | — | — | — |
| DK | 0.090 | 0.10 | — | — | — | — | — | — |
| DL | — | — | — | 1.9 | — | — | — | — |

The steels were cast, reheated as they were or after being cooled to room temperature, heated to a temperature range of 900° C. to 1300° C., then, cold-rolled under the conditions of Table 10, thereby obtaining 2 mm to 5 mm-thick hot-rolled steel sheets. The steel sheets were pickled, cold-rolled into a thickness of 1.2 mm to 2.3 mm, annealed under the annealing conditions shown in Table 10, and continuously subjected to annealing and a galvanized coating or galvanealed coating treatment using a galvanized coating bath. After that, 0.5% scan pass rolling was carried out, and the steel sheets were provided for material quality evaluation.

[Table 10]

TABLE 10

Manufacturing conditions (1/2)

| | Steel type | T1/° C. | Number of times of rolling of 20% or more at 1000° C. to 1200° C. | Rolling reduction rate of 20% or more at 1000° C. to 1200° C./% | Austenite grain diameter/μm | Total rolling reduction rate at T1 + 30° C. to T1 + 200° C./% | Temperature increase during rolling at T1 + 30° C. to T1 + 200° C./° C. | Total rolling reduction rate at T1° C. to lower than T1 + 30° C./% | Tf: Temperature after final pass of heavy rolling pass/° C. | P1: Rolling reduction rate of final pass of heavy rolling pass |
|---|---|---|---|---|---|---|---|---|---|---|
| 30 | DA | 857 | 1 | 50 | 130 | 90 | 15 | 0 | 955 | 45 |
| 31 | DA | 857 | 2 | 45/45 | 85 | 85 | 10 | 0 | 975 | 40 |
| 32 | DB | 868 | 2 | 45/45 | 85 | 80 | 10 | 10 | 950 | 35 |
| 33 | DB | 868 | 2 | 45/45 | 90 | 85 | 10 | 5 | 925 | 35 |
| 34 | DC | 852 | 2 | 45/45 | 90 | 85 | 15 | 15 | 960 | 30 |
| 35 | DC | 852 | 2 | 45/45 | 95 | 95 | 17 | 0 | 935 | 35 |
| 36 | DD | 858 | 3 | 40/40/40 | 70 | 85 | 15 | 25 | 980 | 30 |
| 37 | DE | 873 | 2 | 45/45 | 85 | 80 | 17 | 5 | 955 | 30 |
| 38 | DE | 873 | 1 | 50 | 110 | 80 | 18 | 15 | 925 | 30 |
| 39 | DF | 882 | 3 | 40/40/40 | 75 | 90 | 18 | 0 | 965 | 35 |
| 40 | DG | 851 | 3 | 40/40/40 | 95 | 85 | 10 | 0 | 945 | 35 |
| 41 | DH | 900 | 2 | 45/45 | 75 | 90 | 13 | 0 | 990 | 40 |
| 42 | DH | 900 | 2 | 45/45 | 80 | 85 | 15 | 10 | 985 | 40 |
| 43 | DF | 882 | 1 | 50 | 100 | 65 | 20 | 25 | 935 | 45 |
| 44 | DG | 851 | 1 | 50 | 150 | 70 | 20 | 15 | 905 | 45 |
| 45 | DG | 851 | 1 | 20 | 150 | 60 | 21 | 20 | 890 | 45 |
| 46 | DH | 900 | 1 | 50 | 120 | 65 | 19 | 10 | 950 | 45 |
| 47 | DH | 900 | 1 | 50 | 120 | 35 | 12 | 45 | 880 | 30 |
| 48 | DA | 857 | 2 | 45/45 | 90 | 45 | 20 | 45 | 900 | 30 |
| 49 | DB | 868 | 2 | 45/45 | 90 | 45 | 15 | 45 | 1050 | 30 |
| 50 | DC | 852 | 2 | 40/45 | 85 | 70 | 15 | 45 | 890 | 30 |
| 51 | DG | 851 | 0 | — | 370 | 45 | 30 | 35 | 885 | 45 |
| 52 | DE | 873 | 1 | 50 | 120 | 80 | 40 | 35 | 860 | 40 |
| 53 | DA | 857 | 0 | — | 240 | 60 | 18 | 20 | 855 | 30 |
| 54 | DC | 852 | 0 | — | 220 | 85 | 14 | 25 | 880 | 45 |
| 55 | DA | 852 | 2 | 45/45 | 85 | 85 | 10 | 0 | 975 | 40 |
| 56 | DB | 852 | 2 | 45/45 | 90 | 85 | 10 | 5 | 925 | 35 |
| 57 | DC | 852 | 2 | 45/45 | 90 | 85 | 25 | 15 | 910 | 45 |
| 58 | DG | 851 | 3 | 40/40/40 | 95 | 85 | 22 | 0 | 905 | 40 |
| 59 | DI | 861 | | | | Cracked during casting or hot rolling | | | | |
| 60 | DJ | 1220 | | | | Cracked during casting or hot rolling | | | | |
| 61 | DK | 853 | | | | Cracked during casting or hot rolling | | | | |
| 62 | DL | 1045 | | | | Cracked during casting or hot rolling | | | | |

TABLE 10-continued

Manufacturing conditions (2/2)

| Steel type | t1 | 2.5 × t1 | t: Waiting time from completion of heavy rolling pass to initiation of cooling/s | t/t1 | Winding temperature/° C. | Cold rolling reduction rate/% | Annealing temperature/° C. | Annealing holding time/s | Primary cooling rate/° C./s | Primary cooling stop temperature/° C. |
|---|---|---|---|---|---|---|---|---|---|---|
| 30 | 0.23 | 0.58 | 0.30 | 1.28 | 580 | 60 | 820 | 60 | 3 | 650 |
| 31 | 0.18 | 0.45 | 0.20 | 1.11 | 520 | 60 | 820 | 60 | 3 | 650 |
| 32 | 0.79 | 1.98 | 1.10 | 1.39 | 550 | 50 | 840 | 30 | 5 | 680 |
| 33 | 1.32 | 3.29 | 1.90 | 1.44 | 600 | 50 | 840 | 30 | 5 | 680 |
| 34 | 0.61 | 1.54 | 0.90 | 1.46 | 550 | 50 | 830 | 40 | 3 | 640 |
| 35 | 0.77 | 1.93 | 1.00 | 1.29 | 570 | 50 | 830 | 40 | 3 | 640 |
| 36 | 0.45 | 1.12 | 0.60 | 1.34 | 530 | 45 | 850 | 90 | 2 | 700 |
| 37 | 1.02 | 2.55 | 1.50 | 1.47 | 600 | 40 | 825 | 90 | 2 | 680 |
| 38 | 1.64 | 4.10 | 2.40 | 1.46 | 600 | 40 | 825 | 90 | 2 | 680 |
| 39 | 0.78 | 1.94 | 1.00 | 1.29 | 620 | 60 | 850 | 30 | 5 | 650 |
| 40 | 0.60 | 1.51 | 0.90 | 1.49 | 600 | 60 | 860 | 30 | 5 | 650 |
| 41 | 0.48 | 1.19 | 0.70 | 1.47 | 450 | 50 | 680 | 30 | 5 | 620 |
| 42 | 0.55 | 1.38 | 0.70 | 1.26 | 450 | 50 | 680 | 30 | 5 | 620 |
| 43 | 1.07 | 2.67 | 2.00 | 1.88 | 620 | 60 | 850 | 30 | 5 | 650 |
| 44 | 1.05 | 2.63 | 1.50 | 1.43 | 600 | 60 | 860 | 30 | 5 | 650 |
| 45 | 1.51 | 3.77 | 2.60 | 1.72 | 600 | 60 | 860 | 30 | 5 | 650 |
| 46 | 1.16 | 2.90 | 1.50 | 1.29 | 600 | 60 | 860 | 30 | 5 | 650 |
| 47 | 3.80 | 9.49 | 4.00 | 1.05 | 600 | 60 | 860 | 30 | 5 | 650 |
| 48 | 1.85 | 4.62 | <u>4.80</u> | 2.60 | 580 | 60 | 820 | 60 | 3 | 650 |
| 49 | 0.13 | 0.32 | <u>0.10</u> | 0.77 | 550 | 50 | 840 | 30 | 5 | 680 |
| 50 | 1.98 | 4.95 | <u>1.00</u> | 0.51 | 550 | 50 | 840 | 30 | 5 | 680 |
| 51 | 1.68 | 4.20 | <u>0.40</u> | 0.24 | 600 | 40 | 825 | 90 | 2 | 680 |
| 52 | 3.69 | 9.22 | <u>9.00</u> | 2.44 | 530 | 45 | 850 | 90 | 2 | 700 |
| 53 | 3.15 | 7.88 | <u>0.80</u> | 0.25 | 580 | 60 | 820 | 60 | 3 | 650 |
| 54 | 1.87 | 4.69 | 2.00 | 1.07 | 570 | 50 | 830 | 40 | 3 | 640 |
| 55 | 0.16 | 0.39 | 0.20 | 1.28 | <u>720</u> | 60 | 780 | 60 | <u>0.05</u> | <u>725</u> |
| 56 | 0.96 | 2.41 | 2.00 | 2.08 | 600 | 50 | <u>950</u> | <u>0.5</u> | 5 | 600 |
| 57 | 0.93 | 2.32 | 1.00 | 1.08 | <u>750</u> | 10 | 830 | 40 | 3 | 640 |
| 58 | 1.22 | 3.06 | 1.30 | 1.06 | 600 | 60 | 600 | 30 | 5 | 650 |
| 59 | | | | | Cracked during casting or hot rolling | | | | | |
| 60 | | | | | Cracked during casting or hot rolling | | | | | |
| 61 | | | | | Cracked during casting or hot rolling | | | | | |
| 62 | | | | | Cracked during casting or hot rolling | | | | | |

Table 9 shows the chemical components of the respective steels, Table 10 shows the respective manufacturing conditions, and Table 11 shows the structures and mechanical characteristics of the steel sheets under the respective manufacturing conditions.

As an index of local deformability, the hole expanding rate and the limit bending radius through 90° V-shape bending were used. Tensile tests and the bending tests were based on JIS Z2241 and the V block 90° bending tests of JIS Z 2248, and hole expanding tests were based on the Japan Iron and Steel Federation standard JFS T1001, respectively. The X-ray random intensity ratio was measured using the EBSD at a 0.5 μm pitch with respect to a ¼ location from the end portion in the width direction in a sheet thickness central portion in a ⅜ to ⅝ area of a cross section parallel to the rolling direction. In addition, the r values in the respective directions were measured through the above methods.

[Table 11]

TABLE 11

The structure and mechanical characteristics of the respective steels in the respective manufacturing conditions (1/2)

| Steel type | | X-ray random intensity ratio of {100} <011> to {223} <110> orientation group | X-ray random intensity ratio of {332} <113> | rL | rC | r30 | r60 |
|---|---|---|---|---|---|---|---|
| 30 | DA | 2.5 | 2.2 | 0.81 | 0.86 | 0.97 | 0.98 |
| 31 | DA | 2.4 | 2.3 | 0.85 | 0.82 | 0.92 | 0.91 |
| 32 | DB | 2.1 | 2.3 | 0.90 | 0.93 | 0.92 | 0.98 |
| 33 | DB | 2.3 | 2.5 | 0.88 | 0.91 | 0.98 | 1.00 |
| 34 | DC | 2.5 | 2.3 | 0.78 | 0.75 | 0.85 | 0.82 |
| 35 | DC | 2.6 | 2.8 | 0.85 | 0.89 | 0.98 | 1.00 |

TABLE 11-continued

The structure and mechanical characteristics of the respective steels in the respective manufacturing conditions

| | | | | | | | |
|---|---|---|---|---|---|---|---|
| 36 | DD | 3.0 | 3.1 | 0.70 | 0.70 | 1.08 | 1.08 |
| 37 | DE | 2.9 | 3.0 | 0.76 | 0.80 | 1.06 | 1.05 |
| 38 | DE | 3.3 | 3.0 | 0.72 | 1.00 | 0.97 | 1.09 |
| 39 | DF | 2.3 | 2.4 | 0.85 | 0.88 | 1.03 | 1.05 |
| 40 | DG | 2.4 | 2.3 | 0.82 | 0.90 | 1.00 | 0.98 |
| 41 | DH | 2.7 | 2.8 | 0.73 | 0.75 | 0.98 | 1.00 |
| 42 | DH | 2.9 | 3.0 | 0.75 | 0.78 | 0.95 | 1.10 |
| 43 | DF | 3.9 | 4.8 | 0.63 | 0.76 | 1.05 | 1.20 |
| 44 | DG | 3.4 | 3.7 | 0.62 | 0.77 | 1.08 | 1.19 |
| 45 | DG | 3.9 | 4.8 | 0.60 | 0.75 | 1.10 | 1.28 |
| 46 | DH | 3.9 | 4.9 | 0.62 | 0.80 | 1.04 | 1.17 |
| 47 | DH | <u>6.7</u> | <u>6.7</u> | <u>0.51</u> | <u>0.61</u> | <u>1.25</u> | <u>1.30</u> |
| 48 | DA | <u>4.1</u> | <u>5.3</u> | <u>0.63</u> | 0.68 | <u>1.12</u> | <u>1.20</u> |
| 49 | DB | <u>5.8</u> | <u>5.2</u> | <u>0.55</u> | <u>0.69</u> | <u>1.18</u> | <u>1.26</u> |
| 50 | DC | <u>6.8</u> | <u>5.9</u> | <u>0.60</u> | <u>0.65</u> | <u>1.13</u> | <u>1.15</u> |
| 51 | DG | <u>7.2</u> | <u>5.1</u> | <u>0.50</u> | <u>0.69</u> | <u>1.20</u> | <u>1.29</u> |
| 52 | DE | <u>6.8</u> | <u>6.0</u> | <u>0.50</u> | <u>0.65</u> | <u>1.16</u> | <u>1.20</u> |
| 53 | DA | 3.9 | <u>5.2</u> | <u>0.59</u> | 0.75 | 1.06 | <u>1.24</u> |
| 54 | DC | 3.8 | <u>5.1</u> | <u>0.68</u> | 0.72 | <u>1.18</u> | 1.10 |
| 55 | DA | <u>4.2</u> | <u>5.1</u> | <u>0.67</u> | <u>0.65</u> | <u>1.15</u> | <u>1.16</u> |
| 56 | DB | <u>5.8</u> | <u>5.2</u> | <u>0.69</u> | <u>0.60</u> | <u>1.11</u> | <u>1.13</u> |
| 57 | DC | <u>4.9</u> | <u>5.8</u> | <u>0.54</u> | <u>0.65</u> | 0.90 | <u>1.11</u> |
| 58 | DG | <u>6.5</u> | <u>6.1</u> | <u>0.52</u> | <u>0.60</u> | 0.89 | <u>1.13</u> |
| 59 | DI | Cracked during casting or hot rolling | | | | | |
| 60 | DJ | Cracked during casting or hot rolling | | | | | |
| 61 | DK | Cracked during casting or hot rolling | | | | | |
| 62 | DL | Cracked during casting or hot rolling | | | | | |

(2/2)

| Steel type | TS/MPa | El./% | λ/% | TS × λ/ MPa-% | Sheet thickness/minimum bending radius | Note |
|---|---|---|---|---|---|---|
| 30 | 1000 | 16 | 55 | 55000 | 3.6 | Invention steel |
| 31 | 1010 | 17 | 60 | 60600 | 4.0 | Invention steel |
| 32 | 1050 | 16 | 65 | 68250 | 5.3 | Invention steel |
| 33 | 1065 | 15 | 70 | 74550 | 5.3 | Invention steel |
| 34 | 1230 | 13 | 60 | 73800 | 3.6 | Invention steel |
| 35 | 1250 | 12 | 55 | 68750 | 4.5 | Invention steel |
| 36 | 1275 | 10 | 50 | 63750 | 3.2 | Invention steel |
| 37 | 1485 | 9 | 50 | 74250 | 2.6 | Invention steel |
| 38 | 1475 | 8 | 55 | 81125 | 2.3 | Invention steel |
| 39 | 805 | 24 | 75 | 60375 | 2.8 | Invention steel |
| 40 | 635 | 32 | 60 | 38100 | 4.7 | Invention steel |
| 41 | 785 | 22 | 145 | 113825 | 3.6 | Invention steel |
| 42 | 800 | 21 | 140 | 112000 | 3.0 | Invention steel |
| 43 | 840 | 19 | 60 | 50400 | 1.8 | Invention steel |
| 44 | 640 | 30 | 50 | 32000 | 1.8 | Invention steel |
| 45 | 630 | 31 | 45 | 28350 | 1.6 | Invention steel |
| 46 | 825 | 17 | 100 | 82500 | 1.6 | Invention steel |
| 47 | 805 | 19 | 80 | 64400 | <u>0.9</u> | Comparative steel |
| 48 | 980 | 18 | 30 | 29400 | <u>0.9</u> | Comparative steel |
| 49 | 1100 | 12 | 45 | 49500 | <u>0.8</u> | Comparative steel |

TABLE 11-continued

The structure and mechanical characteristics of the respective steels in the respective manufacturing conditions

| | | | | | | |
|---|---|---|---|---|---|---|
| 50 | 990 | 16 | 35 | 34650 | 0.9 | Comparative steel |
| 51 | 650 | 29 | 40 | 26000 | 0.9 | Comparative steel |
| 52 | 1490 | 8 | 30 | 44700 | 0.7 | Comparative steel |
| 53 | 985 | 16 | 35 | 34475 | 1.1 | Comparative steel |
| 54 | 1265 | 9 | 45 | 56925 | 1.1 | Comparative steel |
| 55 | 890 | 17 | 30 | 26700 | 0.8 | Comparative steel |
| 56 | 1150 | 10 | 35 | 40250 | 0.8 | Comparative steel |
| 57 | 1240 | 12 | 35 | 43400 | 0.9 | Comparative steel |
| 58 | 560 | 30 | 40 | 22400 | 0.9 | Comparative steel |
| 59 | Cracked during casting or hot rolling | | | | | Comparative steel |
| 60 | Cracked during casting or hot rolling | | | | | Comparative steel |
| 61 | Cracked during casting or hot rolling | | | | | Comparative steel |
| 62 | Cracked during casting or hot rolling | | | | | Comparative steel |

As shown in, for example, FIGS. 40, 41, 42, 43, 44, and 45, steel sheets satisfying the specifications of the present invention had excellent hole expanding properties, bending properties, and small forming anisotropy. Furthermore, steel sheets manufactured in the desirable condition ranges exhibited superior hole expanding rate and bending properties.

INDUSTRIAL APPLICABILITY

As described above, according to the present invention, without limiting the main structure configuration, it is possible to obtain a hot-rolled steel sheet, a cold-rolled steel sheet, and a galvanized steel sheet which are excellent in terms of local deformability and have a small orientation influence of formability even when Nb, Ti and the like are added by controlling the texture in addition to controlling the sizes and shapes of crystal grains.

Therefore, the present invention is highly useful in the steel-manufacturing industry.

In addition, in the present invention, the strength of the steel sheet is not specified; however, since formability degrades as the strength increases as described above, the effects are particularly large in the case of a high-strength steel sheet, for example, a case in which the tensile strength is 440 MPa or more.

The invention claimed is:

1. A method of manufacturing a hot-rolled steel sheet, the method comprising,
first hot rolling carried out at least once at a rolling reduction ratio of 20% or more in a temperature range of 1000° C. to 1200° C., and an austenite grain diameter is set to 200 μm or less, wherein
an ingot or a slab containing, by mass %:
C: 0.0001% to 0.40%,
Si: 0.001% to 2.5%,
Mn: 0.001% to 4.0%,
P: 0.001% to 0.15%,
S: 0.0005% to 0.03%,
Al: 0.001% to 2.0%,
N: 0.0005% to 0.01%,
O: 0.0005% to 0.01%,
and further comprising one or two or more of:
Ti: 0.001% to 0.20%,
Nb: 0.001% to 0.20%,
V: 0.001% to 1.0%,
W: 0.001% to 1.0%,
B: 0.0001% to 0.0050%,
Mo: 0.001% to 1.0%,
Cr: 0.001% to 2.0%,
Cu: 0.001% to 2.0%,
Ni: 0.001% to 2.0%,
Co: 0.0001% to 1.0%,
Sn: 0.0001% to 0.2%,
Zr: 0.0001% to 0.2%,
As: 0.0001% to 0.50%,
Mg: 0.0001% to 0.010%,
Ca: 0.0001% to 0.010%, and
REM: 0.0001% to 0.1%
and balance composed of iron and inevitable impurities;
second hot rolling in which a total of rolling reduction ratios is 50% or more is carried out in a temperature range of T1+30° C. to T1+200° C.;
third hot rolling in which a total of rolling reduction ratios is less than 30% is carried out in a temperature range of T1° C. to lower than T1+30° C.; and
hot rolling ends at an Ar3 transformation temperature or higher,
where, T1 is a temperature determined by steel sheet components, and expressed by the following formula 1, T1(° C.)=850+10×(C+N)×Mn+350×Nb+250×Ti+40× B+10×Cr+100×Mo+100×V (Formula 1), wherein an average value of an X-ray random intensity ratio of a {100} <011> to {223} <110> orientation group at least in a sheet thickness central portion that is in a sheet thickness range of ⅝ to ⅜ from a steel sheet surface is 1.0 to 6.0 in the hot-rolled steel sheet, an X-ray random intensity ratio of a {332} <113> crystal orientation is 1.0 to 5.0 in the hot-rolled steel sheet; and rC which is an r value in a direction perpendicular to a rolling direction is 0.70 to 1.10, and r30 which is an r value in a direction that forms an angle of 30° with respect to the rolling direction is 0.70 to 1.10 in the hot-rolled steel sheet.

2. The method of manufacturing a hot-rolled steel sheet according to claim 1,
wherein, in the second hot rolling in the temperature range of T1+30° C. to T1+200° C., the ingot or slab is rolled at least once at a rolling reduction ratio of 30% or more in a pass.

3. The method of manufacturing a hot-rolled steel sheet according to claim 1,
wherein, in the first hot rolling in a temperature range of 1000° C. to 1200° C., the ingot or slab is rolled at least twice at a rolling reduction ratio of 20% or more, and the austenite grain diameter is set to 100 μm or less.

4. The method of manufacturing a hot-rolled steel sheet according to claim 1,
wherein, in a case in which a pass in which a rolling reduction ratio is 30% or more in the temperature range of T1+30° C. to T1+200° C. is defined as a large reduction pass, a waiting time t from completion of a final pass of the large reduction pass to initiation of cooling employs a configuration that satisfies the following formula 2, $$t1 \leq t \leq t1 \times 2.5 \qquad \text{(Formula 2)}$$

where t1 is expressed by the following formula 3;

$$t1 = 0.001 \times ((Tf-T1) \times P1)^2 - 0.109 \times ((Tf-T1) \times P1) + 3.1 \qquad \text{(Formula 3)}$$

where Tf represents a temperature after the final pass, and P1 represents a rolling reduction ratio in the final pass.

5. The method of manufacturing a hot-rolled steel sheet according to claim 4,
wherein a temperature of the steel sheet increases by 18° C. or less between respective passes of the second hot rolling in the temperature range of T1+30° C. to T1+200° C.

6. A method of manufacturing a cold-rolled steel sheet, the method comprising,
pickling the hot-rolled steel sheet according to claim 1;
cold-rolling the hot-rolled steel sheet at 20% to 90%, and obtaining the cold-rolled steel sheet;
annealing the cold-rolled steel sheet at a temperature range of 720° C. to 900° C. for a holding time of 1 second to 300 seconds;
acceleration-cooling the cold-rolled steel sheet at a cooling rate of 10° C./s to 200° C./s from 650° C. to 500° C.; and
holding the cold-rolled steel sheet at a temperature of 200° C. to 500° C.

7. The method of manufacturing a cold-rolled steel sheet according to claim 6,
wherein, in the second hot rolling in the temperature range of T1+30° C. to T1+200° C., rolling at a rolling reduction ratio of 30% or more in a pass is carried out at least once.

8. The method of manufacturing a cold-rolled steel sheet according to claim 6,
wherein, in the first hot rolling in the temperature range of 1000° C. to 1200° C., rolling at a rolling reduction ratio of 20% or more is carried out at least twice, and the austenite grain diameter is set to 100 μm or less.

9. The method of manufacturing a cold-rolled steel sheet according to claim 6,
wherein, in a case in which a pass in which a rolling reduction ratio is 30% or more in the temperature range of T1+30° C. to T1+200° C. is defined as a large reduction pass, a waiting time t from completion of a final pass of the large reduction pass to initiation of cooling employs a configuration that satisfies the following formula 4, $$t1 \leq t \leq t1 \times 2.5 \qquad \text{(Formula 4)}$$

where t1 is expressed by the following formula 5;

$$t1 = 0.001 \times ((Tf-T1) \times P1)^2 - 0.109 \times ((Tf-T1) \times P1) + 3.1 \qquad \text{(Formula 5)}$$

where Tf represents a temperature after the final pass, and P1 represents a rolling reduction ratio in the final pass.

10. The method of manufacturing a cold-rolled steel sheet according to claim 9,
wherein a temperature of the steel sheet increases by 18° C. or less between respective passes of the second hot rolling in the temperature range of T1+30° C. to T1+200° C.

11. A method of manufacturing a galvanized steel sheet, the method comprising,
winding the hot-rolled steel sheet according to claim 1 in a temperature range of 680° C. to room temperature;
pickling the hot-rolled steel sheet;
cold-rolling the hot-rolled steel sheet at 20% to 90%, and obtaining a cold-rolled steel sheet;
heating the cold-rolled steel sheet to a temperature range of 650° C. to 900° C.;
annealing the cold-rolled steel sheet for a holding time of 1 second to 300 seconds;
cooling the cold-rolled steel sheet at a cooling rate of 0.1° C./s to 100° C./s from 720° C. to 580° C.; and
galvanizing treating the cold-rolled steel sheet.

12. The method of manufacturing a galvanized steel sheet according to claim 11,
wherein, in the second hot rolling in the temperature range of T1+30° C. to T1+200° C., rolling at a rolling reduction ratio of 30% or more in a pass is carried out at least once.

13. The method of manufacturing a galvanized steel sheet according to claim 11,
wherein, in the first hot rolling in the temperature range of 1000° C. to 1200° C., rolling at a rolling reduction ratio of 20% or more is carried out at least twice, and the austenite grain diameter is set to 100 μm or less.

14. The method of manufacturing a galvanized steel sheet according to claim 11,
wherein, in a case in which a pass in which a rolling reduction ratio is 30% or more in the temperature range of T1+30° C. to T1+200° C. is defined as a large reduction pass, a waiting time t from completion of a final pass of the large reduction pass to initiation of cooling employs a configuration that satisfies the following formula 6, $$t1 \leq t \leq t1 \times 2.5 \qquad \text{(Formula 6)}$$

where t1 is expressed by the following formula 7;

$$t1 = 0.001 \times ((Tf-T1) \times P1)^2 - 0.109 \times ((Tf-T1) \times P1) + 3.1 \qquad \text{(Formula 7)}$$

where Tf represents a temperature after the final pass, and P1 represents a rolling reduction ratio in the final pass.

15. The method of manufacturing a galvanized steel sheet according to claim 14,
wherein a temperature of the steel sheet increases by 18° C. or less between respective passes of the second hot rolling in the temperature range of T1+30° C. to T1+200° C.

\* \* \* \* \*